United States Patent
Liu et al.

(10) Patent No.: US 11,924,012 B2
(45) Date of Patent: *Mar. 5, 2024

(54) SIGNAL TRANSMITTING METHOD, DEVICE, AND STORAGE MEDIUM

(71) Applicant: ZTE CORPORATION, Guangdong (CN)

(72) Inventors: Kun Liu, Shenzhen (CN); Bo Dai, Shenzhen (CN); Huiying Fang, Shenzhen (CN); Xianming Chen, Shenzhen (CN); Weiwei Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,597

(22) Filed: Jul. 1, 2022

(65) Prior Publication Data
US 2022/0337460 A1    Oct. 20, 2022

Related U.S. Application Data

(63) Continuation of application No. 16/764,808, filed as application No. PCT/CN2018/112505 on Oct. 29, 2018, now Pat. No. 11,381,434.

(30) Foreign Application Priority Data

Nov. 17, 2017    (CN) .......................... 201711147169.X

(51) Int. Cl.
*H04L 27/26*    (2006.01)
*H04L 5/00*    (2006.01)
(Continued)

(52) U.S. Cl.
CPC ........ *H04L 27/2607* (2013.01); *H04L 5/0094* (2013.01); *H04W 52/36* (2013.01); *H04W 72/0453* (2013.01)

(58) Field of Classification Search
CPC .................................................. H04L 27/2607
See application file for complete search history.

(56) References Cited

U.S. PATENT DOCUMENTS 11,381,434 B2 * 7/2022 Liu ....................... H04L 5/0044
2017/0366311 A1    12/2017 Iyer et al.
(Continued)

FOREIGN PATENT DOCUMENTS

CN        106603210 A       4/2017
CN        106961317 A       7/2017
(Continued)

OTHER PUBLICATIONS

Sony, "RAN1 Model of GB Interface for NB-IoT", 3GPP TSG RAN WG1 Meeting #82bis, R1-155878—2 pages (Oct. 9, 2015).
(Continued)

*Primary Examiner* — Jason E Mattis
(74) *Attorney, Agent, or Firm* — Knobbe, Martens, Olson & Bear, LLP

(57) ABSTRACT

Disclosed are a signal transmitting method, device and system, and a storage medium. The method includes: transmitting a first signal, the first signal includes at least one of: at least one first structure or at least one second structure. Each first structure includes at least one symbol group, each symbol group in the each first structure includes a cyclic prefix and at least one symbol, or a cyclic prefix, at least one symbol and guard time, and symbols of each symbol group occupy a same subcarrier or a same frequency resource in frequency domain. Each second structure includes at least one symbol group, each symbol group includes a cyclic prefix and at least one symbol, or a cyclic prefix, at least one symbol and guard time, and symbols of each symbol group in the each second structure occupy a same subcarrier or a same frequency resource in frequency domain.

20 Claims, 21 Drawing Sheets

(51) Int. Cl.
*H04W 52/36* (2009.01)
*H04W 72/0453* (2023.01)

(56) References Cited

U.S. PATENT DOCUMENTS

| | | | |
|---|---|---|---|
| 2018/0070243 A1 | 3/2018 | Liu et al. | |
| 2018/0145814 A1 | 5/2018 | Liu et al. | |
| 2018/0248671 A1 | 8/2018 | Bhattad et al. | |
| 2019/0150199 A1* | 5/2019 | Cho | H04L 5/0012 370/329 |
| 2020/0236524 A1 | 7/2020 | Ye et al. | |
| 2020/0245363 A1* | 7/2020 | Kim | H04B 1/713 |
| 2020/0245365 A1 | 7/2020 | Lin et al. | |

FOREIGN PATENT DOCUMENTS

| | | |
|---|---|---|
| CN | 106961709 A | 7/2017 |
| CN | 106982110 A | 7/2017 |
| CN | 107040352 A | 8/2017 |
| CN | 107040561 A | 8/2017 |
| CN | 107113554 A | 8/2017 |
| CN | 107182130 A | 9/2017 |
| CN | 107889212 A | 4/2018 |
| CN | 109587659 A1 | 4/2019 |
| WO | WO 2017/140477 A1 | 8/2017 |
| WO | WO 2017/193976 A1 | 11/2017 |

OTHER PUBLICATIONS

Huawei, "TP for Coexistence Simulation Assumptions", 3GPP TSG-RAN WG4 Meeting #77 NB-IoT AH, R4-77AH-IoT-0137—6 pages (Jan. 22, 2016).
International Search Report of corresponding PCT Application No. PCT/CN2018/112505—5 pages (dated Jan. 31, 2019).
First Search Report for CN 201711147169.X dated Apr. 22, 2021.
First Office Action for CN 201610963386.5 dated Apr. 30, 2021.
European Search Report in Application No. PCT/CN2018112505, dated Jul. 21, 2021 in 8 pages.

* cited by examiner

| | CH 11 | CH 5 | | CH 5 | CH 11 | | CH 11 | CH 5 |
|---|---|---|---|---|---|---|---|---|
| SC 11 | CH 11 | CH 5 | | CH 5 | CH 11 | | CH 11 | CH 5 |
| SC 10 | CH 5 | CH 11 | | CH 11 | CH 5 | | CH 10 | CH 4 |
| SC 9 | CH 10 | CH 4 | | CH 4 | CH 10 | | CH 9 | CH 3 |
| SC 8 | CH 4 | CH 10 | | CH 10 | CH 4 | | CH 8 | CH 2 |
| SC 7 | CH 9 | CH 3 | | CH 3 | CH 9 | | CH 7 | CH 1 |
| SC 6 | CH 3 | CH 9 | | CH 9 | CH 3 | | CH 6 | CH 0 |
| SC 5 | CH 8 | CH 2 | | CH 2 | CH 8 | | CH 5 | CH 11 |
| SC 4 | CH 2 | CH 8 | | CH 8 | CH 2 | | CH 4 | CH 10 |
| SC 3 | CH 7 | CH 1 | | CH 1 | CH 7 | | CH 3 | CH 9 |
| SC 2 | CH 1 | CH 7 | | CH 7 | CH 1 | | CH 2 | CH 8 |
| SC 1 | CH 6 | CH 0 | | CH 0 | CH 6 | | CH 1 | CH 7 |
| SC 0 | CH 0 | CH 6 | | CH 6 | CH 0 | | CH 0 | CH 6 |
| | SG0 | SG1 | | SG2 | SG3 | | SG4 | SG5 |

FIG. 21

SIGNAL TRANSMITTING METHOD, DEVICE, AND STORAGE MEDIUM

CROSS-REFERENCES TO RELATED APPLICATIONS

This application is a continuation of U.S. application Ser. No. 16/764,808, filed on May 15, 2020, which is a National stage application, filed under 37 U.S.C. 371, of International patent application No. PCT/CN2018/112505, filed on Oct. 29, 2018, which is based on and claims priority to a Chinese patent application No. 201711147169.X filed on Nov. 17, 2017, disclosures of which are incorporated herein by reference in their entireties.

TECHNICAL FIELD

The present disclosure relates to, but is not limited to, the field of wireless communications and, in particular, to a signal transmitting method, device and system, and a storage medium.

BACKGROUND

A user equipment (UE) of machine type communication (MTC), also referred to as a UE of machine to machine (M2M), is a primary application form of the Internet of Things in a current stage. Several technologies applicable to the cellular Internet of Things are disclosed in a technical report TR45.820 of the 3rd generation partnership project (3GPP), among which a cellular-based Narrow Band-Internet of Things (NB-IOT) technology is most attractive.

In the related art, the NB-IoT technology mainly works in a frequency division duplex (FDD) mode. No effective solution has been proposed yet for a resource configuration of the NB-IoT technology in a time division duplexing (TDD) mode.

SUMMARY

In view of this, embodiments of the present disclosure provide a signal transmitting method which can achieve a resource configuration of an NB-IoT technology in a TDD mode.

An embodiment of the present disclosure provides a signal transmitting method including a process described below.

A first node transmits a first signal, where the first signal includes at least one first structure.

Each of the at least one first structure comprises at least one symbol group (SG), each of the at least one SG in the each of the at least one first structure comprises a cyclic prefix and at least one symbol, or comprises a cyclic prefix, at least one symbol and guard time; and symbols of the each of the at least one SG in the each of the at least one first structure occupy a same subcarrier or a same frequency resource in frequency domain.

When the first signal comprises two first structures, and each of the two first structures comprises three SGs, a first one of the two first structures comprises SG0, SG1 and SG2, and a second one of the two first structures comprises SG3, SG4 and SG5.

For the three SGs in the first one of the two first structures, in a case where a subcarrier index of the SG0 is 0, a subcarrier index of the SG1 is 1, and a subcarrier index of the SG2 is 0; in a case where the subcarrier index of the SG0 is 1, the subcarrier index of the SG1 is 0, and the subcarrier index of the SG2 is 1; in a case where the subcarrier index of the SG0 is 2, the subcarrier index of the SG2 is 3, and the subcarrier index of the SG3 is 2; in a case where the subcarrier index of the SG0 is 3, the subcarrier index of the SG1 is 2, and the subcarrier index of the SG2 is 3; in a case where the subcarrier index of the SG0 is 4, the subcarrier index of the SG1 is 5, and the subcarrier index of the SG2 is 4; in a case where the subcarrier index of the SG0 is 5, the subcarrier index of the SG1 is 4, and the subcarrier index of the SG2 is 5; in a case where the subcarrier index of the SG0 is 6, the subcarrier index of the SG1 is 7, and the subcarrier index of the SG2 is 6; in a case where the subcarrier index of the SG0 is 7, the subcarrier index of the SG1 is 6, and the subcarrier index of the SG2 is 7; in a case where the subcarrier index of the SG0 is 8, the subcarrier index of the SG1 is 9, and the subcarrier index of the SG2 is 8; in a case where the subcarrier index of the SG0 is 9, the subcarrier index of the SG1 is 8, and the subcarrier index of the SG2 is 9; in a case where the subcarrier index of the SG0 is 10, the subcarrier index of the SG1 is 11, and the subcarrier index of the SG2 is 10; in a case where the subcarrier index of the SG0 is 11, the subcarrier index of the SG1 is 10, and the subcarrier index of the SG2 is 11.

For the three SGs in the second one of the two first structures, in a case where a subcarrier index of the SG3 is 0, a subcarrier index of the SG4 is 6, and a subcarrier index of the SG5 is 0; in a case where the subcarrier index of the SG3 is 1, the subcarrier index of the SG4 is 7, and the subcarrier index of the SG5 is 1; in a case where the subcarrier index of the SG3 is 2, the subcarrier index of the SG4 is 8, and the subcarrier index of the SG5 is 2; in a case where the subcarrier index of the SG3 is 3, the subcarrier index of the SG4 is 9, and the subcarrier index of the SG5 is 3; in a case where the subcarrier index of the SG3 is 4, the subcarrier index of the SG4 is 10, and the subcarrier index of the SG5 is 4; in a case where the subcarrier index of the SG3 is 5, the subcarrier index of the SG4 is 11, and the subcarrier index of the SG5 is 5; in a case where the subcarrier index of the SG3 is 6, the subcarrier index of the SG4 is 0, and the subcarrier index of the SG5 is 6; in a case where the subcarrier index of the SG3 is 7, the subcarrier index of the SG4 is 1, and the subcarrier index of the SG5 is 7; in a case where the subcarrier index of the SG3 is 8, the subcarrier index of the SG4 is 2, and the subcarrier index of the SG5 is 8; in a case where the subcarrier index of the SG3 is 9, the subcarrier index of the SG4 is 3, and the subcarrier index of the SG5 is 9; in a case where the subcarrier index of the SG3 is 10, the subcarrier index of the SG4 is 4, and the subcarrier index of the SG5 is 10; and in a case where the subcarrier index of the SG3 is 11, the subcarrier index of the SG4 is 5, and the subcarrier index of the SG5 is 11.

Another embodiment of the present disclosure provides a signal transmitting device applied to a node. The device includes a memory and a processor.

The memory is configured to store programs for signal transmitting.

The processor is configured to execute the programs, where the programs, when executed, perform the signal transmitting method according to an embodiment of the present disclosure.

Another embodiment of the present disclosure provides a non-transitory storage medium, including stored programs, where the programs, when executed, perform the signal transmitting method according to an embodiment of the present disclosure.

The signal transmitting method, device and the non-transitory storage medium according to the embodiments of the present disclosure are applied to achieve the resource configuration of the NB-IoT technology in the TDD mode.

BRIEF DESCRIPTION OF THE DRAWINGS

FIG. 21 is a diagram illustrating an allocation scheme of subcarriers occupied by SG0 to SG5 in example eight.

DETAILED DESCRIPTION

Hereinafter the present disclosure will be further described in detail in conjunction with the drawings and embodiments. It is to be understood that the embodiments described herein are intended to explain and not to limit the present disclosure.

An embodiment of the present disclosure provides a signal transmitting method including a process described below.

A first node transmits a first signal, where the first signal includes at least one of: at least one first structure or at least one second structure.

Each of the at least one first structure includes at least one symbol group.

Each of the at least one symbol group in the each of the at least one first structure includes a cyclic prefix and at least one symbol, or includes a cyclic prefix, at least one symbol and guard time.

Symbols of each symbol group in the each of the at least one first structure occupy a same subcarrier or a same frequency resource in frequency domain.

Each of the at least one second structure includes at least one symbol group.

Each of the at least one symbol group in the each of the at least one second structure includes a cyclic prefix and at least one symbol, or includes a cyclic prefix, at least one symbol and guard time.

Symbols of each symbol group in the each of the at least one second structure occupy a same subcarrier or a same frequency resource in frequency domain.

Figure 1:
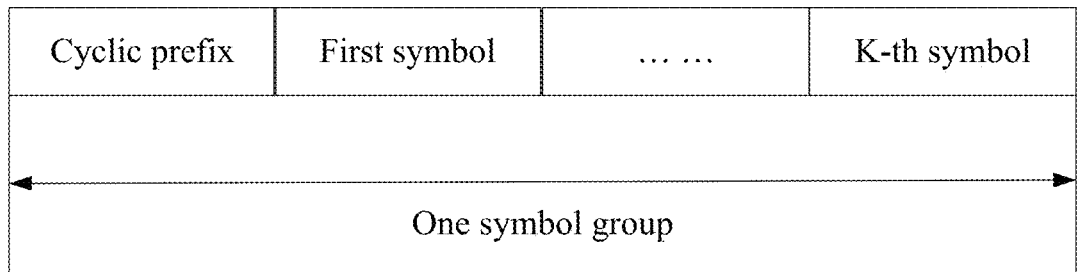
FIG. 1 is a structural diagram of a symbol group according to an embodiment of the present disclosure.
Figure 2:
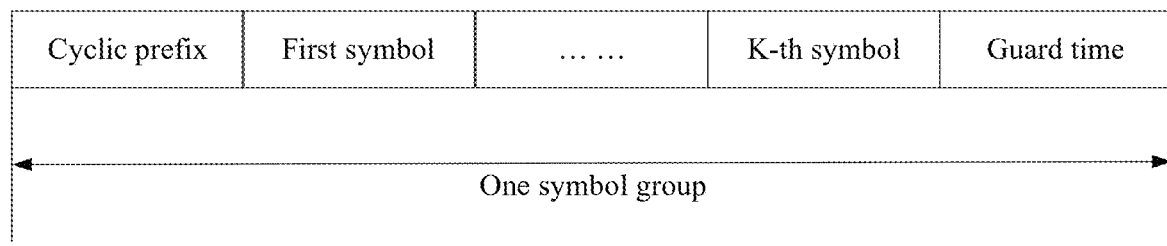
FIG. 2 is a structural diagram of another symbol group according to an embodiment of the present disclosure.

The symbol group of the first structure and/or the second structure, as shown in FIG. 1, includes the cyclic prefix and at least one symbol; or the symbol group of the first structure and/or the second structure, as shown in FIG. 2, includes the cyclic prefix, at least one symbol and the guard time. The first signal supports repeated transmissions in the embodiment of the present disclosure. In an embodiment, each symbol group occupies one subcarrier in the frequency domain.

In some embodiments, the first structure may include three symbol groups.

Figure 3:
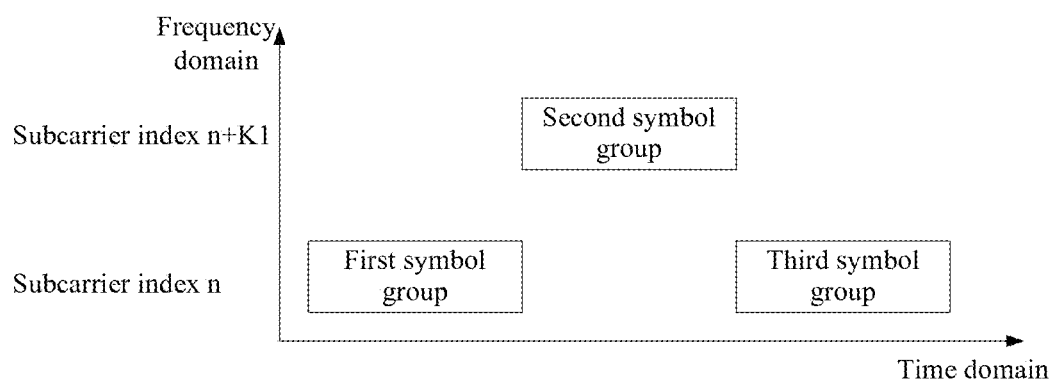
FIG. 3 is a schematic diagram of a subcarrier index of a symbol group according to an embodiment of the present disclosure.

As shown in FIG. 3, a subcarrier index occupied by a first symbol group and a subcarrier index occupied by a second symbol group differ by (+K1) subcarriers, and the subcarrier index occupied by the second symbol group and a subcarrier index occupied by a third symbol group differ by (−K1) subcarriers, where K1 is an integer greater than or equal to 1.

Figure 4:
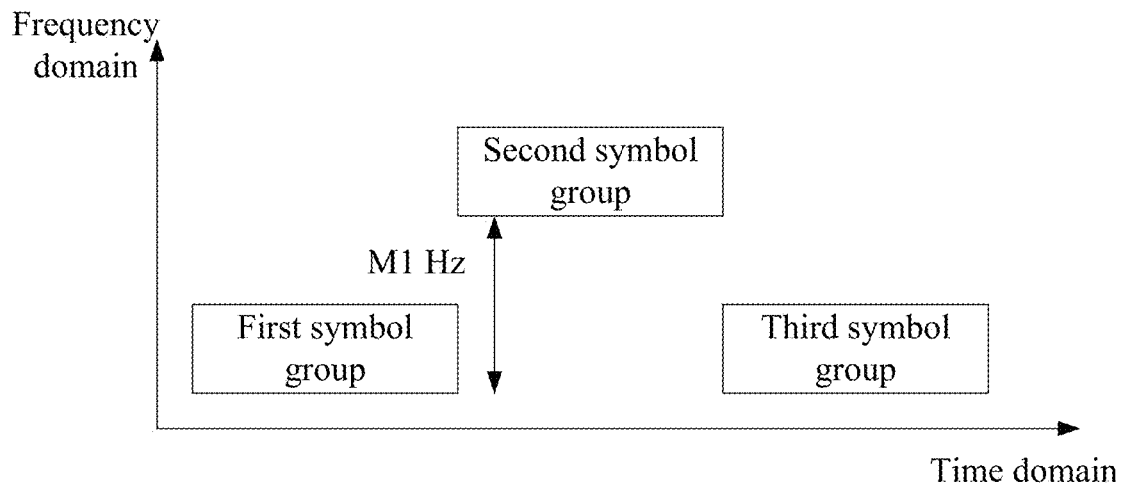
FIG. 4 is a schematic diagram of a frequency resource position of a symbol group according to an embodiment of the present disclosure.

In some embodiments, as shown in FIG. 4, a frequency resource position occupied by a first symbol group and a frequency resource position occupied by a second symbol group differ by (+M1) Hz, and the frequency resource position occupied by the second symbol group and a frequency resource position occupied by a third symbol group differ by (−M1) Hz, where M1 is a real number greater than 0.

In some embodiments, the first structure may adopt configurations described below.

Configuration 01: a number of symbols in each symbol group is 2, a subcarrier spacing is 3750 Hz, K1 is 1, and a length of the CP is 266.7 us or 66.7 us.

Configuration 02: the number of symbols in each symbol group is 2, the subcarrier spacing is 3750 Hz, K1 is 6, and the length of the CP is 266.7 us or 66.7 us.

Configuration 03: the number of symbols in each symbol group is 2, the subcarrier spacing is 3750 Hz, M1 is 3750 Hz, and the length of the CP is 266.7 us or 66.7 us.

Configuration 04: the number of symbols in each symbol group is 2, the subcarrier spacing is 3750 Hz, M1 is 22500 Hz, and the length of the CP is 266.7 us or 66.7 us.

Configuration 05: the number of symbols in each symbol group is 3, the subcarrier spacing is 3750 Hz, K1 is 1, and the length of the CP is 66.7 us.

Configuration 06: the number of symbols in each symbol group is 3, the subcarrier spacing is 3750 Hz, K1 is 6, and the length of the CP is 66.7 us.

Configuration 07: the number of symbols in each symbol group is 3, the subcarrier spacing is 3750 Hz, M1 is 3750 Hz, and the length of the CP is 66.7 us.

Configuration 08: the number of symbols in each symbol group is 3, the subcarrier spacing is 3750 Hz, M1 is 22500 Hz, and the length of the CP is 66.7 us.

In some embodiments, the first signal may include one first structure with configuration 01 and one first structure with configuration 02, where the length of the CP in configuration 01 is the same as that in configuration 02.

In some embodiments, the first signal may include one first structure with configuration 03 and one first structure with configuration 04, where the length of the CP in configuration 03 is the same as that in configuration 04.

In some embodiments, the first signal may include one first structure with configuration 05 and one first structure with configuration 06.

In some embodiments, the first signal may include a plurality of first structures, where each first structure may be independently configured, and each first structure may be selected from the above configurations 01 to 08. For example, the first signal may include one first structure with configuration 07 and one first structure with configuration 08.

In some embodiments, the first structure with each of configurations 01 to 04 occupies 3 consecutive uplink subframes, that is, configuration information for an uplink subframe and a downlink subframe is 3 consecutive uplink subframes in configuration 0, 3 or 6.

Figure 5:
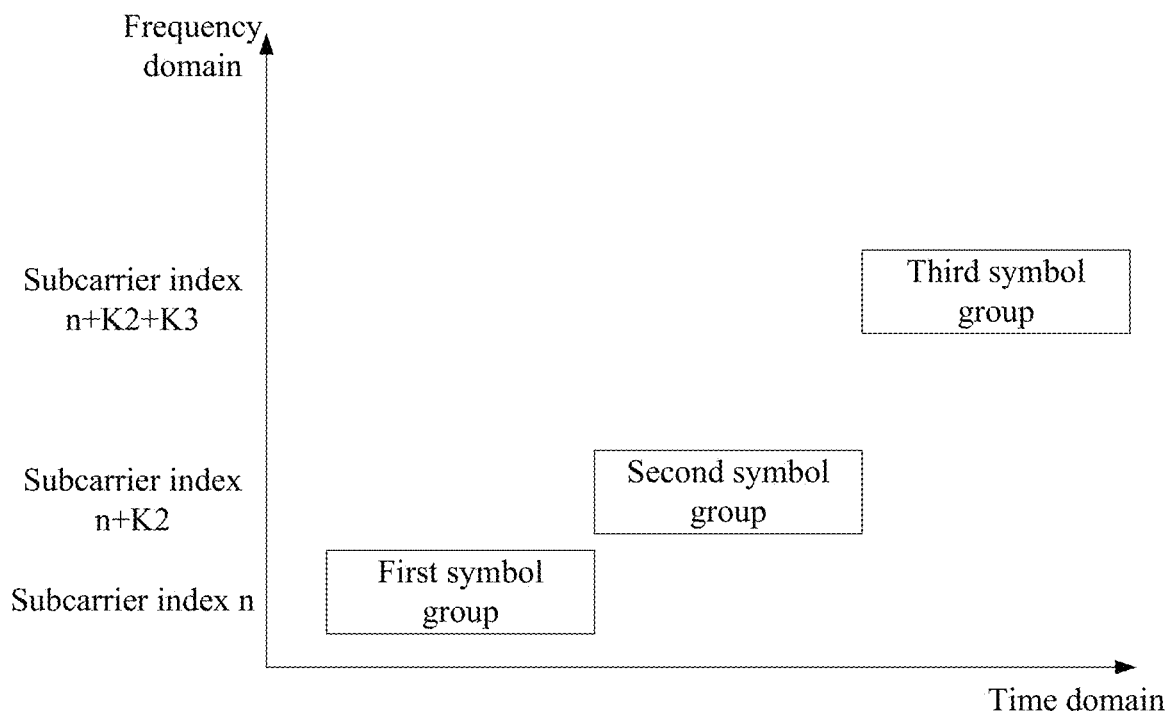
FIG. 5 is a schematic diagram of a subcarrier index of a symbol group according to an embodiment of the present disclosure.
Figure 6:
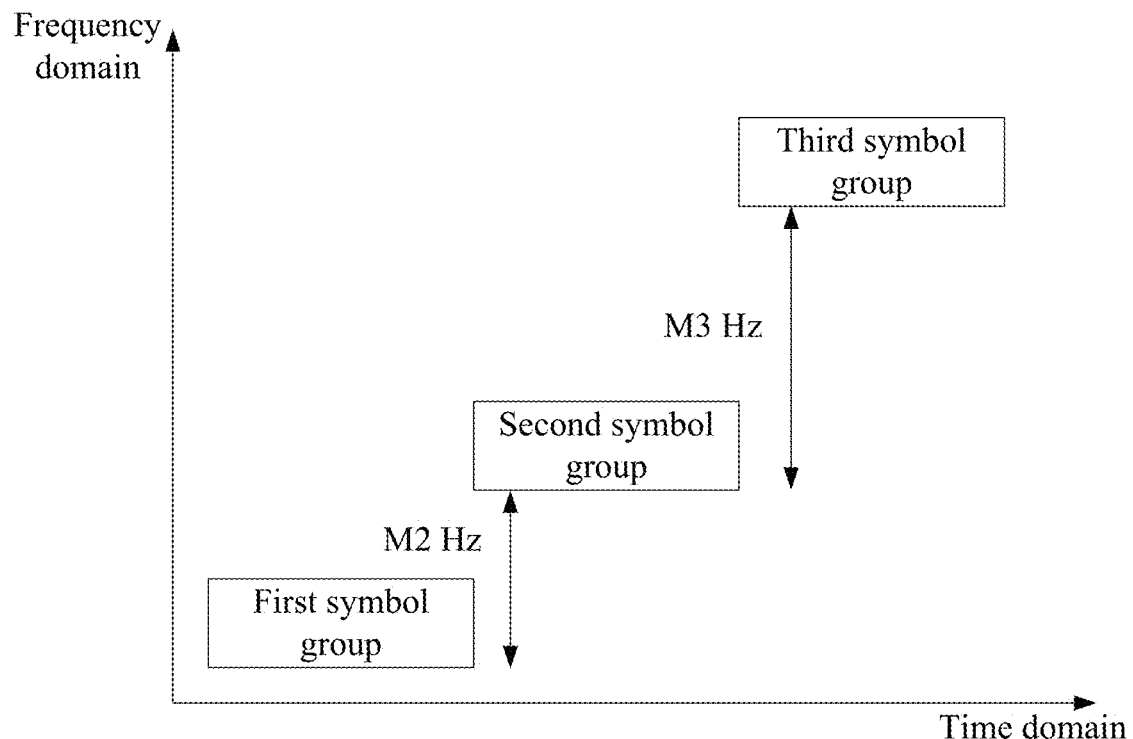
FIG. 6 is a schematic diagram of a frequency resource position of a symbol group according to an embodiment of the present disclosure.

In some embodiments, the first structure may also include three symbol groups shown in FIG. 5 or FIG. 6.

As shown in FIG. 5, among the three symbol groups, a subcarrier index occupied by a first symbol group and a subcarrier index occupied by a second symbol group differ by K2 subcarriers, and the subcarrier index occupied by the second symbol group and a subcarrier index occupied by a third symbol group differ by K3 subcarriers. K2 is an integer not equal to 0 and K3 is an integer not equal to 0.

As shown in FIG. 6, among the three symbol groups, a frequency resource position occupied by a first symbol group and a frequency resource position occupied by a second symbol group differ by M2 Hz, and the frequency resource position occupied by the second symbol group and a frequency resource position occupied by a third symbol group differ by M3 Hz, where M2 is a real number not equal to 0 and M3 is a real number not equal to 0.

In some embodiments, the symbol group in the first signal may adopt configurations described below.

Configuration 11: the number of symbols in each symbol group is 2, the subcarrier spacing is 3750 Hz, K2 is 1 or (−1), K3 is 6 or (−6), and the length of the CP is 266.7 us or 66.7 us.

Configuration 12: the number of symbols in each symbol group is 2, the subcarrier spacing is 3750 Hz, M2 is 3750 Hz or (−3750) Hz, M3 is 22500 Hz or (−22500) Hz, and the length of the CP is 266.7 us or 66.7 us.

Configuration 13: the number of symbols in each symbol group is 3, the subcarrier spacing is 3750 Hz, K2 is 1 or (−1), K3 is 6 or (−6), and the length of the CP is 66.7 us.

Configuration 14: the number of symbols in each symbol group is 3, the subcarrier spacing is 3750 Hz, M2 is 3750 Hz or (−3750 Hz), M3 is 22500 Hz or (−22500) Hz, and the length of the CP is 66.7 us.

In some embodiments, the first signal may include two first structures each with configuration 11, where K2 and K3 each may have different values in the configurations of the two first structures. In an embodiment, K2 and K3 each have different values in the two first structures with configurations 11, for example, K2 and K3 in a first configuration 11 are 1 and 6 respectively, and K2 and K3 in a second configuration 11 are (−1) and (−6) respectively.

In some embodiments, the first signal may include two first structures each with configuration 12, where M2 and M3 each may have different values in the two first structures. In an embodiment, M2 and M3 each have different values in two configurations 12, for example, M2 and M3 in a first configuration 12 are 3750 Hz and 22500 Hz respectively, and M2 and M3 in a second configuration 12 are (−3750) Hz and (−22500) Hz respectively.

In some embodiments, the first signal may include two first structures each with configuration 13, where K2 and K3 each may have different values in the configurations of the two first structures. In an embodiment, K2 and K3 each have different values in two configurations 13, for example, K2 and K3 in a first configuration 13 are 1 and 6 respectively, and K2 and K3 in a second configuration 13 are (−1) and (−6) respectively.

In some embodiments, the first signal may include two first structures each with configuration 14, where M2 and M3 each may have different values in two configurations 14. In an embodiment, M2 and M3 each have different values in the two configurations 14, for example, M2 and M3 in a first configuration 14 are 3750 Hz and 22500 Hz respectively, and M2 and M3 in a second configuration 14 are (−3750) Hz and (−22500) Hz respectively.

In some embodiments, the first signal may include a plurality of first structures, where each first structure may be independently configured, and each first structure may be selected from the above configurations 11 to 14. In an embodiment, each of configurations 11 to 14 occupies 3 consecutive uplink subframes, that is, the configuration information for an uplink subframe and a downlink subframe is the 3 consecutive uplink subframes in configuration 0, 3 or 6.

In some embodiments, among the three symbol groups in the first structure, the subcarrier index occupied by the second symbol group and the subcarrier index occupied by the third symbol group may be determined according to the subcarrier index occupied by the first symbol group.

The frequency resource position occupied by the second symbol group and the frequency resource position occupied by the third symbol group may also be determined according to the frequency resource position occupied by the first symbol group.

In some embodiments, when the first signal includes a plurality of first structures, subcarrier indexes or frequency resource positions occupied by first symbol groups in the plurality of first structures may be the same or may be independently configured. For example, the subcarrier index occupied by the first symbol group in each of the plurality of first structures may be randomly selected from a subcarrier set, and may also be configured by a base station.

The frequency resource position occupied by the first symbol group in each of the plurality of first structures may be randomly selected from a frequency resource position set, and may also be configured by the base station.

In some embodiments, a subcarrier index or a frequency resource position occupied by a first symbol group in a subsequent one of a plurality of first structures may be determined according to a subcarrier index or a frequency resource position occupied by a first symbol group in a first one of the plurality of first structures.

For example, a subcarrier index or a frequency resource position occupied by a first symbol group in an n-th first structure differs from the subcarrier index or the frequency resource position occupied by the first symbol group in the first one of the first structures by Delta1, where n is greater than 1. Delta1 is a fixed value or a variable value.

A value of Delta1 may be determined by at least one of: a cell identity (ID), or a time domain starting position of the n-th first structure, such as a frame index or a subframe index.

In some embodiments, when two adjacent first structures exist, a subcarrier index or a frequency resource position occupied by a first symbol group in a second one of the two adjacent first structures may be determined according to a subcarrier index or a frequency resource position occupied by a first symbol group in a first one of the two adjacent first structures. For example, the subcarrier index or the frequency resource position occupied by the first symbol group in the second one of the two adjacent first structures differs from the subcarrier index or the frequency resource position occupied by the first symbol group in the first one of the two adjacent first structures by Delta2. Delta2 is a fixed value or a variable value.

A value of Delta2 may be determined by at least one of: the cell ID or a time domain starting position of the second one of the two adjacent first structures, such as a frame index or a subframe index.

Figure 7:
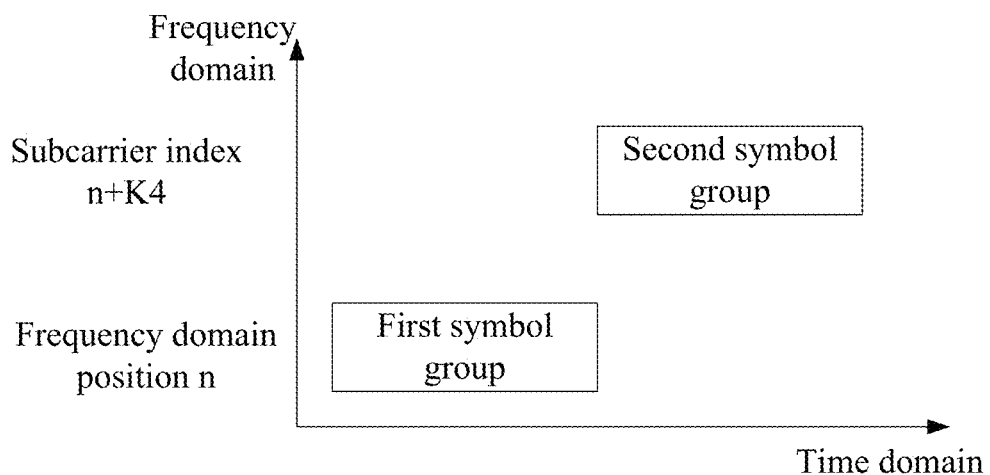
FIG. 7 is a schematic diagram of a subcarrier index of a symbol group according to an embodiment of the present disclosure.

In some embodiments, the second structure may include two symbol groups. For example, as shown in FIG. 7, a subcarrier index occupied by a first symbol group and a subcarrier index occupied by a second symbol group differ by K4 subcarriers, where K4 is an integer not equal to 0.

Figure 8:
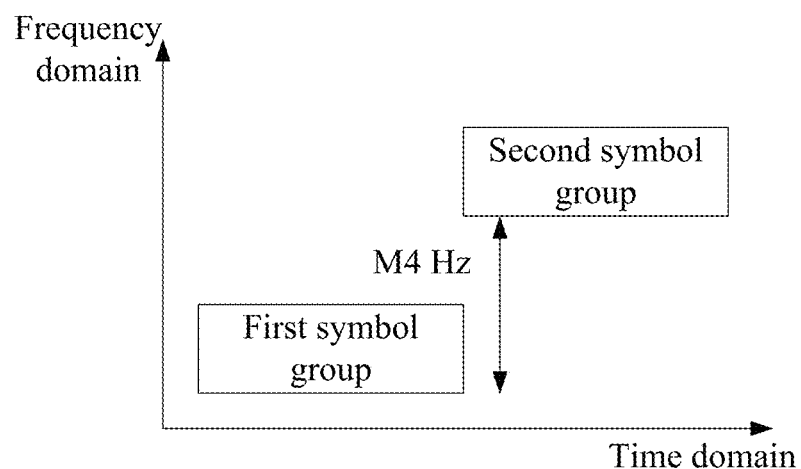
FIG. 8 is a schematic diagram of a frequency resource position of a symbol group according to an embodiment of the present disclosure.

In some embodiments, as shown in FIG. 8, between the two symbol groups, a frequency resource position occupied by a first symbol group and a frequency resource position occupied by the second symbol group differ by M4 Hz, where M4 is a real number not equal to 0.

In some embodiments, the second structure may adopt configurations described below.

Configuration 201: the number of symbols in each symbol group is 4, the subcarrier spacing is 3750 Hz, K4 is 1, (−1), 6 or (−6), and the length of the CP is 266.7 us or 66.7 us.

In some embodiments, the first signal may include two second structures each with configuration 201, where K4 may have different values in two configurations 201. In an embodiment, K4 has different values in the two configurations 201, for example, K4 in a first configuration 1 is 1 or (−1), and K4 in a second configuration 1 is 6 or (−6).

In some embodiments, the first signal may include four second structures each with configuration 201, where K4 may have different values in four configurations 201. In an embodiment, K4 has a different value in each of the four configurations 201, for example, K4 in the four configurations 201 is 1, (−1), 6 and (−6) respectively.

In some embodiments, the first signal may include three second structures each with configuration 201, where K4 may have different values in three configurations 201. In an embodiment, K4 has a different value in each of the three configurations 201, for example, K4 in the three configurations 201 is 1, (−1) and 6 respectively, or K4 in the three configurations 201 is 1, (−1) and (−6) respectively, or K4 in the three configurations 201 is 1, 6 and (−6) respectively, or K4 in the three configurations 201 is (−1), 6 and (−6) respectively.

Configuration 202: the number of symbols in the symbol group is 5, the subcarrier spacing is 3750 Hz, K4 is 1, (−1), 6 or (−6), and the length of the CP is 66.7 us.

In some embodiments, the first signal may include two second structures each with configuration 202, where K4 may have different values in two configurations 202. In an embodiment, K4 has different values in the two configurations 202, for example, K4 in a first configuration 202 is 1 or (−1), and K4 in a second configuration 202 is 6 or (−6).

In some embodiments, the first signal may include four second structures each with configuration 202, where K4 may have different values in four configurations 202. In an embodiment, K4 has a different value in each of the four configurations 202, for example, K4 in the four configurations 202 is 1, (−1), 6 and (−6) respectively.

In some embodiments, the first signal may include three second structures each with configuration 202, where K4 may have different values in the three second structures with configurations 202. In an embodiment, K4 has a different value in each of three configurations 202, for example, K4 in the three configurations 202 is 1, (−1) and 6 respectively, or K4 in the three configurations 202 is 1, (−1) and (−6) respectively, or K4 in the three configurations 202 is 1, 6 and (−6) respectively, or K4 in the three configurations 202 is (−1), 6 and (−6) respectively.

Configuration 203: the number of symbols in the symbol group is 2, the subcarrier spacing is 3750 Hz, K4 is 1, (−1), 6 or (−6), and the length of the CP is 266.7 us or 66.7 us.

In some embodiments, the first signal may include two second structures each with configuration 203, where K4 may have different values in two configurations 203. In an embodiment, K4 has different values in the two configurations 203, for example, K4 in a first configuration 203 is 1 or (−1), and K4 in a second configuration 203 is 6 or (−6).

In some embodiments, the first signal may include four second structures each with configuration 203, where K4 may have different values in the four second structures with configurations 203. In an embodiment, K4 has a different value in each of four configurations 203, for example, K4 in the four configurations 203 is 1, (−1), 6 and (−6) respectively.

In some embodiments, the first signal may include three second structures each with configuration 203, where K4 may have different values in the three second structures with configurations 203. In an embodiment, K4 has a different value in each of three configurations 203, for example, K4 in the three configurations 203 is 1, (−1) and 6 respectively, or K4 in the three configurations 203 is 1, (−1) and (−6) respectively, or K4 in the three configurations 203 is 1, 6 and (−6) respectively, or K4 in the three configurations 203 is (−1), 6 and (−6) respectively.

Configuration 204: the number of symbols in the symbol group is 3, the subcarrier spacing is 3750 Hz, K4 is 1, (−1), 6 or (−6), and the length of the CP is 66.7 us.

In some embodiments, the first signal may include two second structures each with configuration 204, where K4 may have different values in two configurations 204. Optionally, K4 has different values in the two configurations 204, for example, K4 in a first configuration 204 is 1 or (−1), and K4 in a second configuration 204 is 6 or (−6).

In some embodiments, the first signal may include four second structures each with configuration 204, where K4 may have different values in four configurations 204. In an embodiment, K4 has a different value in each of the four configurations 204, for example, K4 in the four configurations 204 is 1, (−1), 6 and (−6) respectively.

In some embodiments, the first signal may include three second structures each with configuration 204, where K4 may have different values in three configurations 204. In an embodiment, K4 has a different value in each of the three configurations 204, for example, K4 in the three configurations 204 is 1, (−1) and 6 respectively, or K4 in the three configurations 4 is 1, (−1) and (−6) respectively, or K4 in the three configurations 4 is 1, 6 and (−6) respectively, or K4 in the three configurations 4 is (−1), 6 and (−6) respectively.

Configuration 205: the number of symbols in the symbol group is 1, the subcarrier spacing is 3750 Hz, K4 is 1, (−1), 6 or (−6), and the length of the CP is 266.7 us or 66.7 us.

In some embodiments, the first signal may include two second structures each with configuration 205, where K4 may have different values in two configurations 205. In an embodiment, K4 has different values in the two configurations 205, for example, K4 in a first configuration 205 is 1 or (−1), and K4 in a second configuration 205 is 6 or (−6).

In some embodiments, the first signal may include four second structures each with configuration 205, where K4 may have different values in four configurations 205. In an embodiment, K4 has a different value in each of the four configurations 205, for example, K4 in the four configurations 205 is 1, (−1), 6 and (−6) respectively.

In some embodiments, the first signal may include three second structures each with configuration 205, where K4 may have different values in three configurations 205. In an embodiment, K4 has a different value in each of the three configurations 205, for example, K4 in the three configurations 205 is 1, (−1) and 6 respectively, or K4 in the three configurations 205 is 1, (−1) and (−6) respectively, or K4 in the three configurations 205 is 1, 6 and (−6) respectively, or K4 in the three configurations 205 is (−1), 6 and (−6) respectively.

Configuration 206: the number of symbols in the symbol group is 2, the subcarrier spacing is 3750 Hz, K4 is 1, (−1), 6 or (−6), and the length of the CP is 66.7 us.

In some embodiments, the first signal may include two second structures each with configuration 206, where K4 may have different values in two configurations 206. In an embodiment, K4 has different values in the two configurations 206, for example, K4 in a first configuration 206 is 1 or (−1), and K4 in a second configuration 206 is 6 or (−6).

In some embodiments, the first signal may include four second structures each with configuration 206, where K4 may have different values in four configurations 206. In an embodiment, K4 has a different value in each of the four configurations 206, for example, K4 in the four configurations 206 is 1, (−1), 6 and (−6) respectively.

In some embodiments, the first signal may include three second structures each with configuration 206, where K4 may have different values in three configurations 206. In an embodiment, K4 has a different value in each of the three configurations 206, for example, K4 in the three configurations 206 is 1, −1 and 6 respectively, or K4 in the three configurations 206 is 1, (−1) and (−6) respectively, or K4 in the three configurations 206 is 1, 6 and (−6) respectively, or K4 in the three configurations 206 is (−1), 6 and (−6) respectively.

Configuration 207: the number of symbols in the symbol group is 4, the subcarrier spacing is 3750 Hz, M4 is 3750 Hz, (−3750) Hz, 22500 Hz or (−22500) Hz, and the length of the CP is 266.7 us or 66.7 us.

In some embodiments, the first signal may include two second structures each with configuration 207, where M4 may have different values in two configurations 207. In an embodiment, M4 has different values in the two configurations 207, for example, M4 in a first configuration 207 is 3750 Hz or (−3750) Hz, and M4 in a second configuration 207 is 22500 Hz or (−22500) Hz.

In some embodiments, the first signal may include four second structures each with configuration 207, where M4 may have different values in four configurations 207. In an embodiment, M4 has a different value in each of the four configurations 207, for example, M4 in the four configurations 207 is 3750 Hz, (−3750) Hz, 22500 Hz and (−22500) Hz respectively.

In some embodiments, the first signal may include three second structures each with configuration 207, where M4 may have different values in three configurations 207. In an embodiment, M4 has a different value in each of the three configurations 207, for example, M4 in the three configurations 207 is 3750 Hz, (−3750) Hz and 22500 Hz respectively, or M4 in the three configurations 207 is 3750 Hz, (−3750) Hz and (−22500) Hz respectively, or M4 in the three configurations 207 is 3750 Hz, 22500 Hz and (−22500) Hz respectively, or M4 in the three configurations 207 is (−3750) Hz, 22500 Hz and (−22500) Hz respectively.

Configuration 208: the number of symbols in the symbol group is 5, the subcarrier spacing is 3750 Hz, M4 is 3750 Hz, (−3750) Hz, 22500 Hz or (−22500) Hz, and the length of the CP is 66.7 us.

In some embodiments, the first signal may include two second structures each with configuration 208, where M4 may have different values in two configurations 208. In an embodiment, M4 has different values in the two configurations 208, for example, M4 in a first configuration 208 is 3750 Hz or (−3750) Hz, and M4 in a second configuration 208 is 22500 Hz or (−22500) Hz.

In some embodiments, the first signal may include four second structures each with configuration 208, where M4 may have different values in four configurations 208. Preferably, M4 has a different value in each of the four configurations 208, for example, M4 in the four configurations 208 is 3750 Hz, (−3750) Hz, 22500 Hz and (−22500) Hz respectively.

In some embodiments, the first signal may include three second structures each with configuration 208, where M4 may have different values in three configurations 208. In an embodiment, M4 has a different value in each of the three configurations 208, for example, M4 in the three configurations 208 is 3750 Hz, (−3750) Hz and 22500 Hz respectively, or M4 in the three configurations 208 is 3750 Hz, (−3750) Hz and (−22500) Hz respectively, or M4 in the three configurations 208 is 3750 Hz, 22500 Hz and (−22500) Hz respectively, or M4 in the three configurations 208 is (−3750) Hz, 22500 Hz and (−22500) Hz respectively.

Configuration 209: the number of symbols in the symbol group is 2, the subcarrier spacing is 3750 Hz, M4 is 3750 Hz, (−3750) Hz, 22500 Hz or (−22500) Hz, and the length of the CP is 266.7 us or 66.7 us.

In some embodiments, the first signal may include two second structures each with configuration 209, where M4 may have different values in two configurations 209. In an embodiment, M4 has different values in the two configurations 209, for example, M4 in a first configuration 209 is 3750 Hz or (−3750) Hz, and M4 in a second configuration 209 is 22500 Hz or (−22500) Hz.

In some embodiments, the first signal may include four configurations 209, where M4 may have different values in the four configurations 209. In an embodiment, M4 has a different value in each of the four configurations 209, for example, M4 in the four configurations 209 is 3750 Hz, (−3750) Hz, 22500 Hz and (−22500) Hz respectively.

In some embodiments, the first signal may include three second structures each with configuration 209, where M4 may have different values in three configurations 209. Preferably, M4 has a different value in each of the three configurations 209, for example, M4 in the three configurations 209 is 3750 Hz, (−3750) Hz and 22500 Hz respectively, or M4 in the three configurations 209 is 3750 Hz, (−3750) Hz and (−22500) Hz respectively, or M4 in the three configurations 209 is 3750 Hz, 22500 Hz and (−22500) Hz respectively, or M4 in the three configurations 209 is (−3750) Hz, 22500 Hz and (−22500) Hz respectively.

Configuration 210: the number of symbols in the symbol group is 3, the subcarrier spacing is 3750 Hz, M4 is 3750 Hz, (−3750) Hz, 22500 Hz or (−22500) Hz, and the length of the CP is 66.7 us.

In some embodiments, the first signal may include two second structures each with configuration 210, where M4 may have different values in two configurations 210. In an embodiment, M4 has different values in the two configurations 210, for example, M4 in a first configuration 10 is 3750 Hz or (−3750) Hz, and M4 in a second configuration 210 is 22500 Hz or (−22500) Hz.

In some embodiments, the first signal may include four second structures each with configuration 210, where M4 may have different values in four configurations 210. In an embodiment, M4 has a different value in each of the four configurations 210, for example, M4 in the four configurations 210 is 3750 Hz, (−3750) Hz, 22500 Hz and (−22500) Hz respectively.

In some embodiments, the first signal may include three configurations 210, where M4 may have different values in the three configurations 210. In an embodiment, M4 has a different value in each of the three configurations 210, for example, M4 in the three configurations 210 is 3750 Hz, (−3750) Hz and 22500 Hz respectively, or M4 in the three configurations 210 is 3750 Hz, (−3750) Hz and (−22500) Hz respectively, or M4 in the three configurations 210 is 3750 Hz, 22500 Hz and (−22500) Hz respectively, or M4 in the three configurations 210 is (−3750 Hz), 22500 Hz and (−22500) Hz respectively.

Configuration 211: the number of symbols in the symbol group is 1, the subcarrier spacing is 3750 Hz, M4 is 3750 Hz, (−3750) Hz, 22500 Hz or (−22500) Hz, and the length of the CP is 266.7 us or 66.7 us.

In some embodiments, the first signal may include two second structures each with configuration 211, where M4 may have different values in two configurations 211. In an embodiment, M4 has different values in the two configurations 211, for example, M4 in a first configuration 211 is 3750 Hz or (−3750) Hz, and M4 in a second configuration 211 is 22500 Hz or (−22500) Hz.

In some embodiments, the first signal may include four second structures each with configuration 211, where M4 may have different values in four configurations 211. In an embodiment, M4 has a different value in each of the four configurations 211, for example, M4 in the four configurations 211 is 3750 Hz, (−3750) Hz, 22500 Hz and (−22500) Hz respectively.

In some embodiments, the first signal may include three second structures each with configuration 211, where M4 may have different values in three configurations 211. In an embodiment, M4 has a different value in each of the three configurations 211, for example, M4 in the three configurations 211 is 3750 Hz, (−3750) Hz and 22500 Hz respectively, or M4 in the three configurations 211 is 3750 Hz, (−3750) Hz and (−22500) Hz respectively, or M4 in the three configurations 211 is 3750 Hz, 22500 Hz and (−22500) Hz respectively, or M4 in the three configurations 211 is (−3750) Hz, 22500 Hz and (−22500) Hz respectively.

Configuration 212: the number of symbols in the symbol group is 2, the subcarrier spacing is 3750 Hz, M4 is 3750 Hz, (−3750) Hz, 22500 Hz or (−22500) Hz, and the length of the CP is 66.7 us.

In some embodiments, the first signal may include two second structures each with configuration 212, where M4 may have different values in two configurations 212. In an embodiment, M4 has different values in the two configurations 212, for example, M4 in a first configuration 212 is 3750 Hz or (−3750) Hz, and M4 in a second configuration 212 is 22500 Hz or (−22500) Hz.

In some embodiments, the first signal may include four second structures each with configuration 212, where M4 may have different values in four configurations 212. In an embodiment, M4 has a different value in each of the four configurations 212, for example, M4 in the four configurations 212 is 3750 Hz, (−3750) Hz, 22500 Hz and (−22500) Hz respectively.

In some embodiments, the first signal may include three second structures each with configuration 212, where M4 may have different values in three configurations 212. Preferably, M4 has a different value in each of the three configurations 212, for example, M4 in the three configurations 212 is 3750 Hz, (−3750) Hz and 22500 Hz respectively, or M4 in the three configurations 212 is 3750 Hz, (−3750) Hz and (−22500) Hz respectively, or M4 in the three configurations 212 is 3750 Hz, 22500 Hz and (−22500) Hz respectively, or M4 in the three configurations 212 is (−3750) Hz, 22500 Hz and (−22500) Hz respectively.

In some embodiments, the first signal may include a plurality of second structures, where each second structure may be independently configured, and each second structure may be selected from configurations 201 to 212. In an embodiment, each of configurations 201 and 202 occupies 3 consecutive uplink subframes, that is, the configuration information for an uplink subframe and a downlink subframe is the 3 consecutive uplink subframes in configuration 0, 3 or 6.

Each of configurations 203 and 204 occupies 2 consecutive uplink subframes, that is, the configuration information for an uplink subframe and a downlink subframe is 2 consecutive uplink subframes in configuration 1, 4 or 6.

Each of configurations 205 and 206 occupies 1 uplink subframe and part of resources in an uplink pilot time slot (UpPTS) in a special subframe, that is, the configuration information for an uplink subframe and a downlink subframe is an uplink subframe and a special subframe in configuration 2 or 5.

Each of configurations 207 and 208 occupies 3 consecutive uplink subframes, that is, the configuration information for an uplink subframe and a downlink subframe is the 3 consecutive uplink subframes in configuration 0, 3 or 6.

Each of configurations 209 and 210 occupies 2 consecutive uplink subframes, that is, the configuration information for an uplink subframe and a downlink subframe is the 2 consecutive uplink subframes in configuration 1, 4 or 6.

Each of configurations 211 and 212 occupies 1 uplink subframe and part of resources in an uplink pilot time slot (UpPTS) in a special subframe, that is, the configuration information for an uplink subframe and a downlink subframe is the uplink subframe and the special subframe in configuration 2 or 5.

In some embodiments, the second structure may also adopt configurations described below.

Configuration 301: the number of symbols in the symbol group is 4, the subcarrier spacing is 3750 Hz, and K4 is 1, (−1), 6 or (−6). The length of the CP is 8875 time domain sampling intervals, 8876 time domain sampling intervals, 8928 time domain sampling intervals, 8960 time domain sampling intervals, 8922 time domain sampling intervals, 8923 time domain sampling intervals or 8924 time domain sampling intervals. A length of the time domain sampling interval is 32.55 nanoseconds.

In an embodiment, a length of the guard time (GT) corresponding to the CP is 8874 time domain sampling intervals, 8872 time domain sampling intervals, 8928 time domain sampling intervals, 8960 time domain sampling intervals, 8924 time domain sampling intervals, 8922 time domain sampling intervals or 8920 time domain sampling intervals respectively. The length of the time domain sampling interval is 32.55 nanoseconds.

In some embodiments, the first signal may include two second structures each with configuration 301, where K4 may have different values in two configurations 301. In an embodiment, K4 has different values in the two configurations 301, for example, K4 in a first configuration 301 is 1 or (−1), and K4 in a second configuration 301 is 6 or (−6).

In some embodiments, the first signal may include four second structures each with configuration 301, where K4 may have different values in four configurations 301. In an embodiment, K4 has a different value in each of the four configurations 301, for example, K4 in the four configurations 301 is 1, (−1), 6 and (−6) respectively.

In some embodiments, the first signal may include three second structures each with configuration 301, where K4 may have different values in three configurations 301. In an embodiment, K4 has a different value in each of the three configurations 301, for example, K4 in the three configurations 301 is 1, (−1) and 6 respectively, or K4 in the three configurations 301 is 1, (−1) and (−6) respectively, or K4 in the three configurations 301 is 1, 6 and (−6) respectively, or K4 in the three configurations 301 is (−1), 6 and (−6) respectively.

Configuration 302: the number of symbols in the symbol group is 5, the subcarrier spacing is 3750 Hz, and K4 is 1, (−1), 6 or (−6). The length of the CP is selected from a set [3412, 3413, 3414, 3466, 3467, 3468, 3498, 3499, 3500, 3460, 3461, 3462], where a unit of an element in the set is the time domain sampling interval which has a length of 32.55 nanoseconds.

In an embodiment, the length of the guard time (GT) corresponding to the length of the CP is [3416, 3414, 3412, 3468, 3466, 3464, 3500, 3498, 3496, 3464, 3462, 3460] respectively, where a unit of an element in the set is the time domain sampling interval which has a length of 32.55 nanoseconds.

In some embodiments, the first signal may include two second structures each with configuration 302, where K4 may have different values in two configurations 302. In an embodiment, K4 has different values in the two configurations 302, for example, K4 in a first configuration 302 is 1 or (−1), and K4 in a second configuration 302 is 6 or (−6).

In some embodiments, the first signal may include four configurations 302, where K4 may have different values in the four configurations 302. In an embodiment, K4 has a different value in each of the four configurations 302, for example, K4 in the four configurations 302 is 1, (−1), 6 and (−6) respectively.

In some embodiments, the first signal may include three configurations 302, where K4 may have different values in the three configurations 302. In an embodiment, K4 has a different value in each of the three configurations 302, for example, K4 in the three configurations 302 is 1, (−1) and 6 respectively, or K4 in the three configurations 302 is 1, (−1) and (−6) respectively, or K4 in the three configurations 302 is 1, 6 and (−6) respectively, or K4 in the three configurations 302 is (−1), 6 and (−6) respectively.

Configuration 303: the number of symbols in the symbol group is 5, the subcarrier spacing is 3750 Hz, K4 is 1, (−1), 6 or (−6), and the length of the CP is selected from a set [9556, 9557, 9558, 9610, 9611, 9612, 9642, 9643, 9644, 9604, 9605, 9606], where a unit of an element in the set is the time domain sampling interval which has a length of 32.55 nanoseconds.

In an embodiment, the length of the guard time (GT) corresponding to the length of the CP is [9560, 9558, 9556, 9612, 9610, 9608, 9644, 9642, 9640, 9608, 9606, 9604] respectively, where a unit of an element in the set is the time domain sampling interval which has a length of 32.55 nanoseconds.

In some embodiments, the first signal may include two second structures each with configuration 303, where K4 may have different values in two configurations 303. In an embodiment, K4 has different values in the two configurations 303, for example, K4 in a first configuration 303 is 1 or (−1), and K4 in a second configuration 303 is 6 or (−6).

In some embodiments, the first signal may include four second structures each with configuration 303, where K4 may have different values in four configurations 303. In an embodiment, K4 has a different value in each of the four configurations 303, for example, K4 in the four configurations 303 is 1, (−1), 6 and (−6) respectively.

In some embodiments, the first signal may include three second structures each with configuration 303, where K4 may have different values in three configurations 303. In an embodiment, K4 has a different value in each of the three configurations 303, for example, K4 in the three configurations 303 is 1, (−1) and 6 respectively, or K4 in the three configurations 303 is 1, (−1) and (−6) respectively, or K4 in the three configurations 303 is 1, 6 and (−6) respectively, or K4 in the three configurations 303 is (−1), 6 and (−6) respectively.

Configuration 304: the number of symbols in the symbol group is 3, the subcarrier spacing is 3750 Hz, K4 is 1, (−1), 6 or (−6), and the length of the CP is selected from a set [4096, 4148, 4149, 4150, 4180, 4181, 4182, 4144], where a unit of an element in the set is the time domain sampling interval which has a length of 32.55 nanoseconds.

In an embodiment, the length of the guard time (GT) corresponding to the length of the CP is [4096, 4152, 4150, 4148, 4184, 4182, 4180, 4144] respectively, where a unit of an element in the set is the time domain sampling interval which has a length of 32.55 nanoseconds.

In some embodiments, the first signal may include two second structures each with configuration 304, where K4 may have different values in two configurations 304. In an embodiment, K4 has different values in the two configurations 304, for example, K4 in a first configuration 304 is 1 or (−1), and K4 in a second configuration 304 is 6 or (−6).

In some embodiments, the first signal may include four second structures each with configuration 304, where K4 may have different values in four configurations 304. In an embodiment, K4 has a different value in each of the four configurations 304, for example, K4 in the four configurations 304 is 1, (−1), 6 and (−6) respectively.

In some embodiments, the first signal may include three second structures each with configuration 304, where K4 may have different values in three configurations 304. In an embodiment, K4 has a different value in each of the three configurations 304, for example, K4 in the three configurations 304 is 1, −1 and 6 respectively, or K4 in the three configurations 304 is 1, (−1) and (−6) respectively, or K4 in the three configurations 304 is 1, 6 and (−6) respectively, or K4 in the three configurations 304 is (−1), 6 and (−6) respectively.

Configuration 305: the number of symbols in the symbol group is 1, the subcarrier spacing is 3750 Hz, and K4 is 1, (−1), 6 or (−6). The length of the CP is selected from a set [4779, 4780, 4832, 4864, 4826, 4827, 4828], where a unit of an element in the set is the time domain sampling interval which has a length of 32.55 nanoseconds.

In an embodiment, the length of the guard time (GT) corresponding to the length of the CP is [4778, 4776, 4832, 4864, 4828, 4826, 4824] respectively, where a unit of an element in the set is the time domain sampling interval which has a length of 32.55 nanoseconds.

In some embodiments, the first signal may include two second structures each with configuration 305, where K4 may have different values in two configurations 305. In an embodiment, K4 has different values in the two configurations 305, for example, K4 in a first configuration 305 is 1 or (−1), and K4 in a second configuration 305 is 6 or (−6).

In some embodiments, the first signal may include four second structures each with configuration 305, where K4 may have different values in four configurations 305. In an embodiment, K4 has a different value in each of the four configurations 305, for example, K4 in the four configurations 305 is 1, (−1), 6 and (−6) respectively.

In some embodiments, the first signal may include three second structures each with configuration 305, where K4 may have different values in three configurations 305. In an embodiment, K4 has a different value in each of the three configurations 305, for example, K4 in the three configurations 305 is 1, (−1) and 6 respectively, or K4 in the three configurations 305 is 1, (−1) and (−6) respectively, or K4 in the three configurations 305 is 1, 6 and (−6) respectively, or K4 in the three configurations 305 is (−1), 6 and (−6) respectively.

In some embodiments, the first signal may include a plurality of second structures, where each second structure may be independently configured, and each second structure may be selected from configurations 301 to 305. In an embodiment, each of configurations 301 and 302 occupies 3 consecutive uplink subframes, that is, the configuration information for an uplink subframe and a downlink subframe is the 3 consecutive uplink subframes in configuration 0, 3 or 6.

Each of configurations 303 and 304 occupies 2 consecutive uplink subframes, that is, the configuration information for an uplink subframe and a downlink subframe is the 2 consecutive uplink subframes in configuration 1, 4 or 6.

Configuration 305 occupies 1 uplink subframe and part of resources in an uplink pilot time slot (UpPTS) in a special subframe, that is, the configuration information for an uplink subframe and a downlink subframe is the uplink subframe and the special subframe in configuration 2 or 5.

In some embodiments, between the two symbol groups in the second structure, the subcarrier index occupied by the second symbol group may be determined according to the subcarrier index occupied by the first symbol group.

The frequency resource position occupied by the second symbol group may also be determined according to the frequency resource position occupied by the first symbol group.

In some embodiments, when the first signal includes a plurality of second structures, subcarrier indexes or frequency resource positions occupied by symbols of each first symbol group in each second structure may be the same.

The subcarrier indexes or the frequency resource positions occupied by the symbols of the each first symbol group in of the each second structure may be independently configured. For example, the subcarrier index occupied by the symbols of the each first symbol group in each of the plurality of second structures may be randomly selected from a subcarrier set, and may also be configured by the base station; and the frequency resource position occupied by the symbols of the each first symbol group in each of the plurality of second structures may be randomly selected from a frequency resource position set, and may also be configured by the base station.

In some embodiments, a subcarrier index or a frequency resource position occupied by a first symbol group in a subsequent one of the plurality of second structures may be determined according to a subcarrier index or a frequency resource position occupied by a first symbol group in a first one of the plurality of second structures.

For example, a subcarrier index or a frequency resource position occupied by a first symbol group in an n-th second structure differs from the subcarrier index or the frequency resource position occupied by the first symbol group in the first one of the second structures by Delta3, where n is greater than 1. Delta3 is a fixed value or a variable value.

A value of Delta3 may be determined by at least one of: the cell ID or a time domain starting position of the n-th second structure, such as a frame index or a subframe index.

In some embodiments, when two adjacent second structures exist, a subcarrier index or a frequency resource position occupied by a first symbol group in a second one of the two adjacent second structures may be determined according to a subcarrier index or a frequency resource position occupied by a first symbol group in a first one of the two adjacent second structures.

For example, the subcarrier index or the frequency resource position occupied by the first symbol group in the second one of the two adjacent second structures differs from the subcarrier index or the frequency resource position occupied by the first symbol group in the first one of the two adjacent second structures by Delta4. Delta4 is a fixed value or a variable value.

A value of Delta4 may be determined by at least one of: the cell ID or a time domain starting position of the second one of the two adjacent second structures, such as a frame index or a subframe index.

In some embodiments, a configuration of the first structure and/or a configuration of the second structure in the first signal may be determined according to at least one of: a time domain length of consecutive uplink resources; or the configuration information for an uplink subframe and a downlink subframe.

In some embodiments, the uplink resources may be uplink subframes.

The time domain length of consecutive uplink resources is counted within a time window. In an embodiment, a length of the time window may be 5 ms or 10 ms.

In some examples, the configuration of the first structure and/or the configuration of the second structure in the first signal include at least one of: a number of first structures and/or a number of second structures, the length of the cyclic prefix, the number of symbols in the symbol group, the length of the guard time, a difference between subcarrier indexes occupied by two adjacent symbol groups or a difference between frequency resource positions occupied by two adjacent symbol groups.

In some embodiments, the first signal is at least one of a scheduling request (SR) signal, a random access signal or a positioning reference signal.

In another aspect, an embodiment of the present disclosure provides a signal transmitting method. The method includes that a first node transmits a first signal. The first signal includes at least one of: at least one first structure or at least one second structure. Each of the at least one first structure includes at least one symbol group, each of the at least one symbol group in the first structure includes a cyclic prefix and at least one symbol, or includes a cyclic prefix, at least one symbol and guard time, and symbols of each symbol group in the first structure occupy a same subcarrier or a same frequency resource in frequency domain. Each of the at least one second structure includes at least one symbol group, each of the at least one symbol group in the second structure includes a cyclic prefix and at least one symbol, or includes a cyclic prefix, at least one symbol and guard time, and symbols of each symbol group in the second structure occupy a same subcarrier or a same frequency resource in frequency domain.

In an embodiment, the method includes at least one of the following:

Subcarrier indexes or frequency resource positions occupied by symbols of each first symbol group in each of a plurality of first structures are the same.

Subcarrier indexes or frequency resource positions occupied by first symbol groups in a plurality of first structures are independently configured.

A subcarrier index or a frequency resource position occupied by a first symbol group in a subsequent one of a plurality of first structures is determined at least according to a subcarrier index or a frequency resource position occupied by a first symbol group in a first one of the plurality of first structures.

A subcarrier index or a frequency resource position occupied by a first symbol group in a second one of two adjacent first structures is determined at least according to a subcarrier index or a frequency resource position occupied by a first symbol group in a first one of the two adjacent first structures.

In an embodiment, the process in which the subcarrier index or the frequency resource position occupied by the first symbol group in the subsequent one of the plurality of first structures is determined at least according to the subcarrier index or the frequency resource position occupied by the first symbol group in the first one of the plurality of first structures includes: selecting the subcarrier index occupied by the first symbol group in the first one of the plurality of first structures from a first subcarrier index set; and selecting the subcarrier index occupied by the first symbol group in the subsequent one of the plurality of first structures from a second subcarrier index set.

It is to be noted that when there are a plurality of subsequent first structures, each subsequent first structure corresponds to one second subcarrier index set. Different first structures may correspond to a same second subcarrier set, or the second subcarrier set may be independently configured for each first structure.

In an embodiment, the first subcarrier index set includes a same subcarrier index as that of the second subcarrier index set.

In an embodiment, in response to determining that the subcarrier index occupied by the first symbol group in the first one of the plurality of first structures belongs to a subset 1 of the first subcarrier index set, the subcarrier index occupied by the first symbol group in the subsequent one of the plurality of first structures is selected from a subset 1 of the second subcarrier index set. In response to determining that the subcarrier index occupied by the first symbol group in the first one of the plurality of first structures belongs to a subset 2 of the first subcarrier index set, the subcarrier index occupied by the first symbol group in the subsequent one of the plurality of first structures is selected from a subset 2 of the second subcarrier index set. The first subcarrier index set includes the subset 1 of the first subcarrier index set and the subset 2 of the first subcarrier index set, and the second subcarrier index set includes the subset 1 of the second subcarrier index set and the subset 2 of the second subcarrier index set.

It can be understood that for the subset 1 of the second subcarrier index set, the subset 1 corresponding to each subsequent first structure may be the same or independently configured.

In an embodiment, the subset 1 of the first subcarrier index set includes a subcarrier index different from that of the subset 2 of the first subcarrier index set; the subset 1 of the first subcarrier index set has a same number of subcarrier indexes as that of the subset 2 of the first subcarrier index set; the subset 1 of the second subcarrier index set includes a subcarrier index different from that of the subset 2 of the second subcarrier index set; or the subset 1 of the second subcarrier index set has a same number of subcarrier indexes as that of the subset 2 of the second subcarrier index set.

In an embodiment, the process in which the subcarrier index or the frequency resource position occupied by the first symbol group in the second one of the two adjacent first structures is determined at least according to the subcarrier index or the frequency resource position occupied by the first symbol group in the first one of the two adjacent first structures includes: selecting the subcarrier index occupied by the first symbol group in the first one of the two adjacent first structures from the first subcarrier index set; and selecting the subcarrier index occupied by the first symbol group in the second one of the two adjacent first structures from the second subcarrier index set.

In an embodiment, the first subcarrier index set includes the same subcarrier index as that of the second subcarrier index set.

In an embodiment, in response to determining that the subcarrier index occupied by the first symbol group in the first one of the two adjacent first structures belongs to the subset 1 of the first subcarrier index set, the subcarrier index occupied by the first symbol group in the second one of the two adjacent first structures is selected from the subset 1 of the second subcarrier index set. In response to determining that the subcarrier index occupied by the first symbol group in the first one of the two adjacent first structures belongs to the subset 2 of the first subcarrier index set, the subcarrier index occupied by the first symbol group in the second one of the two adjacent first structures is selected from the subset 2 of the second subcarrier index set. The first subcarrier index set includes the subset 1 of the first subcarrier index set and the subset 2 of the first subcarrier index set, and the second subcarrier index set includes the subset 1 of the second subcarrier index set and the subset 2 of the second subcarrier index set.

Exemplarily, the method includes at least one of the following:

The subset 1 of the first subcarrier index set includes the subcarrier index different from that of the subset 2 of the first subcarrier index set.

The subset 1 of the first subcarrier index set has the same number of subcarrier indexes as that of the subset 2 of the first subcarrier index set.

The subset 1 of the second subcarrier index set includes the subcarrier index different from that of the subset 2 of the second subcarrier index set.

The subset 1 of the second subcarrier index set has the same number of subcarrier indexes as that of the subset 2 of the second subcarrier index set.

Exemplarily, the method includes at least one of the following:

Subcarrier indexes or frequency resource positions occupied by symbols of each first symbol group in each of a plurality of second structures are the same.

Subcarrier indexes or frequency resource positions occupied by first symbol groups in a plurality of second structures are independently configured.

A subcarrier index or a frequency resource position occupied by a first symbol group in a subsequent one of a plurality of second structures is determined at least according to a subcarrier index or a frequency resource position occupied by a first symbol group in a first one of the plurality of second structures.

A subcarrier index or a frequency resource position occupied by a first symbol group in a second one of two adjacent second structures is determined at least according to a subcarrier index or a frequency resource position occupied by a first symbol group in a first one of the two adjacent second structures.

In an embodiment, the process in which the subcarrier index or the frequency resource position occupied by the first symbol group in the subsequent one of the plurality of second structures is determined at least according to the subcarrier index or the frequency resource position occupied by the first symbol group in the first one of the plurality of second structures includes processes described below.

The subcarrier index occupied by the first symbol group in the first one of the plurality of second structures is selected from the first subcarrier index set.

The subcarrier index occupied by the first symbol group in the subsequent one of the plurality of second structures is selected from the second subcarrier index set.

It is to be noted that when there are a plurality of subsequent second structures, each subsequent second structure corresponds to one second subcarrier index set. Different second structures may correspond to a same second subcarrier set, or the second subcarrier set may be independently configured for each second structure.

In an embodiment, the first subcarrier index set includes the same subcarrier index as that of the second subcarrier index set.

In an embodiment, in response to determining that the subcarrier index occupied by the first symbol group in the first one of the plurality of second structures belongs to the subset 1 of the first subcarrier index set, the subcarrier index occupied by the first symbol group in the subsequent one of the plurality of second structures is selected from the subset 1 of the second subcarrier index set. In response to determining that the subcarrier index occupied by the first symbol group in the first one of the plurality of second structures belongs to the subset 2 of the first subcarrier index set, the subcarrier index occupied by the first symbol group in the subsequent one of the plurality of second structures is selected from the subset 2 of the second subcarrier index set. The first subcarrier index set includes the subset 1 of the first subcarrier index set and the subset 2 of the first subcarrier index set, and the second subcarrier index set includes the subset 1 of the second subcarrier index set and the subset 2 of the second subcarrier index set.

It can be understood that the subset 1 corresponding to each subsequent second structure may be the same or independently configured. The subset 1 corresponding to each subsequent second structure may be the same or independently configured.

Exemplarily, the first one of the plurality of second structures includes at least one of: a first one of the plurality of second structures in the first signal; a first one of the plurality of second structures for a determined value of K4 in the first signal; a first one of the plurality of second structures for a determined value of M4 in the first signal; a first one of the plurality of second structures for a determined absolute value of K4 in the first signal; or a first one of the plurality of second structures for a determined absolute value of M4 in the first signal.

Exemplarily, the subsequent one of the plurality of second structures includes at least one of: a second structure after the first one of the plurality of second structures; among second structures after the first one of the plurality of second structures, a second structure with a same value of K4 as that of the first one of the plurality of second structures; among second structures after the first one of the plurality of second structures, a second structure with a same value of M4 as that of the first one of the plurality of second structures; among second structures after the first one of the plurality of second structures, a second structure with a same absolute value of K4 as that of the first one of the plurality of second structures; or among second structures after the first one of the plurality of second structures, a second structure with a same absolute value of M4 as that of the first one of the plurality of second structures.

Exemplarily, the method includes at least one of the following:

The subset 1 of the first subcarrier index set includes the subcarrier index different from that of the subset 2 of the first subcarrier index set.

The subset 1 of the first subcarrier index set has the same number of subcarrier indexes as that of the subset 2 of the first subcarrier index set.

The subset 1 of the second subcarrier index set includes the subcarrier index different from that of the subset 2 of the second subcarrier index set.

The subset 1 of the second subcarrier index set has the same number of subcarrier indexes as that of the subset 2 of the second subcarrier index set.

In an embodiment, the process in which the subcarrier index or the frequency resource position occupied by the first symbol group in the second one of the two adjacent second structures is determined at least according to the subcarrier index or the frequency resource position occupied by the first symbol group in the first one of the two adjacent second structures includes processes described below.

The subcarrier index occupied by the first symbol group in the first one of the two adjacent second structures is selected from the first subcarrier index set.

The subcarrier index occupied by the first symbol group in the second one of the two adjacent second structures is selected from the second subcarrier index set.

In an embodiment, the first subcarrier index set includes the same subcarrier index as that of the second subcarrier index set.

In an embodiment, in response to determining that the subcarrier index occupied by the first symbol group in the first one of the two adjacent second structures belongs to the subset 1 of the first subcarrier index set, the subcarrier index occupied by the first symbol group in the second one of the two adjacent second structures is selected from the subset 1 of the second subcarrier index set.

In response to determining that the subcarrier index occupied by the first symbol group in the first one of the two adjacent second structures belongs to the subset 2 of the first subcarrier index set, the subcarrier index occupied by the first symbol group in the second one of the two adjacent second structures is selected from the subset 2 of the second subcarrier index set.

The first subcarrier index set includes the subset 1 of the first subcarrier index set and the subset 2 of the first subcarrier index set, and the second subcarrier index set includes the subset 1 of the second subcarrier index set and the subset 2 of the second subcarrier index set.

Exemplarily, the first one of the two adjacent second structures includes at least one of: the first one of the plurality of second structures in the first signal; the first one of the plurality of second structures for the determined value of K4 in the first signal; the first one of the plurality of second structures for the determined value of M4 in the first signal; the first one of the plurality of second structures for the determined absolute value of K4 in the first signal; or the first one of the plurality of second structures for the determined absolute value of M4 in the first signal.

Exemplarily, the second one of the two adjacent second structures includes at least one of: a second structure after the first one of the two adjacent second structures; among second structures after the first one of the two adjacent second structures, a second structure with a same value of K4 as that of the first one of the two adjacent second structures; among second structures after the first one of the two adjacent second structures, a second structure with a same value of M4 as that of the first one of the two adjacent second structures; among second structures after the first one of the two adjacent second structures, a second structure with a same absolute value of K4 as that of the first one of the two adjacent second structures; or among second structures after the first one of the two adjacent second structures, a second structure with a same absolute value of M4 as that of the first one of the two adjacent second structures.

Exemplarily, the method includes at least one of the following:

The subset 1 of the first subcarrier index set includes the subcarrier index different from that of the subset 2 of the first subcarrier index set.

The subset 1 of the first subcarrier index set has the same number of subcarrier indexes as that of the subset 2 of the first subcarrier index set.

The subset 1 of the second subcarrier index set includes the subcarrier index different from that of the subset 2 of the second subcarrier index set.

The subset 1 of the second subcarrier index set has the same number of subcarrier indexes as that of the subset 2 of the second subcarrier index set.

In another aspect, an embodiment of the present disclosure further provides a signal transmitting method. The method includes that a first node determines a node type of the first node, and transmits a first signal in response to determining that the node type of the first node satisfies a preset node type. The first signal includes at least one of: at least one first structure or at least one second structure. Each of the at least one first structure includes at least one symbol group, each of the at least one symbol group in the first structure includes a cyclic prefix and at least one symbol, or includes a cyclic prefix, at least one symbol and guard time, and symbols of each symbol group in the first structure occupy a same subcarrier or a same frequency resource in frequency domain. Each of the at least one second structure includes at least one symbol group, each of the at least one symbol group in the second structure includes a cyclic prefix and at least one symbol, or includes a cyclic prefix, at least one symbol and guard time, and symbols of each symbol group in the second structure occupy a same subcarrier or a same frequency resource in frequency domain.

In an embodiment, the process of transmitting the first signal in response to determining that the node type of the first node satisfies the preset node type includes processes described below.

The first node determines that the node type of the first node is a first type of first node.

When transmitting the first signal on a first signal resource at a level 0, the first node performs at least one of operations described below.

In response to determining that a number of times the first node transmits the first signal reaches a*T0, a number of transmissions of the first signal is set to an initial value, where a is an integer greater than or equal to 1, T0 is an integer greater than or equal to 1, and T0 is an upper limit of the number of transmissions of the first signal or configured by a base station.

In response to determining that a number of times the first node transmits the first signal reaches (a*T0+1), a number of transmissions of the first signal is set to an initial value, where a is an integer greater than or equal to 1, and T0 is an integer greater than or equal to 1.

In response to determining that a target received power value for the first signal that is transmitted by the first node is greater than or equal to a threshold B, a number of transmissions of the first signal is set to an initial value, where B is a threshold configured by a base station which is a real number.

It is to be noted that both the first type of first node and a second type of first node may transmit the first signal at the level 0. A difference is that the first type of first node is not allowed to transmit the first signal at levels 1 and 2, while the second type of first node is allowed to transmit the first signal at the levels 1 and 2.

In an embodiment, when transmitting the first signal on the first signal resource at the level 0, in response to determining that the number of times the first node transmits the first signal is Q or (Q+1), the first node no longer transmits a random access signal, where Q is an upper limit of the number of transmissions of the first signal and configured by the base station.

It is to be noted that the level is a coverage enhancement level, for example, three levels are included. A terminal measures reference signal received power (RSRP), estimates a path loss (PL) through the RSRP, or estimates a coupling loss (CL) through the RSRP, and selects an appropriate coverage enhancement level according to a range where the RSRP or the PL or the CL is located. Each level is configured with a corresponding first signal resource which may include a time-frequency domain resource or a codeword resource for transmitting the first signal.

Exemplarily, the first type of first node satisfies at least one of conditions described below.

The coupling loss (CL) satisfies that $CL \leq MCL\_0 - Delta\_0\_CL$.

The reference signal received power (RSRP) satisfies that $RSRP \geq MRSRP\_0 + Delta\_0\_RSRP$.

The path loss (PL) satisfies that $PL \leq MPL\_0 - Delta\_0\_PL$.

MCL_0 is a CL threshold corresponding to the level 0, MRSRP_0 is an RSRP threshold corresponding to the level 0, MPL_0 is a PL threshold corresponding to the level 0, Delta_0_CL is a measurement error of the CL corresponding to the level 0, Delta_0_RSRP is a measurement error of the RSRP corresponding to the level 0, and Delta_0_PL is a measurement error of the PL corresponding to the level 0.

In an embodiment, the first node determines that the node type of the first node is the second type of first node; and the first node sets the number of transmissions of the first signal to the initial value before transmitting the first signal on a first signal resource at a level j for a first time, where j is greater than 0.

In an embodiment, an initial received power value for transmitting the first signal corresponding to the level j and an initial received power value for transmitting the first signal corresponding to the level 0 are independently configured; and a power ramping step value for transmitting the first signal corresponding to the level j and a power ramping step value for transmitting the first signal corresponding to the level 0 are independently configured.

Exemplarily, the second type of first node satisfies at least one of conditions described below.

The coupling loss (CL) satisfies that $MCL\_0 - Delat\_0\_CL < CL \leq MCL\_0$.

The reference signal received power (RSRP) satisfies that $MRSRP\_0 \leq RSRP < MRSRP\_0 + Delat\_0\_RSRP$.

The path loss (PL) satisfies that $MPL\_0 - Delat\_0\_PL < PL \leq MPL\_0$.

MCL_0 is the CL threshold corresponding to the level 0, MRSRP_0 is the RSRP threshold corresponding to the level 0, MPL_0 is the PL threshold corresponding to the level 0, Delta_0_CL is the measurement error of the CL corresponding to the level 0, Delta_0_RSRP is the measurement error of the RSRP corresponding to the level 0, and Delta_0_PL is the measurement error of the PL corresponding to the level 0.

An embodiment of the present disclosure further provides a signal transmitting system including a first node.

The first node is configured to transmit a first signal to a second node, where the first signal includes at least one of: at least one first structure or at least one second structure.

Each of the at least one first structure includes at least one symbol group.

Each of the at least one symbol group in the first structure includes a cyclic prefix and at least one symbol, or includes a cyclic prefix, at least one symbol and guard time.

Symbols of each symbol group in the first structure occupy a same subcarrier or a same frequency resource in frequency domain.

Each of the at least one second structure includes at least one symbol group.

Each of the at least one symbol group in the second structure includes a cyclic prefix and at least one symbol, or includes a cyclic prefix, at least one symbol and guard time.

Symbols of each symbol group in the second structure occupy a same subcarrier or a same frequency resource in frequency domain.

The first node determines a configuration of the first structure and/or a configuration of the second structure in the first signal according to at least one of: a time domain length of consecutive uplink resources or configuration information for an uplink subframe and a downlink subframe.

An embodiment of the present disclosure further provides a signal transmitting method. The method includes a process described below.

A first node transmits a first signal, where the first signal includes at least 8 symbol groups.

The 8 symbol groups are configured in 4 time-frequency resources, where 2 symbol groups are configured in a same time-frequency resource.

In the embodiment of the present disclosure, the first signal supports repeated transmissions.

In an embodiment, the symbol group includes a cyclic prefix and at least one symbol, or the symbol group includes a cyclic prefix, at least one symbol and guard time.

The symbols of each symbol group occupy a same subcarrier or a same frequency resource in frequency domain.

In an embodiment, among the 4 time-frequency resources, subcarrier indexes occupied by 2 symbol groups in a first time-frequency resource differ by (+k1) subcarriers; subcarrier indexes occupied by 2 symbol groups in a second time-frequency resource differ by (−k1) subcarriers; subcarrier indexes occupied by 2 symbol groups in a third time-frequency resource differ by (+k2) subcarriers; and subcarrier indexes occupied by 2 symbol groups in a fourth time-frequency resource differ by (−k2) subcarriers; where k1 is an integer greater than or equal to 1, and k2 is an integer greater than or equal to 1.

Alternatively, among the 4 time-frequency resources, frequency resource positions occupied by 2 symbol groups in a first time-frequency resource differ by (+M1) Hz; frequency resource positions occupied by 2 symbol groups in a second time-frequency resource differ by (−M1) Hz; frequency resource positions occupied by 2 symbol groups in a third time-frequency resource differ by (+M2) Hz; and frequency resource positions occupied by 2 symbol groups in a fourth time-frequency resource differ by (−M2) Hz; where M1 is a real number greater than 0, and M2 is a real number greater than 0.

First, second and other relation terms in the 4 time-frequency resources in this embodiment are merely used for distinguishing one time-frequency resource from another time-frequency resource and do not require or imply that any practical order exist between these time-frequency resources.

In the above description, k1 may be 1, k2 may be 6, M1 may be 3750 Hz, and M2 may be 22500 Hz.

In an embodiment, a number of symbols in the symbol group includes at least one of the following:

The number of symbols in the symbol group is 4, and a subcarrier spacing is 3750 Hz.

When a length of the cyclic prefix is 66.7 us, the number of symbols in the symbol group is 5, and a subcarrier spacing is 3750 Hz.

The number of symbols in the symbol group is 2, and a subcarrier spacing is 3750 Hz.

When a length of the cyclic prefix is 66.7 us, the number of symbols in the symbol group is 3, and a subcarrier spacing is 3750 Hz.

When a length of the cyclic prefix is 66.7 us, the number of symbols in the symbol group is 1, and a subcarrier spacing is 3750 Hz.

In some embodiments, when the number of symbols in the symbol group is 4, the length of the cyclic prefix is 266.7 us or 66.7 us. This configuration is applied to a scenario where 3 consecutive uplink subframes are configured, where corresponding configuration information for an uplink subframe and a downlink subframe is 3 consecutive uplink subframes in configuration indexes 0, 3 and 6.

The length of the cyclic prefix is 66.7 us, and the number of symbols in the symbol group is 5. This configuration is applied to a scenario where 3 consecutive uplink subframes are configured, where corresponding configuration information for an uplink subframe and a downlink subframe is the 3 consecutive uplink subframes in configuration indexes 0, 3 and 6.

When the number of symbols in the symbol group is 2, the length of the cyclic prefix is 266.7 us or 66.7 us. This configuration is applied to a scenario where 2 consecutive uplink subframes are configured, where corresponding configuration information for an uplink subframe and a downlink subframe is 2 consecutive uplink subframes in configuration indexes 1, 4 and 6.

The length of the cyclic prefix is 66.7 us, and the number of symbols in the symbol group is 3. This configuration is applied to a scenario where 2 consecutive uplink subframes are configured, where corresponding configuration information for an uplink subframe and a downlink subframe is the 2 consecutive uplink subframes in configuration indexes 1, 4 and 6.

The length of the cyclic prefix is 66.7 us, and the number of symbols in the symbol group is 1. This configuration is applied to a scenario where 1 consecutive uplink subframe is configured, where corresponding configuration information for an uplink subframe and a downlink subframe is a configuration index 2 and a configuration index 5.

In an embodiment, a time-frequency resource corresponding to the symbol groups is configured in uplink subframes.

In an embodiment, the number of symbols in the symbol group includes at least one of the following:

When the length of the cyclic prefix is 266.7 us, the number of symbols in the symbol group is 1, and the subcarrier spacing is 3750 Hz.

When the length of the cyclic prefix is 66.7 us, the number of symbols in the symbol group is 2, and the subcarrier spacing is 3750 Hz.

In some embodiments, the length of the cyclic prefix is 266.7 us, and the number of symbols in the symbol group is 1. This configuration is applied to a scenario where 1 consecutive uplink subframe is configured, where corresponding configuration information for an uplink subframe and a downlink subframe is the configuration index 2 and the configuration index 5.

The length of the cyclic prefix is 66.7 us, and the number of symbols in the symbol group is 2. This configuration is applied to a scenario where 1 consecutive uplink subframe is configured, where corresponding configuration information for an uplink subframe and a downlink subframe is the configuration index 2 and the configuration index 5.

In an embodiment, a time-frequency resource corresponding to the symbol groups is configured in an uplink subframe and a special subframe.

In practical applications, there are many methods for determining a length of the first structure or the second structure, which are not limited in the embodiments of the present disclosure. Merely examples are described below.

A resource length occupied by the first structure or the second structure in time domain is at least one of: L1, (L1+L2), (L1+L3) or (L1+L2+L3).

L1 is a time domain length of N (N is greater than or equal to 1) consecutive uplink subframes; L2 is a CP length for a first symbol in a first subframe after the N consecutive uplink subframes; L3 an advance of a starting moment (compared with a reference moment) at which the first node transmits the first structure or the second structure, where the reference moment is a starting moment of a first subframe of the N consecutive uplink subframes after system downlink synchronization.

In an embodiment, L1, L2 and L3 are measured by a unit of time domain sampling interval. A length of the time domain sampling interval is preferably 32.55 nanoseconds.

In an embodiment, a time domain length of the subframe, L1, is preferably 1 millisecond. When the length of the time domain sampling interval is 32.55 nanoseconds, the time domain length of the subframe is 30720 time domain sampling intervals. When the length of the time domain sampling interval is 32.55 nanoseconds, L2 is preferably 144 or 160 or 256 time domain sampling intervals. A value of N may optionally be 1, 2, 3, 4 or 5.

In an embodiment, a time domain length of the CP in each symbol group in the first structure or the second structure is the same.

In an embodiment, the number of symbols in each symbol group in the first structure or the second structure is the same.

In an embodiment, in the first structure or the second structure, the time domain length of the CP is greater than or equal to a time domain length of the guard time.

An embodiment of the present disclosure further provides a signal transmitting method. The method includes a process described below.

A first node transmits a first signal, where the first signal includes at least 6 symbol groups.

The 6 symbol groups are configured in 2 time-frequency resources, where 3 symbol groups are configured in a same time-frequency resource.

The 2 time-frequency resources are discretely distributed in time domain.

In the embodiment of the present disclosure, the first signal supports repeated transmissions.

In an embodiment, the symbol group includes a cyclic prefix and at least one symbol, or the symbol group includes a cyclic prefix, at least one symbol and guard time.

The symbols of each symbol group occupy a same subcarrier or a same frequency resource in frequency domain.

In an embodiment, between the 2 time-frequency resources, among 3 symbol groups in a first time-frequency resource, subcarrier indexes occupied by first and second symbol groups differ by (+k1) subcarriers; among the 3 symbol groups in the first time-frequency resource, subcarrier indexes occupied by second and third symbol groups differ by (−k1) subcarriers; among 3 symbol groups in a second time-frequency resource, subcarrier indexes occupied by first and second symbol groups differ by (+k2) subcarriers; and among the 3 symbol groups in the second time-frequency resource, subcarrier indexes occupied by second and third symbol groups differ by (−k2) subcarriers;

where k1 is an integer greater than or equal to 1, and k2 is an integer greater than or equal to 1.

Alternatively, between the 2 time-frequency resources, among 3 symbol groups in a first time-frequency resource, frequency resource positions occupied by first and second symbol groups differ by (+M1) Hz; among the 3 symbol groups in the first time-frequency resource, frequency resource positions occupied by second and third symbol groups differ by (−M1) Hz; among 3 symbol groups in a second time-frequency resource, frequency resource positions occupied by first and second symbol groups differ by (+M2) Hz; and among the 3 symbol groups in the second time-frequency resource, frequency resource positions occupied by second and third symbol groups differ by (−M2) Hz; where M1 is a real number greater than 0, and M2 is a real number greater than 0.

First, second and other relation terms in the 2 time-frequency resources in this embodiment are merely used for distinguishing one time-frequency resource from another time-frequency resource and do not require or imply that any practical order exist between these time-frequency resources.

In an embodiment, k1 is preferably 1, k2 is preferably 6, M1 is preferably 3750 Hz, and M2 is preferably 22500 Hz.

In an embodiment, a number of symbols in the symbol group includes at least one of the following:

The number of symbols in the symbol group is 2, and a subcarrier spacing is 3750 Hz.

When a length of the cyclic prefix is 66.7 us, the number of symbols in the symbol group is 3, and a subcarrier spacing is 3750 Hz.

In some embodiments, when the number of symbols in the symbol group is 2, the length of the cyclic prefix is 266.7 us or 66.7 us. This configuration is applied to a scenario where 3 consecutive uplink subframes are configured, where corresponding configuration information for an uplink subframe and a downlink subframe is 3 consecutive uplink subframes in configuration indexes 0, 3 and 6.

The length of the cyclic prefix is 66.7 us, and the number of symbols in the symbol group is 3. This configuration is applied to a scenario where 3 consecutive uplink subframes are configured, where corresponding configuration information for an uplink subframe and a downlink subframe is the 3 consecutive uplink subframes in configuration indexes 0, 3 and 6.

In an embodiment, a time-frequency resource corresponding to the symbol groups is configured in uplink subframes.

In an embodiment, the first signal is at least one of a scheduling request (SR) signal, a random access signal or a positioning reference signal.

An embodiment of the present disclosure further provides a signal transmitting method. The method includes a process described below.

A first node transmits a first signal, where the first signal includes at least 6 symbol groups.

The 6 symbol groups are configured in 3 time-frequency resources, where 2 symbol groups are configured in a same time-frequency resource.

In the embodiment of the present disclosure, the first signal supports repeated transmissions.

In an embodiment, the symbol group includes a cyclic prefix and at least one symbol, or the symbol group includes a cyclic prefix, at least one symbol and guard time.

The symbols of each symbol group occupy a same subcarrier or a same frequency resource in frequency domain.

In an embodiment, among the 3 time-frequency resources, subcarrier indexes occupied by 2 symbol groups in a first time-frequency resource differ by (+k1) subcarriers; subcarrier indexes occupied by 2 symbol groups in a second time-frequency resource differ by (−k1) subcarriers; and subcarrier indexes occupied by 2 symbol groups in a third time-frequency resource differ by (+k2) subcarriers or (−k2) subcarriers; where k1 is an integer greater than or equal to 1, and k2 is an integer greater than or equal to 1.

Alternatively, among the 3 time-frequency resources, frequency resource positions occupied by 2 symbol groups in a first time-frequency resource differ by (+M1) Hz; frequency resource positions occupied by 2 symbol groups in a second time-frequency resource differ by (−M1) Hz; and frequency resource positions occupied by 2 symbol groups in a third time-frequency resource differ by (+M2) Hz or (−M2) Hz; where M1 is a real number greater than 0, and M2 is a real number greater than 0.

First, second and other relation terms in the 3 time-frequency resources in this embodiment are merely used for distinguishing one time-frequency resource from another time-frequency resource and do not require or imply that any practical order exist between these time-frequency resources.

In the above description, k1 and k2 are selected from 1 and 6, and M1 and M2 are selected from {3750 Hz, 22500 Hz}.

In an embodiment, k1 and k2 preferably have different values, M1 and M2 preferably have different values.

In an embodiment, a number of symbols in the symbol group includes at least one of the following:

The number of symbols in the symbol group is 4, and a subcarrier spacing is 3750 Hz.

When a length of the cyclic prefix is 66.7 us, the number of symbols in the symbol group is 5, and a subcarrier spacing is 3750 Hz.

The number of symbols in the symbol group is 2, and a subcarrier spacing is 3750 Hz.

When a length of the cyclic prefix is 66.7 us, the number of symbols in the symbol group is 3, and a subcarrier spacing is 3750 Hz.

When a length of the cyclic prefix is 66.7 us, the number of symbols in the symbol group is 1, and a subcarrier spacing is 3750 Hz.

In some embodiments, when the number of symbols in the symbol group is 4, the length of the cyclic prefix is 266.7 us or 66.7 us. This configuration is applied to a scenario where 3 consecutive uplink subframes are configured, where corresponding configuration information for an uplink subframe and a downlink subframe is 3 consecutive uplink subframes in configuration indexes 0, 3 and 6.

The length of the cyclic prefix is 66.7 us, and the number of symbols in the symbol group is 5. This configuration is applied to a scenario where 3 consecutive uplink subframes are configured, where corresponding configuration information for an uplink subframe and a downlink subframe is the 3 consecutive uplink subframes in configuration indexes 0, 3 and 6.

When the number of symbols in the symbol group is 2, the length of the cyclic prefix is 266.7 us or 66.7 us. This configuration is applied to a scenario where 2 consecutive uplink subframes are configured, where corresponding configuration information for an uplink subframe and a downlink subframe is 2 consecutive uplink subframes in configuration indexes 1, 4 and 6.

The length of the cyclic prefix is 66.7 us, and the number of symbols in the symbol group is 3. This configuration is applied to a scenario where 2 consecutive uplink subframes are configured, where corresponding configuration information for an uplink subframe and a downlink subframe is the 2 consecutive uplink subframes in configuration indexes 1, 4 and 6.

The length of the cyclic prefix is 66.7 us, and the number of symbols in the symbol group is 1. This configuration is applied to a scenario where 1 consecutive uplink subframe is configured, where corresponding configuration information for an uplink subframe and a downlink subframe is a configuration index 2 and a configuration index 5.

In an embodiment, a time-frequency resource corresponding to the symbol groups is configured in uplink subframes.

In an embodiment, the number of symbols in the symbol group includes at least one of the following:

When the length of the cyclic prefix is 266.7 us, the number of symbols in the symbol group is 1, and the subcarrier spacing is 3750 Hz.

When the length of the cyclic prefix is 66.7 us, the number of symbols in the symbol group is 2, and the subcarrier spacing is 3750 Hz.

In some embodiments, the length of the cyclic prefix is 266.7 us, and the number of symbols in the symbol group is 1. This configuration is applied to a scenario where 1 consecutive uplink subframe is configured, where corresponding configuration information for an uplink subframe and a downlink subframe is the configuration index 2 and the configuration index 5.

The length of the cyclic prefix is 66.7 us, and the number of symbols in the symbol group is 2. This configuration is applied to a scenario where 1 consecutive uplink subframe is configured, where corresponding configuration information for an uplink subframe and a downlink subframe is the configuration index 2 and the configuration index 5.

In an embodiment, a time-frequency resource corresponding to the symbol groups is configured in an uplink subframe and a special subframe.

In an embodiment, the first signal is at least one of a scheduling request (SR) signal, a random access signal or a positioning reference signal.

For a better understanding, some examples are described below.

Example One

A wireless communication system adopts a time division duplex (TDD) working mode, that is, an uplink channel and a downlink channel adopt a same spectrum resource through time division multiplexing (TDM). The uplink channel is configured in an uplink subframe, and the downlink channel is configured in a downlink subframe. The wireless communication system adopts configuration information for the uplink subframe and the downlink subframe (uplink-downlink configuration) shown in Table 1.

TABLE 1

| Configuration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a downlink pilot time slot (DwPTS), a guard period (GP) and an uplink pilot time slot (UpPTS).

Figure 9:
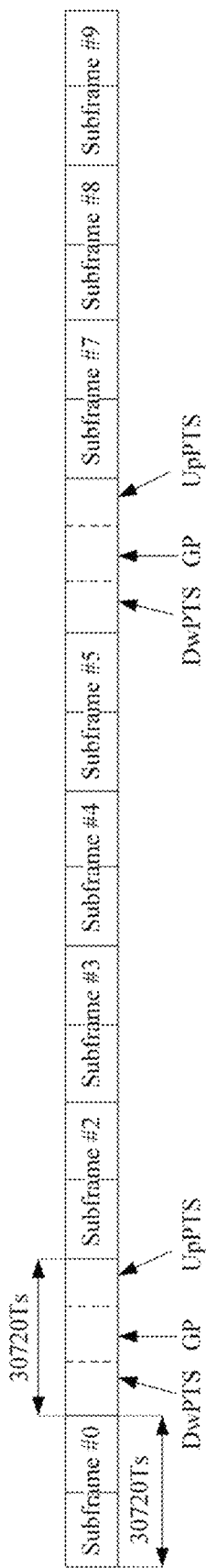
FIG. 9 is a diagram illustrating the distribution of uplink subframes and downlink subframes in 1 frame in example one.

In this embodiment, the configuration information for the uplink subframe and the downlink subframe is configuration 0, and the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

Figure 10:
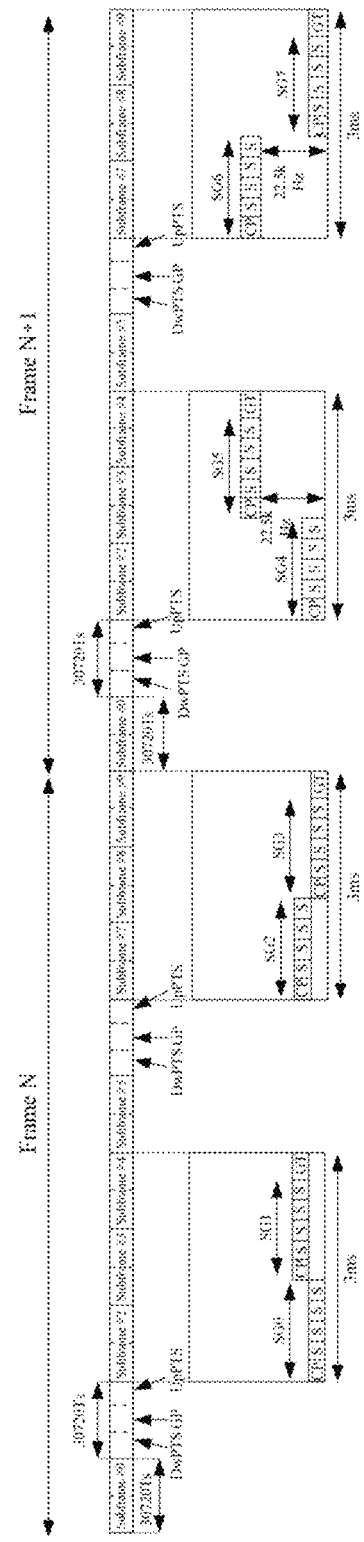
FIG. 10 is a diagram illustrating a structure and a resource configuration of a random access signal in example one.

A terminal transmits a random access signal to a base station. A structure and a resource configuration of the random access signal are shown in FIG. 10. The random access signal occupies 8 symbol groups (SGs), which are SG0 to SG7. Symbols of each symbol group occupy a subcarrier with a same subcarrier index in frequency domain. Each symbol group includes a cyclic prefix (CP) and 4 symbols in time domain. In this embodiment, a subcarrier spacing is $\Delta f=3.75$ kHz, and a length of one symbol is $T=1/\Delta f=0.2667$ ms$=8192\times Ts$. Here, Ts is the time domain sampling interval. In this embodiment, Ts=32.55 ns. The symbol group supports two formats. A CP length corresponding to one format is $8192\times Ts=0.2667$ ms and a CP length corresponding to the other format is $2048\times Ts=0.0667$ ms. In this embodiment, the CP length is $8192\times Ts=0.2667$ ms.

SG0 and SG1 are configured in subframes #2, #3 and #4 of frame N, and subcarrier indexes occupied by SG0 and SG1 differ by (+1) subcarrier spacing (equivalent to (+3750) Hz).

SG2 and SG3 are configured in subframes #7, #8 and #9 of frame N, and subcarrier indexes occupied by SG2 and SG3 differ by (−1) subcarrier spacing (equivalent to (−3750) Hz).

SG4 and SG5 are configured in subframes #2, #3 and #4 of frame N+1, and subcarrier indexes occupied by SG4 and SG5 differ by (+6) subcarrier spacings (equivalent to (+22500) Hz).

SG6 and SG7 are configured in subframes #7, #8 and #9 of frame N+1, and subcarrier indexes occupied by SG6 and SG7 differ by (−6) subcarrier spacings (equivalent to (−22500) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

In addition to this embodiment, when the random access signal supports repeated transmissions, for example, when the random access signal is transmitted twice, the random access signal occupies 16 SGs which are SG0 to SG15, and the repeated transmissions are performed by a group of 8 SGs, that is, SG0 to SG7 and SG8 to SG15 both adopt structures and a subcarrier selection method of SG0 to SG7 in the Example one.

Example Two

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 2.

TABLE 2

| Config-uration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Time domain of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

In this embodiment, the configuration information for the uplink subframe and the downlink subframe is configuration 0, and the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

Figure 11:
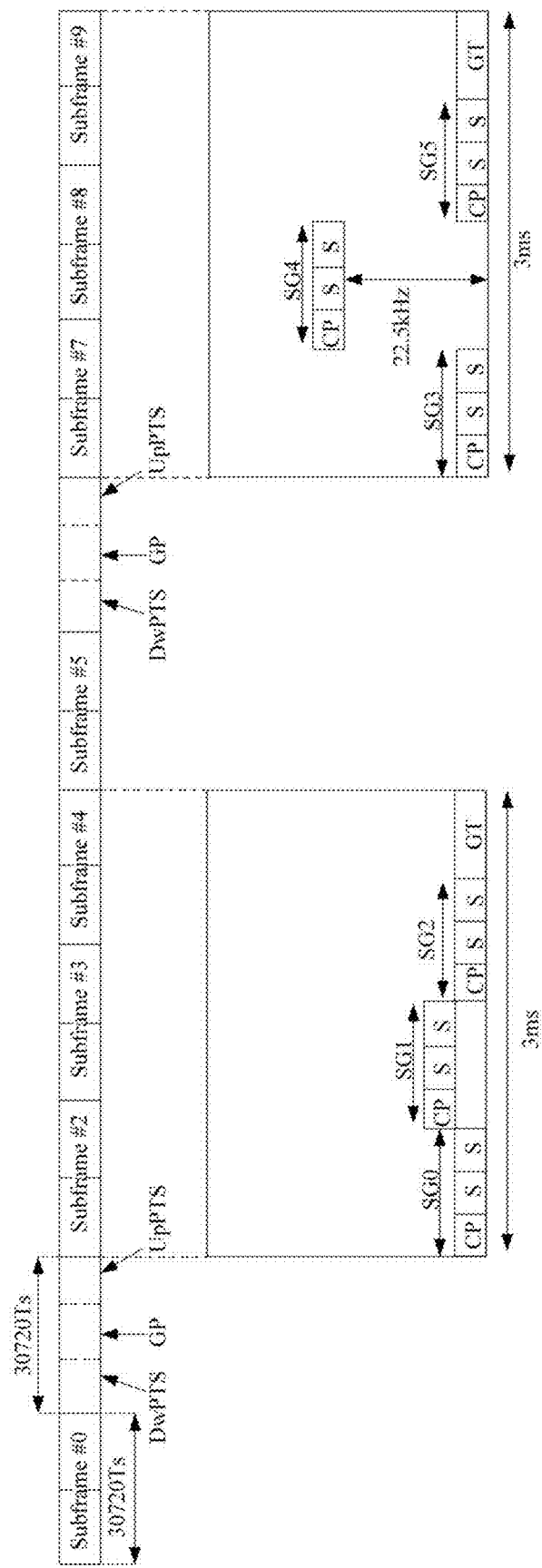
FIG. 11 is a diagram illustrating a structure and a resource configuration of a random access signal in example two.

A terminal transmits a random access signal to a base station. A structure and a resource configuration of the random access signal are shown in FIG. 11. The random access signal occupies 6 SGs, which are SG0 to SG5. Symbols of each symbol group occupy a subcarrier with a same subcarrier index in frequency domain. Each symbol group includes a cyclic prefix (CP) and 2 symbols in the time domain. In this embodiment, a subcarrier spacing is Δf=3.75 kHz, and a length of one symbol is T=1/Δf=0.2667 ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0, SG1 and SG2 are configured in subframes #2, #3 and #4, subcarrier indexes occupied by SG0 and SG1 differ by (+1) subcarrier spacing (equivalent to (+3750) Hz), and subcarrier indexes occupied by SG1 and SG2 differ by (−1) subcarrier spacing (equivalent to (−3750) Hz).

SG3, SG4 and SG5 are configured in subframes #7, #8 and #9, subcarrier indexes occupied by SG3 and SG4 differ by (+6) subcarrier spacings (equivalent to (+22500) Hz), and subcarrier indexes occupied by SG4 and SG5 differ by (−6) subcarrier spacings (equivalent to (−22500) Hz).

SG3 occupies a same subcarrier index as that occupied by SG0, or SG3 occupies a subcarrier index with a difference of Delta than that occupied by SG0. A value of Delta may be determined by at least one of: a cell ID or a time domain starting position of SG3, such as a frame index or a subframe index.

The random access signal supports repeated transmissions. When the random access signal is transmitted twice, the random access signal occupies 12 SGs which are SG0 to SG11, and the repeated transmissions are performed by a group of 6 SGs, that is, SG0 to SG5 and SG6 to SG11 both adopt structures and a subcarrier selection method of SG0 to SG5 in the Example two.

Example Three

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 3.

TABLE 3

| Config-uration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

Figure 12:
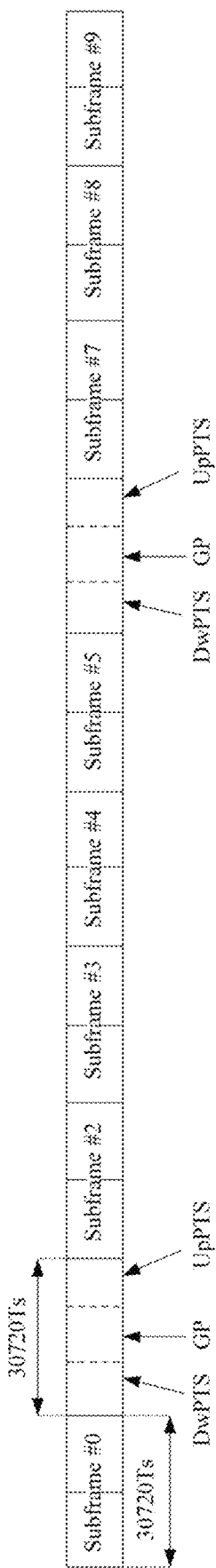
FIG. 12 is a diagram illustrating the distribution of uplink subframes and downlink subframes in 1 frame in example three.

In this embodiment, the configuration information for the uplink subframe and the downlink subframe is configuration 1, and the distribution of uplink subframes and downlink subframes in 1 frame is shown in FIG. 12, that is, subframes #0, #4, #5 and #9 are downlink subframes, subframes #2, #3, #7 and #8 are uplink subframes, and subframes #1 and #6 are special subframes.

Figure 13:
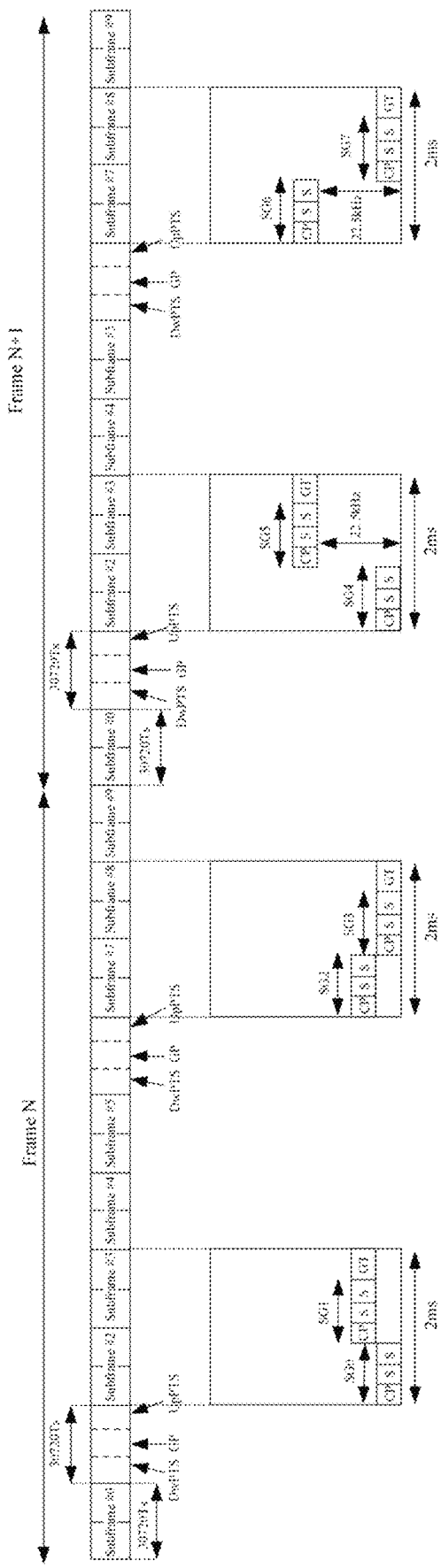
FIG. 13 is a diagram illustrating a structure and a resource configuration of a random access signal in example three.

A terminal transmits a random access signal to a base station. A structure and a resource configuration of the random access signal are shown in FIG. 13. The random access signal occupies 8 SGs, which are SG0 to SG7. Symbols of each symbol group occupy a subcarrier with a same subcarrier index in frequency domain. Each symbol group includes a cyclic prefix (CP) and 2 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2 and #3 of frame N, and subcarrier indexes occupied by SG0 and SG1 differ by (+1) subcarrier spacing (equivalent to (+3750) Hz).

SG2 and SG3 are configured in subframes #7 and #8 of frame N, and subcarrier indexes occupied by SG2 and SG3 differ by (−1) subcarrier spacing (equivalent to (−3750) Hz).

SG4 and SG5 are configured in subframes #2 and #3 of frame N+1, and subcarrier indexes occupied by SG4 and SG5 differ by (+6) subcarrier spacings (equivalent to (+22500) Hz).

SG6 and SG7 are configured in subframes #7 and #8 of frame N+1, and subcarrier indexes occupied by SG6 and SG7 differ by (−6) subcarrier spacings (equivalent to (−22500) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

Example Four

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 4.

TABLE 4

| Configuration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

Figure 14:
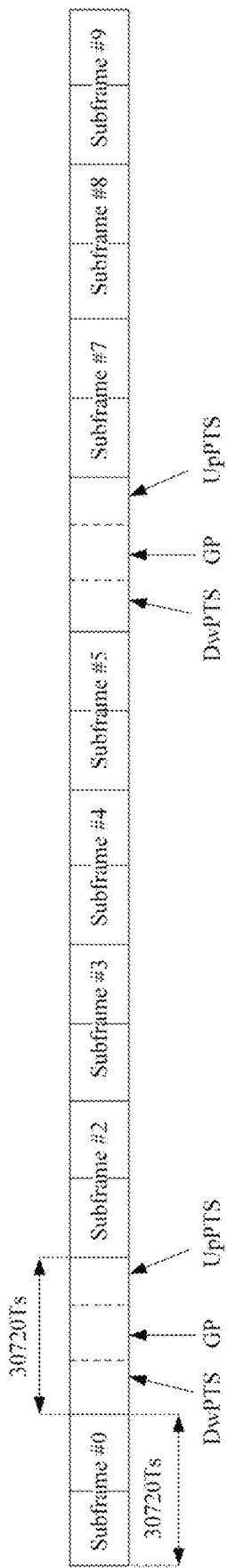
FIG. 14 is a diagram illustrating the distribution of uplink subframes and downlink subframes in 1 frame in example four.

In this embodiment, the configuration information for the uplink subframe and the downlink subframe is configuration 2, and the distribution of uplink subframes and downlink subframes in 1 frame is shown in FIG. 14, that is, subframes #0, #3, #4,#5, #8 and #9 are downlink subframes, subframes #2 and #7 are uplink subframes, and subframes #1 and #6 are special subframes.

Figure 15:
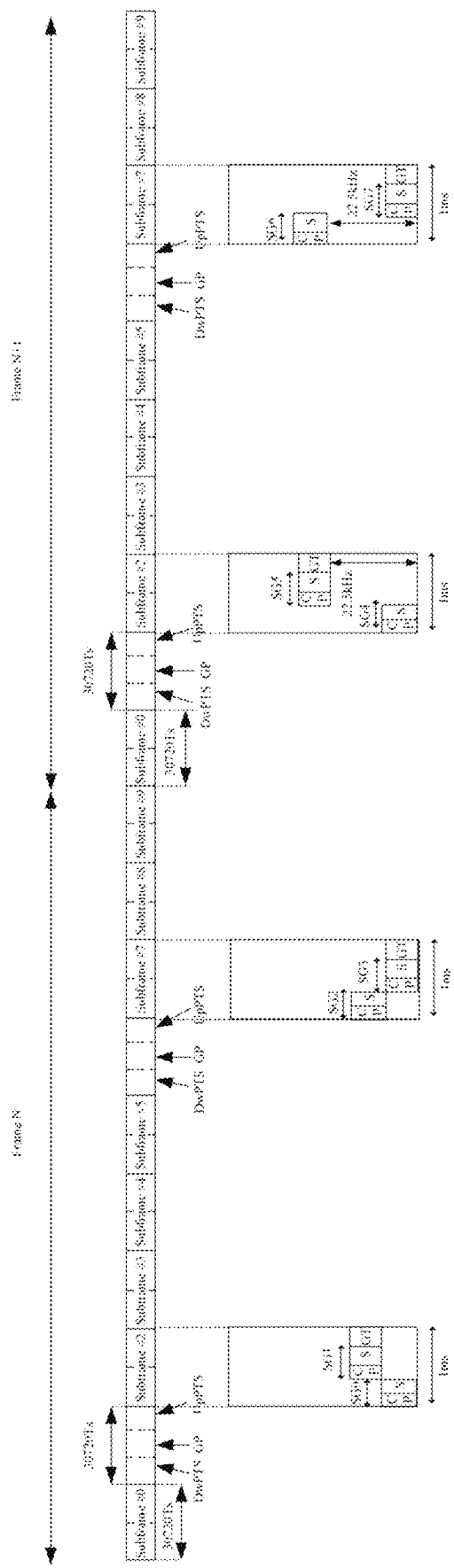
FIG. 15 is a diagram illustrating a structure and a resource configuration of a random access signal in example four.

A terminal transmits a random access signal to a base station. A structure and a resource configuration of the random access signal are shown in FIG. 15. The random access signal occupies 8 SGs, which are SG0 to SG7. Symbols of each symbol group occupy a subcarrier with a same subcarrier index in frequency domain. Each symbol group includes a cyclic prefix (CP) and 1 symbol in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 2048×Ts=0.0667 ms.

SG0 and SG1 are configured in subframe #2 of frame N, and subcarrier indexes occupied by SG0 and SG1 differ by (+1) subcarrier spacing (equivalent to (+3750) Hz).

SG2 and SG3 are configured in subframe #7 of frame N, and subcarrier indexes occupied by SG2 and SG3 differ by (−1) subcarrier spacing (equivalent to (−3750) Hz).

SG4 and SG5 are configured in subframe #2 of frame N+1, and subcarrier indexes occupied by SG4 and SG5 differ by (+6) subcarrier spacings (equivalent to (+22500) Hz).

SG6 and SG7 are configured in subframe #7 of frame N+1, and subcarrier indexes occupied by SG6 and SG7 differ by (−6) subcarrier spacings (equivalent to (−22500) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

Example Five

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 5.

TABLE 5

| Config- uration Index | Downlink- to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

In this embodiment, the configuration information for the uplink subframe and the downlink subframe is configuration 2, and the distribution of uplink subframes and downlink subframes in 1 frame is shown in FIG. 14, that is, subframes #0, #3, #4,#5, #8 and #9 are downlink subframes, subframes #2 and #7 are uplink subframes, and subframes #1 and #6 are special subframes.

Figure 16:
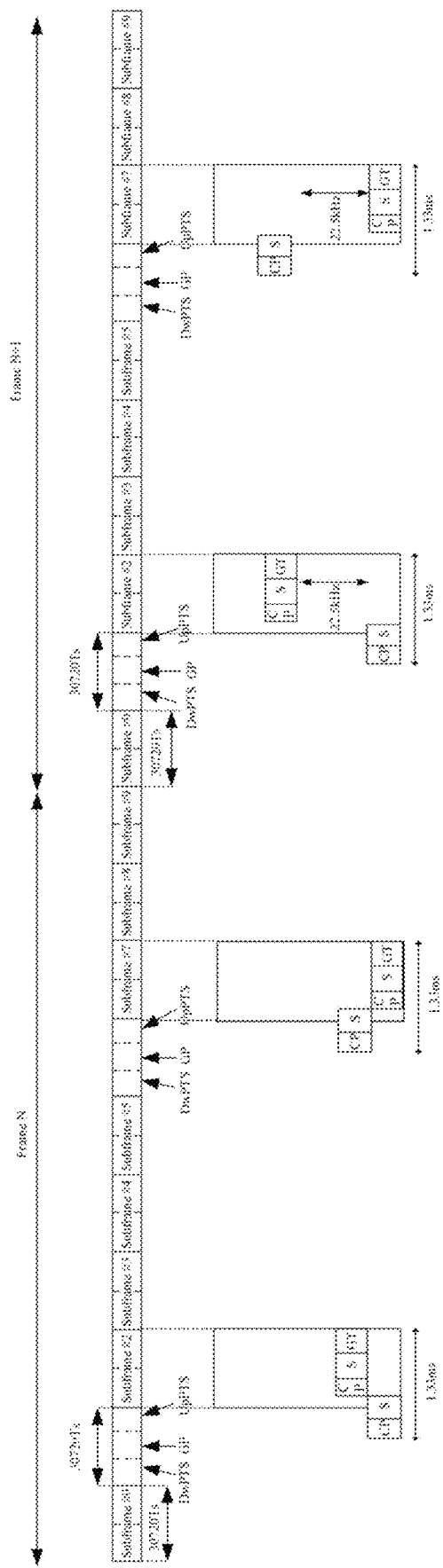
FIG. 16 is a diagram illustrating a structure and a resource configuration of a random access signal in example five.

A terminal transmits a random access signal to a base station. A structure and a resource configuration of the random access signal are shown in FIG. 16. The random access signal occupies 8 SGs, which are SG0 to SG7. Symbols of each symbol group occupy a subcarrier with a same subcarrier index in frequency domain. Each symbol group includes a cyclic prefix (CP) and 1 symbol in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #1 and #2 of frame N, and subcarrier indexes occupied by SG0 and SG1 differ by (+1) subcarrier spacing (equivalent to (+3750) Hz).

SG2 and SG3 are configured in subframes #6 and #7 of frame N, and subcarrier indexes occupied by SG2 and SG3 differ by (−1) subcarrier spacing (equivalent to (−3750) Hz).

SG4 and SG5 are configured in subframes #1 and #2 of frame N+1, and subcarrier indexes occupied by SG4 and SG5 differ by (+6) subcarrier spacings (equivalent to (+22500) Hz).

SG6 and SG7 are configured in subframes #6 and #7 of frame N+1, and subcarrier indexes occupied by SG6 and SG7 differ by (−6) subcarrier spacings (equivalent to (−22500) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

Example Six

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 6.

TABLE 6

| Config- uration Index | Downlink- to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

Figure 17:
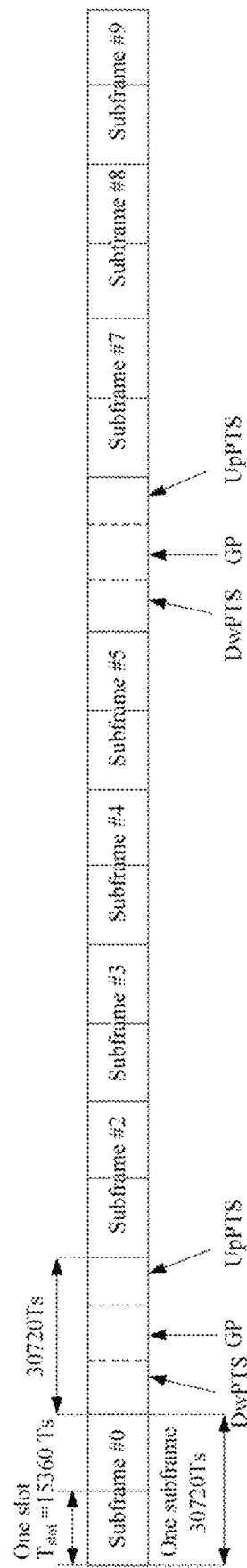
FIG. 17 is a diagram illustrating the distribution of uplink subframes and downlink subframes in 1 frame in example six.

In this embodiment, the configuration information for the uplink subframe and the downlink subframe is configuration 6, and the distribution of uplink subframes and downlink subframes in 1 frame is shown in FIG. 17, that is, subframes #0, #5 and #9 are downlink subframes, subframes #2, #3, #4, #7 and #8 are uplink subframes, and subframes #1 and #6 are special subframes.

Figure 18:
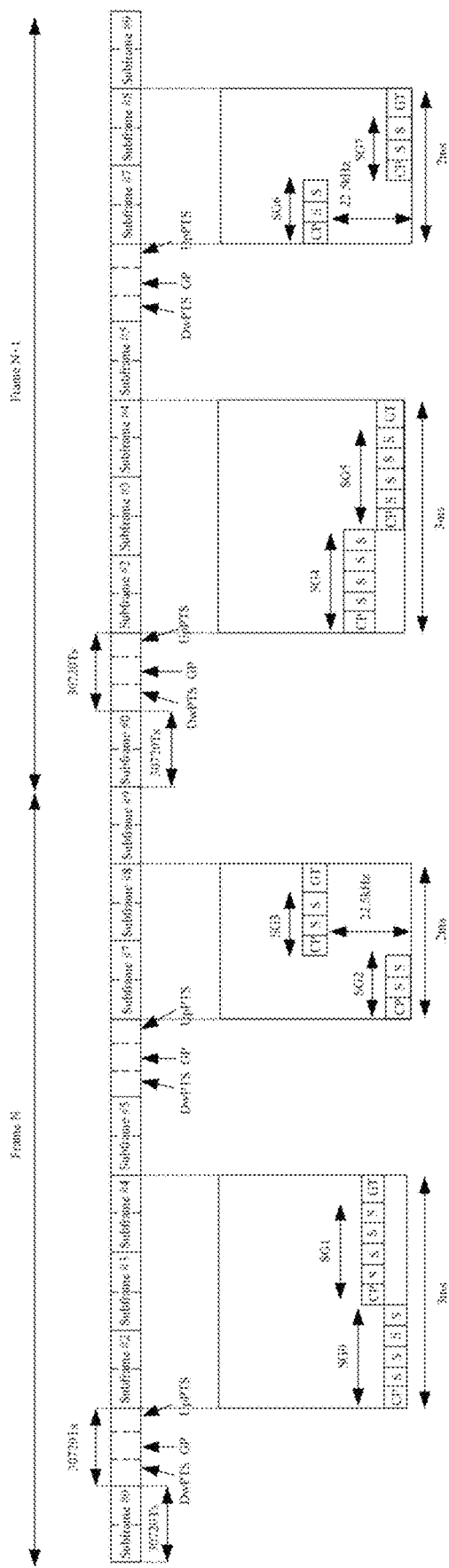
FIG. 18 is a diagram illustrating a structure and a resource configuration of a random access signal in example six.

A terminal transmits a random access signal to a base station. A structure and a resource configuration of the random access signal are shown in FIG. 18. The random access signal occupies 8 SGs, which are SG0 to SG7. Symbols of each symbol group occupy a subcarrier with a same subcarrier index in frequency domain. Each symbol group includes a cyclic prefix (CP) and 4 or 2 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2, #3 and #4 of frame N and each include 4 symbols in the time domain, and subcarrier indexes occupied by SG0 and SG1 differ by (+1) subcarrier spacing (equivalent to (+3750) Hz).

SG2 and SG3 are configured in subframes #7 and #8 of frame N and each include 2 symbols in the time domain, and subcarrier indexes occupied by SG2 and SG3 differ by (+6) subcarrier spacings (equivalent to (+22500) Hz).

SG4 and SG5 are configured in subframes #2, #3 and #4 of frame N+1 and each include 4 symbols in the time domain, and subcarrier indexes occupied by SG4 and SG5 differ by (−1) subcarrier spacing (equivalent to (−3750) Hz).

SG6 and SG7 are configured in subframes #7 and #8 of frame N+1 and each include 2 symbols in the time domain, and subcarrier indexes occupied by SG6 and SG7 differ by (−6) subcarrier spacings (equivalent to (−22500) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

Example Seven

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 7.

TABLE 7

| Configuration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

In this embodiment, the configuration information for the uplink subframe and the downlink subframe is configuration 6, and the distribution of uplink subframes and downlink subframes in 1 frame is shown in FIG. 17, that is, subframes #0, #5 and #9 are downlink subframes, subframes #2, #3, #4, #7 and #8 are uplink subframes, and subframes #1 and #6 are special subframes.

Figure 19:
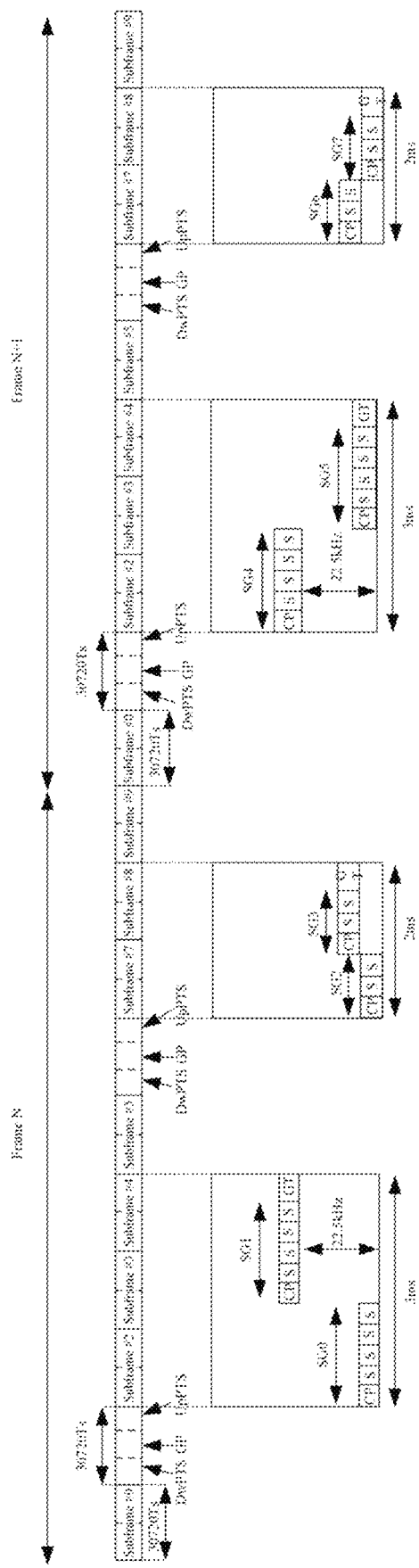
FIG. 19 is a diagram illustrating a structure and a resource configuration of a random access signal in example seven.

A terminal transmits a random access signal to a base station. A structure and a resource configuration of the random access signal are shown in FIG. 19. The random access signal occupies 8 SGs, which are SG0 to SG7. Symbols of each symbol group occupy a subcarrier with a same subcarrier index in frequency domain. Each symbol group includes a cyclic prefix (CP) and 4 or 2 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2, #3 and #4 of frame N and each include 4 symbols in the time domain, and subcarrier indexes occupied by SG0 and SG1 differ by (+6) subcarrier spacings (equivalent to (+22500) Hz).

SG2 and SG3 are configured in subframes #7 and #8 of frame N and each include 2 symbols in the time domain, and subcarrier indexes occupied by SG2 and SG3 differ by (+1) subcarrier spacing (equivalent to (+3750) Hz).

SG4 and SG5 are configured in subframes #2, #3 and #4 of frame N+1 and each include 4 symbols in the time domain, and subcarrier indexes occupied by SG4 and SG5 differ by (−6) subcarrier spacings (equivalent to (−22500) Hz).

SG6 and SG7 are configured in subframes #7 and #8 of frame N+1 and each include 2 symbols in the time domain, and subcarrier indexes occupied by SG6 and SG7 differ by (−1) subcarrier spacing (equivalent to (−3750) Hz).

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

Example Eight

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 8.

TABLE 8

| Config-uration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

In this embodiment, the configuration information for the uplink subframe and the downlink subframe is configuration 1, and the distribution of uplink subframes and downlink subframes in 1 frame is shown in FIG. 12, that is, subframes #0, #4, #5 and #9 are downlink subframes, subframes #2, #3, #7 and #8 are uplink subframes, and subframes #1 and #6 are special subframes.

It is to be noted that a subcarrier selection scheme for a second structure is described by way of examples in this embodiment. Schemes of 6 SGs for configurations 1 to 12 are described in detail.

Figure 20:
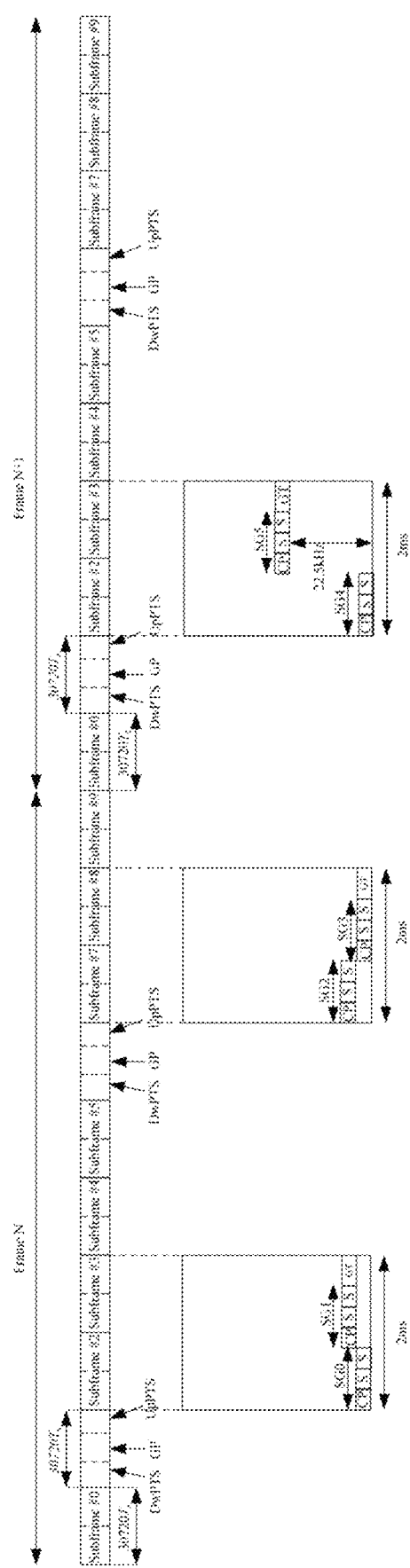
FIG. 20 is a diagram illustrating a structure and a resource configuration of a random access signal in example eight.

A terminal transmits a random access signal to a base station. A structure and a resource configuration of the random access signal are shown in FIG. 20. The random access signal occupies 6 SGs, which are SG0 to SG5. Symbols of each symbol group occupy a subcarrier with a same subcarrier index in frequency domain. Each symbol group includes a cyclic prefix (CP) and 2 symbols in time domain. In this embodiment, a subcarrier spacing is Δf=3.75 kHz, and a length of one symbol is T=1/Δf=0.2667 ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2 and #3 of frame N, and subcarrier indexes occupied by SG0 and SG1 differ by (+1) subcarrier spacing (equivalent to (+3750) Hz).

SG2 and SG3 are configured in subframes #7 and #8 of frame N, and subcarrier indexes occupied by SG2 and SG3 differ by (−1) subcarrier spacing (equivalent to (−3750) Hz).

SG4 and SG5 are configured in subframes #2 and #3 of frame N+1, and subcarrier indexes occupied by SG4 and SG5 differ by (+6) subcarrier spacings (equivalent to (+22500) Hz).

In this embodiment, an allocation scheme of subcarriers occupied by SG0 to SG5 is shown in FIG. 21 and includes the following:

A subcarrier index of SG0 has a correspondence with a subcarrier index of SG1. For example, when the subcarrier index of SG0 is SC0, the subcarrier index of SG1 is SC1, which is numbered CH0.

A subcarrier index of SG2 has a correspondence with a subcarrier index of SG3. For example, when the subcarrier index of SG2 is SC1, the subcarrier index of SG3 is SC0, which is numbered CH0.

A subcarrier index of SG4 has a correspondence with a subcarrier index of SG5. For example, when the subcarrier index of SG4 is SC0, the subcarrier index of SG5 is SC6, which is numbered CH0.

It can be seen that according to the allocation scheme of subcarriers occupied by SG0 to SG5 shown in FIG. 21, the corresponding subcarrier index of SG1 can be determined according to the subcarrier index of SG0 as SC1.

SG0 is selected from a subcarrier index set (for example, including 12 subcarrier indexes of SC0 to SC11), where a selection rule may be to randomly select one from the 12 subcarrier indexes or to select one from the 12 subcarrier indexes according to a determined rule.

The subcarrier index of SG2 is determined according to rules described below.

If the subcarrier index of SG0 is in subset 1 (corresponding numbers are CH0 to CH5), the subcarrier index of SG2 is also selected from CH0 to CH5.

In some embodiments, the subcarrier index of SG2 is randomly selected from subcarriers corresponding to CH0 to CH5 or selected from subcarrier indexes corresponding to CH0 to CH5 according to a determined rule. Alternatively, the subcarrier index occupied by SG2 is selected from the subcarriers corresponding to CH0 to CH5, and a number of the subcarrier index occupied by SG2 has a difference of Delta than a number of the subcarrier index occupied by SG0. A value of Delta is variable and may be determined by at least one of: a cell ID or a time domain starting position of SG2, such as a frame index or a subframe index.

If the subcarrier index of SG0 is in subset 2 (corresponding numbers are CH6 to CH11), the subcarrier index of SG2 is also among CH6 to CH11.

In some embodiments, the subcarrier index of SG2 is randomly selected from subcarriers corresponding to CH6 to CH11 or selected from subcarrier indexes corresponding to CH6 to CH11 according to the determined rule. Alternatively, the subcarrier index occupied by SG2 is selected from the subcarriers corresponding to CH6 to CH11, and the number of the subcarrier index occupied by SG2 has the difference of Delta than the number of the subcarrier index occupied by SG0. The value of Delta is variable and may be determined by at least one of: the cell ID or the time domain starting position of SG2, such as the frame index or the subframe index.

The subcarrier index of SG4 is determined according to rules described below.

If the subcarrier index of SG0 is among CH0 to CH5, the subcarrier index of SG4 is also among CH0 to CH5.

In some embodiments, the subcarrier index of SG4 is randomly selected from subcarriers corresponding to CH0 to CH5 or selected from subcarrier indexes corresponding to CH0 to CH5 according to a determined rule. Alternatively, the subcarrier index occupied by SG4 is selected from the subcarriers corresponding to CH0 to CH5, and a number of the subcarrier index occupied by SG4 has the difference of Delta than the number of the subcarrier index occupied by SG0. The value of Delta is variable and may be determined by at least one of: the cell ID or a time domain starting position of SG4, such as a frame index or a subframe index.

If the subcarrier index of SG0 is among CH6 to CH11, the subcarrier index of SG4 is also among CH6 to CH11. In some embodiments, the subcarrier index of SG4 is randomly selected from subcarriers corresponding to CH6 to CH11 or selected from subcarrier indexes corresponding to CH6 to CH11 according to the determined rule. Alternatively, the subcarrier index occupied by SG4 is selected from the subcarriers corresponding to CH6 to CH11, and the number of the subcarrier index occupied by SG4 has the difference of Delta than the number of the subcarrier index occupied by SG0. The value of Delta is variable and may be determined by at least one of: the cell ID or the time domain starting position of SG4, such as the frame index or the subframe index.

In addition to this embodiment, the subcarrier index of SG4 in s4 may also be determined according to a rule described below.

SG4 is selected from 12 subcarriers (with subcarrier indexes of SC0 to SC11), where a selection rule may be to randomly select one from the 12 subcarriers or to select one from the 12 subcarriers according to a determined rule.

Example Nine

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

In this embodiment, the distribution of subframes in 1 frame is shown in FIG. 12, that is, subframes #0, #4, #5 and #9 are downlink subframes, subframes #2, #3, #7 and #8 are uplink subframes, and subframes #1 and #6 are special subframes.

It is to be noted that a subcarrier selection scheme for a second structure is described by way of examples in this embodiment.

Figure 22:
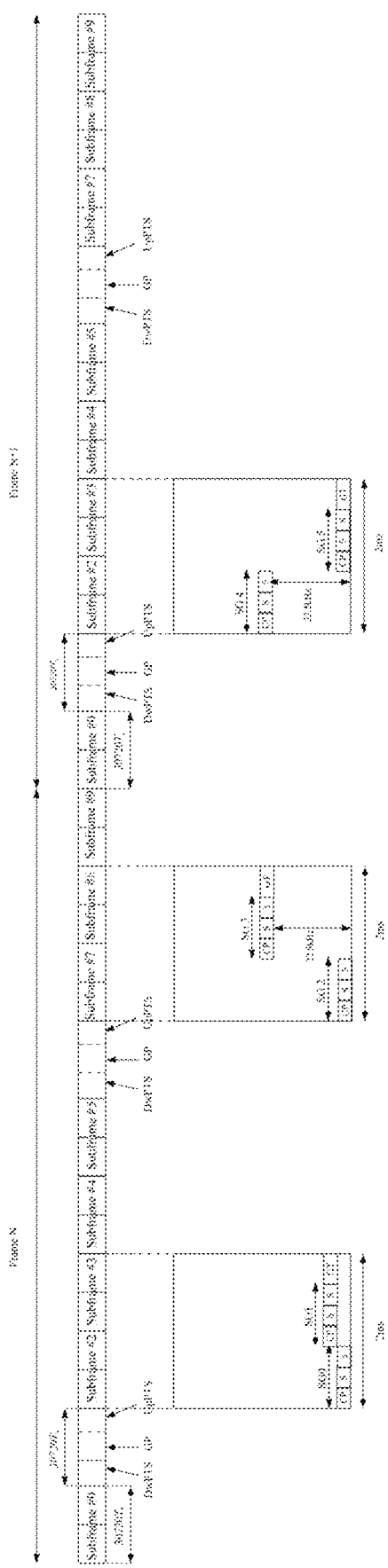
FIG. 22 is a diagram illustrating a structure and a resource configuration of a random access signal in example nine.

A terminal transmits a random access signal to a base station. A structure and a resource configuration of the random access signal are shown in FIG. 22. The random access signal occupies 6 SGs, which are SG0 to SG5. Symbols of each symbol group occupy a subcarrier with a same subcarrier index in frequency domain. Each symbol group includes a cyclic prefix (CP) and 2 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2 and #3 of frame N, and subcarrier indexes occupied by SG0 and SG1 differ by (+1) subcarrier spacing (equivalent to (+3750) Hz).

SG2 and SG3 are configured in subframes #7 and #8 of frame N, and subcarrier indexes occupied by SG2 and SG3 differ by (+6) subcarrier spacings (equivalent to (+22500) Hz).

SG4 and SG5 are configured in subframes #2 and #3 of frame N+1, and subcarrier indexes occupied by SG4 and SG5 differ by (−6) subcarrier spacings (equivalent to (−22500) Hz).

Figure 23:
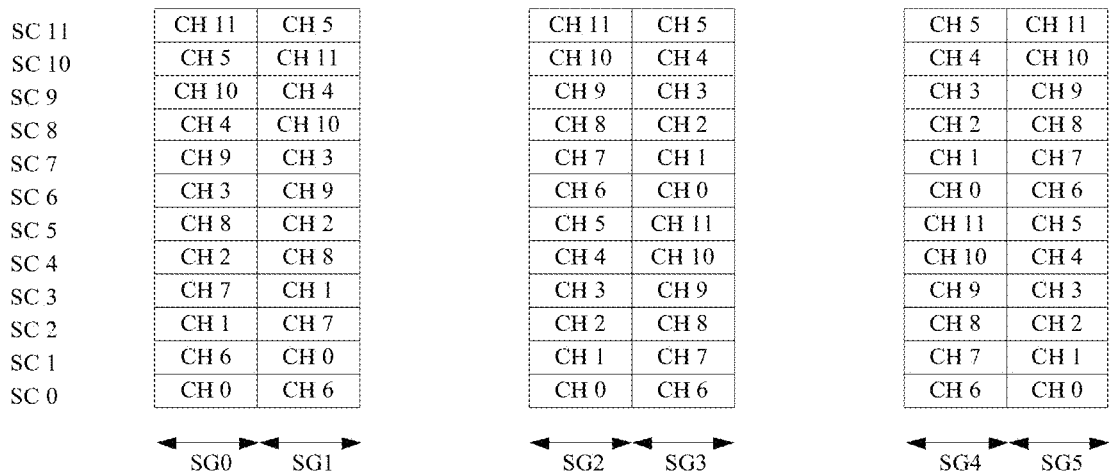
FIG. 23 is a diagram illustrating an allocation scheme of subcarriers occupied by SG0 to SG5 in example nine.

In this embodiment, an allocation scheme of subcarriers occupied by SG0 to SG5 is shown in FIG. 23 and includes the following:

A subcarrier index of SG0 has a correspondence with a subcarrier index of SG1. For example, when the subcarrier index of SG0 is SC0, the subcarrier index of SG1 is SC1, which is numbered CH0.

A subcarrier index of SG2 has a correspondence with a subcarrier index of SG3. For example, when the subcarrier index of SG2 is SC0, the subcarrier index of SG3 is SC6, which is numbered CH0.

A subcarrier index of SG4 has a correspondence with a subcarrier index of SG5. For example, when the subcarrier index of SG4 is SC6, the subcarrier index of SG5 is SC0, which is numbered CH0.

It can be seen that according to the allocation scheme of subcarriers occupied by SG0 to SG5 shown in FIG. 23, the corresponding subcarrier index of SG1 can be determined according to the subcarrier index of SG0 as SC1.

SG0 is selected from a subcarrier index set (including subcarrier indexes SC0 to SC11), where a selection rule may be to randomly select one from 12 subcarriers or to select one from the 12 subcarriers according to a determined rule.

The subcarrier index of SG2 is determined according to rules described below. If the subcarrier index of SG0 is among CH0 to CH5, the subcarrier index of SG2 is also selected from CH0 to CH5. In some embodiments, the subcarrier index of SG2 is randomly selected from subcarrier indexes corresponding to CH0 to CH5 or selected from the subcarrier indexes corresponding to CH0 to CH5 according to a determined rule. Alternatively, the subcarrier index occupied by SG2 is selected from subcarriers corresponding to CH0 to CH5, and the subcarrier index or an index number occupied by SG2 has a difference of Delta than the subcarrier index or an index number occupied by SG0. A value of Delta is variable and may be determined by at least one of: a cell ID or a time domain starting position of SG2, such as a frame index or a subframe index. If the subcarrier index of SG0 is among CH6 to CH11, the subcarrier index of SG2 is also selected from CH6 to CH11. In some embodiments, the subcarrier index of SG2 is randomly selected from subcarrier indexes corresponding to CH6 to CH11 or selected from the subcarrier indexes corresponding to CH6 to CH11 according to the determined rule. Alternatively, the subcarrier index occupied by SG2 is selected from subcarriers corresponding to CH6 to CH11, and the subcarrier index or the index number occupied by SG2 has the difference of Delta than the subcarrier index or the index number occupied by SG0. The value of Delta is variable and may be determined by at least one of: the cell ID or the time domain starting position of SG2, such as the frame index or the subframe index.

The subcarrier index of SG4 is determined according to rules described below. If the subcarrier index of SG0 is among CH0 to CH5, the subcarrier index of SG4 is also selected from CH0 to CH5.

In some embodiments, the subcarrier index of SG4 is randomly selected from subcarrier indexes corresponding to CH0 to CH5 or selected from the subcarrier indexes corresponding to CH0 to CH5 according to a determined rule. Alternatively, the subcarrier index occupied by SG4 is selected from the subcarrier indexes corresponding to CH0 to CH5, and the subcarrier index or an index number occupied by SG4 has the difference of Delta than the subcarrier index or the index number occupied by SG0. The value of Delta is variable and may be determined by at least one of: the cell ID or a time domain starting position of SG4, such as a frame index or a subframe index. If the subcarrier index of SG0 is among CH6 to CH11, the subcarrier index of SG4 is also selected from CH6 to CH11.

In some embodiments, the subcarrier index of SG4 is randomly selected from subcarriers corresponding to CH6 to CH11 or selected from subcarrier indexes corresponding to CH6 to CH11 according to the determined rule. Alternatively, the subcarrier index occupied by SG4 is selected from the subcarriers corresponding to CH6 to CH11, and the subcarrier index or the index number occupied by SG4 has the difference of Delta than the subcarrier index or the index number occupied by SG0. The value of Delta is variable and may be determined by at least one of: the cell ID or the time domain starting position of SG4, such as the frame index or the subframe index.

In addition to this embodiment, the subcarrier index of SG2 and the subcarrier index of SG4 may also be determined according to rules described below. The subcarrier index of SG2 is determined according to the following rule: SG2 is selected from 12 subcarriers (with subcarrier indexes of SC0 to SC11), where a selectin rule may be to randomly select one from the 12 subcarriers or to select one from the 12 subcarriers according to a determined rule. The subcarrier index of SG4 is determined according to rules described below. If the subcarrier index of SG2 is among CH0 to CH5, the subcarrier index of SG4 is also among CH0 to CH5.

In some embodiments, the subcarrier index of SG4 is randomly selected from the subcarriers corresponding to CH0 to CH5 or selected from the subcarriers corresponding to CH0 to CH5 according to a determined rule. Alternatively, the subcarrier index occupied by SG4 is selected from the subcarriers corresponding to CH0 to CH5, and the subcarrier index or the index number occupied by SG4 has the difference of Delta than the subcarrier index or the index number occupied by SG2. The value of Delta is variable and may be determined by at least one of: the cell ID or the time domain starting position of SG4, such as the frame index or the subframe index. If the subcarrier index of SG2 is among CH6 to CH11, the subcarrier index of SG4 is also among CH6 to CH11.

In some embodiments, the subcarrier index of SG4 is randomly selected from the subcarriers corresponding to CH6 to CH11 or selected from the subcarriers corresponding to CH6 to CH11 according to the determined rule. Alternatively, the subcarrier index occupied by SG4 is selected from the subcarriers corresponding to CH6 to CH11, and the subcarrier index or the index number occupied by SG4 has the difference of Delta than the subcarrier index or the index number occupied by SG2. The value of Delta is variable and may be determined by at least one of: the cell ID or the time domain starting position of SG4, such as the frame index or the subframe index.

Example Ten

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

It is to be noted that a scheme of 1.25 kHz is used as an example for description in this embodiment.

In the wireless communication system, a terminal transmits a random access signal to a base station. A structure and a resource configuration of the random access signal are shown in FIG. 22. The random access signal occupies 7 SGs, which are SG0 to SG6. Symbols of each symbol group occupy a subcarrier with a same subcarrier index in frequency domain. Each symbol group includes a cyclic prefix (CP) and 2 symbols in time domain. In this embodiment, a subcarrier spacing is $\Delta f=1.25$ kHz, and a length of one symbol is $T=1/\Delta f=0.8$ ms=24576×Ts. Here, Ts is the time domain sampling interval. In this embodiment, Ts=32.55 ns. The CP length is 24576×Ts=0.8 ms.

Figure 24:
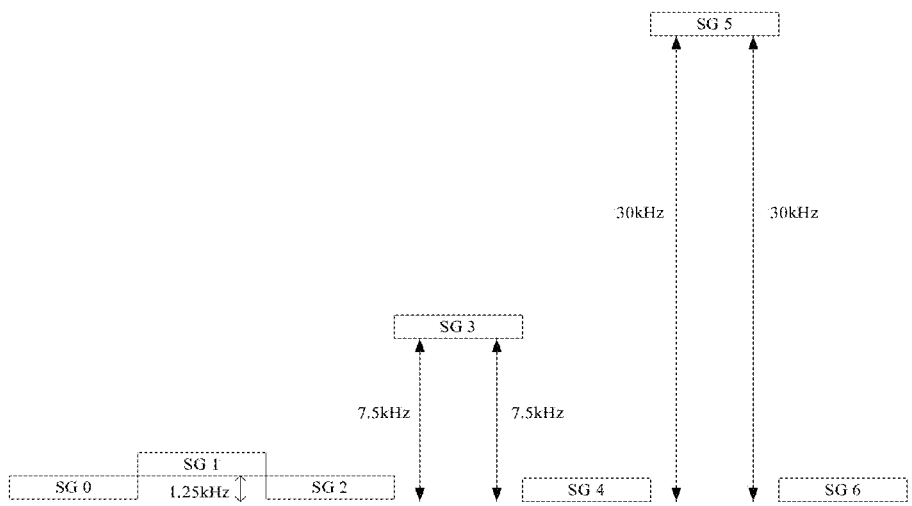
FIG. 24 is a schematic diagram of a frequency hopping level in example ten.

The random access signal includes 3 frequency hopping levels. As shown in FIG. 24, a frequency hopping distance corresponding to a first frequency hopping level is 1.25 kHz, which includes a frequency domain interval of 1.25 kHz between SG0 and SG1 and a frequency domain interval of −1.25 kHz between SG1 and SG2; a frequency hopping distance corresponding to a second frequency hopping level is 7.5 kHz, which includes a frequency domain interval of 7.5 kHz between SG2 and SG3 and a frequency domain interval of −7.5 kHz between SG3 and SG4; and a frequency hopping distance corresponding to a third frequency hopping level is 30 kHz, which includes a frequency domain interval of 30 kHz between SG4 and SG5 and a frequency domain interval of −30 kHz between SG5 and SG6.

In this embodiment, when a frequency hopping distance corresponding to one frequency hopping level is A Hz, a number of frequency domain intervals of (+A) Hz between two adjacent SGs is the same as a number of frequency domain intervals of (−A) Hz between two adjacent SGs.

It is to be noted that a first signal includes the random access signal described above, and the present disclosure is described by using the random access signal as an example.

Example Eleven

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

In this embodiment, the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

It is to be noted that a subcarrier selection scheme for a second structure is described by way of examples in this embodiment. An example of 8 SGs whose subcarrier indexes are associated is used for description.

A terminal transmits a random access signal to a base station. A structure and a resource configuration of the random access signal are shown in FIG. 10. The random access signal occupies 8 SGs, which are SG0 to SG7. Symbols of each symbol group occupy a subcarrier with a same subcarrier index in frequency domain. Each symbol group includes a cyclic prefix (CP) and 4 symbols in time domain. In this embodiment, a subcarrier spacing is Δf=3.75 kHz, and a length of one symbol is T=1/Δf=0.2667 ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2, #3 and #4 of frame N, and subcarrier indexes occupied by SG0 and SG1 differ by (+1) subcarrier spacing (equivalent to (+3750) Hz).

SG2 and SG3 are configured in subframes #7, #8 and #9 of frame N, and subcarrier indexes occupied by SG2 and SG3 differ by (−1) subcarrier spacing (equivalent to (−3750) Hz).

SG4 and SG5 are configured in subframes #2, #3 and #4 of frame N+1, and subcarrier indexes occupied by SG4 and SG5 differ by (+6) subcarrier spacings (equivalent to (+22500) Hz).

SG6 and SG7 are configured in subframes #7, #8 and #9 of frame N+1, and subcarrier indexes occupied by SG6 and SG7 differ by (−6) subcarrier spacings (equivalent to (−22500) Hz).

Figure 25:
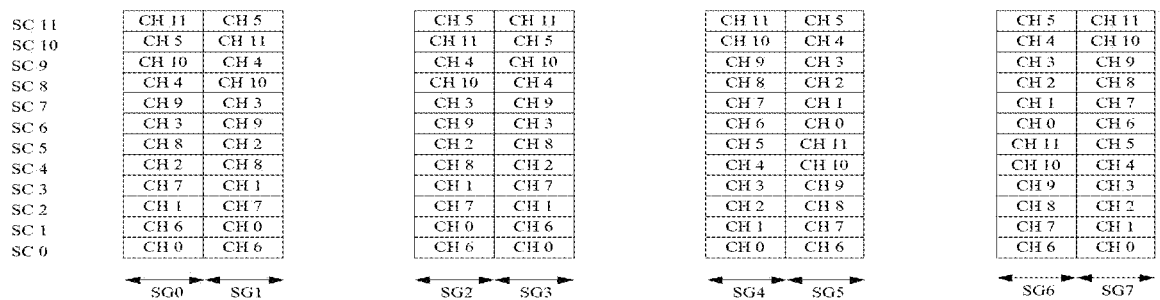
FIG. 25 is a diagram illustrating an allocation scheme of subcarriers occupied by SG0 to SG7 in example eleven.

In this embodiment, an allocation scheme of subcarriers occupied by SG0 to SG7 is shown in FIG. 25 and includes the following:

A subcarrier index of SG0 has a correspondence with a subcarrier index of SG1. For example, when the subcarrier index of SG0 is SC0, the subcarrier index of SG1 is SC1, which is numbered CH0.

A subcarrier index of SG2 has a correspondence with a subcarrier index of SG3. For example, when the subcarrier index of SG2 is SC1, the subcarrier index of SG3 is SC0, which is numbered CH0.

A subcarrier index of SG4 has a correspondence with a subcarrier index of SG5. For example, when the subcarrier index of SG4 is SC0, the subcarrier index of SG5 is SC6, which is numbered CH0.

A subcarrier index of SG6 has a correspondence with a subcarrier index of SG7. For example, when the subcarrier index of SG6 is SC6, the subcarrier index of SG7 is SC0, which is numbered CH0.

SG0 is selected from a subcarrier index set (including subcarrier indexes SC0 to SC11), where a selection rule may be to randomly select one from 12 subcarrier indexes or to select one from the 12 subcarrier indexes according to a determined rule.

The subcarrier index of SG2 is determined according to rules described below. If the subcarrier index of SG0 is among CH0 to CH5, the subcarrier index of SG2 is also selected from CH0 to CH5. In some embodiments, the subcarrier index of SG2 is randomly selected from subcarriers corresponding to CH0 to CH5 or selected from the subcarriers corresponding to CH0 to CH5 according to a determined rule. Alternatively, the subcarrier index occupied by SG2 is selected from the subcarriers corresponding to CH0 to CH5, and the subcarrier index or an index number occupied by SG2 has a difference of Delta than the subcarrier index or an index number occupied by SG0. A value of Delta is variable and may be determined by at least one of: a cell ID or a time domain starting position of SG2, such as a frame index or a subframe index.

If the subcarrier index of SG0 is among CH6 to CH11, the subcarrier index of SG2 is also selected from CH6 to CH11.

In some embodiments, the subcarrier index of SG2 is randomly selected from subcarriers corresponding to CH6 to CH11 or selected from the subcarriers corresponding to CH6 to CH11 according to the determined rule. Alternatively, the subcarrier index occupied by SG2 is selected from the subcarriers corresponding to CH6 to CH11, and the subcarrier index or the index number occupied by SG2 has the difference of Delta than the subcarrier index or the index number occupied by SG0. The value of Delta is variable and may be determined by at least one of: the cell ID or the time domain starting position of SG2, such as the frame index or the subframe index.

The subcarrier index of SG4 is determined according to rules described below. If the subcarrier index of SG0 is among CH0 to CH5, the subcarrier index of SG4 is also selected from CH0 to CH5. In some embodiments, the subcarrier index of SG4 is randomly selected from subcarriers corresponding to CH0 to CH5 or selected from the subcarriers corresponding to CH0 to CH5 according to a determined rule. Alternatively, the subcarrier index occupied by SG4 is selected from the subcarriers corresponding to CH0 to CH5, and the subcarrier index or an index number occupied by SG4 has the difference of Delta than the subcarrier index or the index number occupied by SG0. The value of Delta is variable and may be determined by at least one of: the cell ID or a time domain starting position of SG4, such as a frame index or a subframe index.

If the subcarrier index of SG0 is among CH6 to CH11, the subcarrier index of SG4 is also selected from CH6 to CH11. In some embodiments, the subcarrier index of SG4 is randomly selected from subcarriers corresponding to CH6 to CH11 or selected from the subcarriers corresponding to CH6 to CH11 according to the determined rule. Alternatively, the subcarrier index occupied by SG4 is selected from the subcarriers corresponding to CH6 to CH11, and the subcarrier index or the index number occupied by SG4 has the difference of Delta than the subcarrier index or the index number occupied by SG0. The value of Delta is variable and may be determined by at least one of: the cell ID or the time domain starting position of SG4, such as the frame index or the subframe index.

The subcarrier index of SG6 is determined according to rules described below. If the subcarrier index of SG0 is among CH0 to CH5, the subcarrier index of SG6 is also selected from CH0 to CH5. In some embodiments, the subcarrier index of SG6 is randomly selected from subcarriers corresponding to CH0 to CH5 or selected from the subcarriers corresponding to CH0 to CH5 according to a determined rule. Alternatively, the subcarrier index occupied by SG6 is selected from the subcarriers corresponding to CH0 to CH5, and the subcarrier index or an index number occupied by SG6 has the difference of Delta than the subcarrier index or the index number occupied by SG0. The value of Delta is variable and may be determined by at least one of: the cell ID or a time domain starting position of SG6, such as a frame index or a subframe index.

If the subcarrier index of SG0 is among CH6 to CH11, the subcarrier index of SG6 is also selected from CH6 to CH11. In some embodiments, the subcarrier index of SG6 is randomly selected from subcarriers corresponding to CH6 to CH11 or selected from the subcarriers corresponding to CH6 to CH11 according to the determined rule. Alternatively, the subcarrier index occupied by SG6 is selected from the subcarriers corresponding to CH6 to CH11, and the subcarrier index or the index number occupied by SG6 has the difference of Delta than the subcarrier index or the index number occupied by SG0. The value of Delta is variable and may be determined by at least one of: the cell ID or the time domain starting position of SG6, such as the frame index or the subframe index.

In an embodiment, a node transmits the symbol groups in a sequence of SG0, SG1, SG4, SG5, SG2, SG3, SG6 and SG7.

In addition to this embodiment, when the random access signal supports repeated transmissions, for example, when the random access signal is transmitted twice, the random access signal occupies 16 SGs which are SG0 to SG15, and the repeated transmissions are performed by a group of 8 SGs, that is, SG0 to SG7 and SG8 to SG15 both adopt structures and a subcarrier selection method of SG0 to SG7 in an Example twelve.

Example Twelve

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

In this embodiment, the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

It is to be noted that a subcarrier selection scheme for a second structure is described by way of examples in this embodiment. An example of 8 SGs among which subcarrier indexes of 4 SGs are associated is used for description.

A terminal transmits a random access signal to a base station. A structure and a resource configuration of the random access signal are shown in FIG. 10. The random access signal occupies 8 SGs, which are SG0 to SG7. Symbols of each symbol group occupy a subcarrier with a same subcarrier index in frequency domain. Each symbol group includes a cyclic prefix (CP) and 4 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0 and SG1 are configured in subframes #2, #3 and #4 of frame N, and subcarrier indexes occupied by SG0 and SG1 differ by (+1) subcarrier spacing (equivalent to (+3750) Hz).

SG2 and SG3 are configured in subframes #7, #8 and #9 of frame N, and subcarrier indexes occupied by SG2 and SG3 differ by (−1) subcarrier spacing (equivalent to (−3750) Hz).

SG4 and SG5 are configured in subframes #2, #3 and #4 of frame N+1, and subcarrier indexes occupied by SG4 and SG5 differ by (+6) subcarrier spacings (equivalent to (+22500) Hz).

SG6 and SG7 are configured in subframes #7, #8 and #9 of frame N+1, and subcarrier indexes occupied by SG6 and SG7 differ by (−6) subcarrier spacings (equivalent to (−22500) Hz).

In this embodiment, an allocation scheme of subcarriers occupied by SG0 to SG7 is shown in FIG. 25 and includes the following:

A subcarrier index of SG0 has a correspondence with a subcarrier index of SG1. For example, when the subcarrier index of SG0 is SC0, the subcarrier index of SG1 is SC1, which is numbered CH0.

A subcarrier index of SG2 has a correspondence with a subcarrier index of SG3. For example, when the subcarrier index of SG2 is SC1, the subcarrier index of SG3 is SC0, which is numbered CH0.

A subcarrier index of SG4 has a correspondence with a subcarrier index of SG5. For example, when the subcarrier index of SG4 is SC0, the subcarrier index of SG5 is SC6, which is numbered CH0.

A subcarrier index of SG6 has a correspondence with a subcarrier index of SG7. For example, when the subcarrier index of SG6 is SC6, the subcarrier index of SG7 is SC6, which is numbered CH0.

Of course, there are other examples of the correspondence between the subcarrier indexes of SG0 and SG1, which are not specifically described in this embodiment.

SG0 is selected from a subcarrier index set (including subcarrier indexes SC0 to SC11), where a selection rule may be to randomly select one from 12 subcarrier indexes or to select one from the 12 subcarrier indexes according to a determined rule.

The subcarrier index of SG2 is determined according to rules described below. If the subcarrier index of SG0 is among CH0 to CH5, the subcarrier index of SG2 is also selected from CH0 to CH5. In some embodiments, the subcarrier index of SG2 is randomly selected from subcarriers corresponding to CH0 to CH5 or selected from the subcarriers corresponding to CH0 to CH5 according to a determined rule. Alternatively, the subcarrier index occupied by SG2 is selected from the subcarriers corresponding to CH0 to CH5, and the subcarrier index or an index number occupied by SG2 has a difference of Delta than the subcarrier index or an index number occupied by SG0. A value of Delta is variable and may be determined by at least one of: a cell ID or a time domain starting position of SG2, such as a frame index or a subframe index.

If the subcarrier index of SG0 is among CH6 to CH11, the subcarrier index of SG2 is also selected from CH6 to CH11. In some embodiments, the subcarrier index of SG2 is randomly selected from subcarriers corresponding to CH6 to CH11 or selected from the subcarriers corresponding to CH6 to CH11 according to the determined rule. Alternatively, the subcarrier index occupied by SG2 is selected from the subcarriers corresponding to CH6 to CH11, and the subcarrier index or the index number occupied by SG2 has the difference of Delta than the subcarrier index or the index number occupied by SG0. The value of Delta is variable and may be determined by at least one of: the cell ID or the time domain starting position of SG2, such as the frame index or the subframe index.

SG4 is selected from 12 subcarriers (with subcarrier indexes of SC0 to SC11), where a selection rule may be to randomly select one from 12 subcarrier indexes or to select one from the 12 subcarrier indexes according to a determined rule.

The subcarrier index of SG6 is determined according to rules described below. If the subcarrier index of SG4 is among CH0 to CH5, the subcarrier index of SG6 is also selected from CH0 to CH5. In some embodiments, the subcarrier index of SG6 is randomly selected from subcarriers corresponding to CH0 to CH5 or selected from the subcarriers corresponding to CH0 to CH5 according to a determined rule. Alternatively, the subcarrier index occupied by SG6 is selected from the subcarriers corresponding to CH0 to CH5, and the subcarrier index or an index number occupied by SG6 has the difference of Delta than the subcarrier index or an index number occupied by SG4. The value of Delta is variable and may be determined by at least one of: the cell ID or a time domain starting position of SG6, such as a frame index or a subframe index.

If the subcarrier index of SG4 is among CH6 to CH11, the subcarrier index of SG6 is also selected from CH6 to CH11. In some embodiments, the subcarrier index of SG6 is randomly selected from subcarriers corresponding to CH6 to CH11 or selected from the subcarriers corresponding to CH6 to CH11 according to the determined rule. Alternatively, the subcarrier index occupied by SG6 is selected from the subcarriers corresponding to CH6 to CH11, and the subcarrier index or the index number occupied by SG6 has the difference of Delta than the subcarrier index or the index number occupied by SG4. The value of Delta is variable and may be determined by at least one of: the cell ID or the time domain starting position of SG6, such as the frame index or the subframe index.

In addition to this embodiment, when the random access signal supports repeated transmissions, for example, when the random access signal is transmitted twice, the random access signal occupies 16 SGs which are SG0 to SG15, and the repeated transmissions are performed by a group of 8 SGs, that is, SG0 to SG7 and SG8 to SG15 both adopt structures and a subcarrier selection method of SG0 to SG7 in an Example thirteen.

Example Thirteen

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

It is to be noted that a subcarrier selection scheme for a first structure is described by way of examples in this embodiment.

In this embodiment, the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

A terminal transmits a random access signal to a base station. A structure and a resource configuration of the random access signal are shown in FIG. 11. The random access signal occupies 6 SGs, which are SG0 to SG5. Symbols of each symbol group occupy a subcarrier with a same subcarrier index in frequency domain. Each symbol group includes a cyclic prefix (CP) and 2 symbols in time domain. In this embodiment, a subcarrier spacing is Δf=3.75 kHz, and a length of one symbol is T=1/Δf=0.2667 ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0, SG1 and SG2 are configured in subframes #2, #3 and #4, subcarrier indexes occupied by SG0 and SG1 differ by (+1) subcarrier spacing (equivalent to (+3750) Hz), and subcarrier indexes occupied by SG1 and SG2 differ by (−1) subcarrier spacing (equivalent to (−3750) Hz).

SG3, SG4 and SG5 are configured in subframes #7, #8 and #9, subcarrier indexes occupied by SG3 and SG4 differ by (+6) subcarrier spacings (equivalent to (+22500) Hz), and subcarrier indexes occupied by SG4 and SG5 differ by (−6) subcarrier spacings (equivalent to (−22500) Hz).

Figure 26:
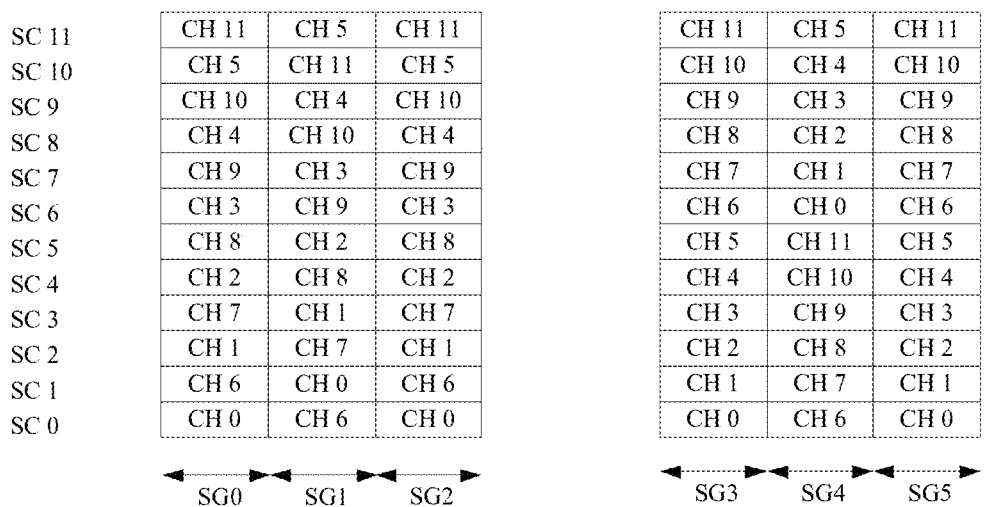
FIG. 26 is a diagram illustrating an allocation scheme of subcarriers occupied by SG0 to SG5 in example thirteen.

In this embodiment, an allocation scheme of subcarriers occupied by SG0 to SG5 is shown in FIG. 26 and includes the following:

A subcarrier index of SG0 has correspondences with a subcarrier index of SG1 and a subcarrier index of SG2. For example, when the subcarrier index of SG0 is SC0, the subcarrier index of SG1 is SC1, and the subcarrier index of SG2 is SC0, which is numbered CH0.

A subcarrier index of SG3 has correspondences with a subcarrier index of SG4 and a subcarrier index of SG5. For example, when the subcarrier index of SG3 is SC0, the subcarrier index of SG4 is SC6, and the subcarrier index of SG5 is SC0, which is numbered CH0.

Of course, there are other examples of the correspondence between the subcarrier indexes of SG0 and SG1, which are not specifically described in this embodiment.

SG0 is selected from 12 subcarriers (with subcarrier indexes of SC0 to SC11), where a selection rule may be to randomly select one from the 12 subcarriers or to select one from the 12 subcarriers according to a determined rule.

The subcarrier index of SG3 is determined according to rules described below. If the subcarrier index of SG0 is among CH0 to CH5, the subcarrier index of SG3 is among CH0 to CH5. In some embodiments, the subcarrier index of SG3 is randomly selected from subcarriers corresponding to CH0 to CH5 or selected from the subcarriers corresponding to CH0 to CH5 according to a determined rule. Alternatively, the subcarrier index occupied by SG3 is selected from the subcarriers corresponding to CH0 to CH5, and the subcarrier index or an index number occupied by SG3 has a difference of Delta than the subcarrier index or an index number occupied by SG0. A value of Delta is variable and may be determined by at least one of: a cell ID or a time domain starting position of SG3, such as a frame index or a subframe index.

If the subcarrier index of SG0 is among CH6 to CH11, the subcarrier index of SG3 is also among CH6 to CH11. In some embodiments, the subcarrier index of SG3 is randomly selected from subcarriers corresponding to CH6 to CH11 or selected from the subcarriers corresponding to CH6 to CH11 according to the determined rule. Alternatively, the subcarrier index occupied by SG3 is selected from the subcarriers corresponding to CH6 to CH11, and the subcarrier index or the index number occupied by SG3 has the difference of Delta than the subcarrier index or the index number occupied by SG0. The value of Delta is variable and may be determined by at least one of: the cell ID or the time domain starting position of SG3, such as the frame index or the subframe index.

The random access signal supports repeated transmissions. When the random access signal is transmitted twice, the random access signal occupies 12 SGs which are SG0 to SG11, and the repeated transmissions are performed by a group of 6 SGs, that is, SG0 to SG5 and SG6 to SG11 both adopt structures and a subcarrier selection method of SG0 to SG5 in an Example fourteen.

Example Fourteen

A wireless communication system adopts a TDD working mode, that is, an uplink channel and a downlink channel adopt a same spectrum resource through TDM. A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. Three types of subframe are included, which are a downlink subframe, an uplink subframe and a special subframe separately. The special subframe includes three parts: a DwPTS, a GP and an UpPTS.

It is to be noted that a subcarrier selection scheme for a first structure is described by way of examples in this embodiment.

In this embodiment, the distribution of uplink subframes and downlink subframes in 1 frame is shown in FIG. 9, that is, subframes #0 and #5 are downlink subframes, subframes #2, #3, #4,#7, #8 and #9 are uplink subframes, and subframes #1 and #6 are special subframes.

A terminal transmits a random access signal to a base station. A structure and a resource configuration of the random access signal are shown in FIG. 11. The random access signal occupies 6 SGs, which are SG0 to SG5. Symbols of each symbol group occupy a subcarrier with a same subcarrier index in frequency domain. Each symbol group includes a cyclic prefix (CP) and 2 symbols in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and a CP length corresponding to the other format is 2048×Ts=0.0667 ms. In this embodiment, the CP length is 8192×Ts=0.2667 ms.

SG0, SG1 and SG2 are configured in subframes #2, #3 and #4, subcarrier indexes occupied by SG0 and SG1 differ by (+1) subcarrier spacing (equivalent to (+3750) Hz), and subcarrier indexes occupied by SG1 and SG2 differ by (−1) subcarrier spacing (equivalent to (−3750) Hz).

SG3, SG4 and SG5 are configured in subframes #7, #8 and #9, subcarrier indexes occupied by SG3 and SG4 differ by (+6) subcarrier spacings (equivalent to (+22500) Hz), and subcarrier indexes occupied by SG4 and SG5 differ by (−6) subcarrier spacings (equivalent to (−22500) Hz).

In this embodiment, an allocation scheme of subcarriers occupied by SG0 to SG5 is shown in FIG. 26 and includes the following:

A subcarrier index of SG0 has correspondences with a subcarrier index of SG1 and a subcarrier index of SG2. For example, when the subcarrier index of SG0 is SC0, the subcarrier index of SG1 is SC1, and the subcarrier index of SG2 is SC0, which is numbered CH0.

A subcarrier index of SG3 has correspondences with a subcarrier index of SG4 and a subcarrier index of SG5. For example, when the subcarrier index of SG3 is SC0, the subcarrier index of SG4 is SC6, and the subcarrier index of SG5 is SC0, which is numbered CH0.

It is to be noted that subcarrier indexes 0 to 11 shown in FIG. 26 in this embodiment are merely one sequence of 12 subcarriers defined according to practical situations. Of course, there are other examples of the correspondence between the subcarrier indexes of SG0 and SG1, which are not specifically described in this embodiment.

SG0 is selected from 12 subcarriers (with subcarrier indexes of SC0 to SC11), where a selection rule may be to randomly select one from the 12 subcarriers or to select one from the 12 subcarriers according to a determined rule.

The subcarrier index of SG3 is determined according to the following rule: SG3 is selected from the 12 subcarriers (with the subcarrier indexes of SC0 to SC11), where a selection rule may be to randomly select one from the 12 subcarriers or to select one from the 12 subcarriers according to a determined rule.

The random access signal supports repeated transmissions. When the random access signal is transmitted twice, the random access signal occupies 12 SGs which are SG0 to SG11, and the repeated transmissions are performed by a group of 6 SGs, that is, SG0 to SG5 and SG6 to SG11 both adopt structures and a subcarrier selection method of SG0 to SG5 in an Example fifteen.

Example Fifteen

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 9.

TABLE 9

| Config-uration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

It can be seen that this embodiment is described in detail by using an example of a transmission of the special subframe.

In this embodiment, the configuration information for the uplink subframe and the downlink subframe is configuration 2, and the distribution of uplink subframes and downlink subframes in 1 frame is shown in FIG. 14, that is, subframes #0, #3, #4,#5, #8 and #9 are downlink subframes, subframes #2 and #7 are uplink subframes, and subframes #1 and #6 are special subframes.

Figure 27:
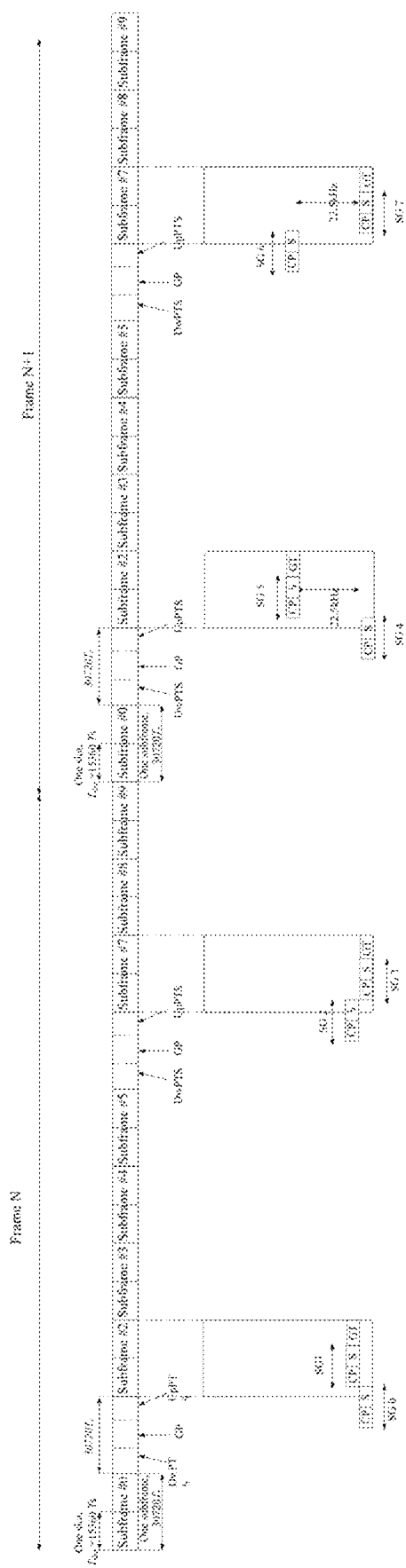
FIG. 27 is a diagram illustrating a structure and a resource configuration of a random access signal in example fifteen.

A terminal transmits a random access signal to a base station. A structure and a resource configuration of the random access signal are shown in FIG. 27. The random access signal occupies 8 SGs, which are SG0 to SG7. Symbols of each symbol group occupy a subcarrier with a same subcarrier index in frequency domain. Each symbol group includes a cyclic prefix (CP) and 1 symbol in time domain. In this embodiment, a subcarrier spacing is Δf=3.75 kHz, and a length of one symbol is T=1/Δf=0.2667 ms=8192×Ts. Here, Ts is the time domain sampling interval. In this embodiment, Ts=32.55 ns.

SG0 and SG1 are configured in subframes #1 and #2 of frame N, and subcarrier indexes occupied by SG0 and SG1 differ by (+1) subcarrier spacing (equivalent to (+3750) Hz).

A starting position of SG0 transmitted by the terminal is X time domain sampling points before an end of an UpPTS in subframe #1, for example, it is defined as moment A.

SG2 and SG3 are configured in subframes #6 and #7 of frame N, and subcarrier indexes occupied by SG2 and SG3 differ by (−1) subcarrier spacing (equivalent to (−3750) Hz).

A starting position of SG2 transmitted by the terminal is X time domain sampling points before end of an UpPTS in subframe #6.

SG4 and SG5 are configured in subframes #1 and #2 of frame N+1, and subcarrier indexes occupied by SG4 and SG5 differ by (+6) subcarrier spacings (equivalent to (+22500) Hz).

A starting position of SG4 transmitted by the terminal is the X time domain sampling points before the end of the UpPTS in subframe #1.

SG6 and SG7 are configured in subframes #6 and #7 of frame N+1, and subcarrier indexes occupied by SG6 and SG7 differ by (−6) subcarrier spacings (equivalent to (−22500) Hz).

A starting position of SG6 transmitted by the terminal is the X time domain sampling points before the end of the UpPTS in subframe #6.

When the CP length is 266.7 us, i.e., 8192 Ts, a value of X is 10080 Ts or 10240 Ts or 9984 Ts.

When the CP length is 66.7 us, i.e., 2048 Ts, the value of X is 8032 Ts or 8192 Ts or 7936 Ts.

SG2, SG4 and SG6 each occupy a same subcarrier index as that occupied by SG0, or SG2, SG4 and SG6 each occupy a subcarrier index with a difference of Delta than that occupied by SG0. SG2, SG4 and SG6 each correspond to a variable value of Delta. A value of Delta may be determined by at least one of: a cell ID or a time domain starting position of each of SG2, SG4 and SG6, such as a frame index or a subframe index.

In some embodiments, a starting moment at which the terminal transmits SG0 is $N_{TAoffset}$=624 time domain sampling points ahead of moment A.

Example Sixteen

A wireless communication system adopts a TDD working mode, that is, an uplink channel and a downlink channel adopt a same spectrum resource through TDM. The uplink channel is configured in an uplink subframe, and the downlink channel is configured in a downlink subframe. The wireless communication system adopts configuration information for the uplink subframe and the downlink subframe shown in Table 10.

TABLE 10

| Config-uration Index | Downlink-to-Uplink Switching Period | Subframe Index within One Frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system includes a plurality of frames, and each frame includes 10 subframes with subframe indexes of 0 to 9. The subframe has a time domain length of 1 ms and corresponds to 30720 time domain sampling intervals, where the time domain sampling interval is Ts=32.55 ns. A downlink-to-uplink switching period of 5 ms means that 2 switches from the downlink subframe to the uplink subframe are performed within 10 ms or 1 frame. A downlink-to-uplink switching period of 10 ms means that 1 switch from the downlink subframe to the uplink subframe is performed within 10 ms or 1 frame. D denotes the downlink subframe, U denotes the uplink subframe, and S denotes a special subframe. The special subframe includes three parts: a DwPTS, a GP and an UpPTS.

It can be seen that this embodiment is described in detail by using an example of the special subframe.

In this embodiment, the configuration information for the uplink subframe and the downlink subframe is configuration 2, and the distribution of uplink subframes and downlink subframes in 1 frame is shown in FIG. 14, that is, subframes #0, #3, #4,#5, #8 and #9 are downlink subframes, subframes #2 and #7 are uplink subframes, and subframes #1 and #6 are special subframes.

Figure 28:
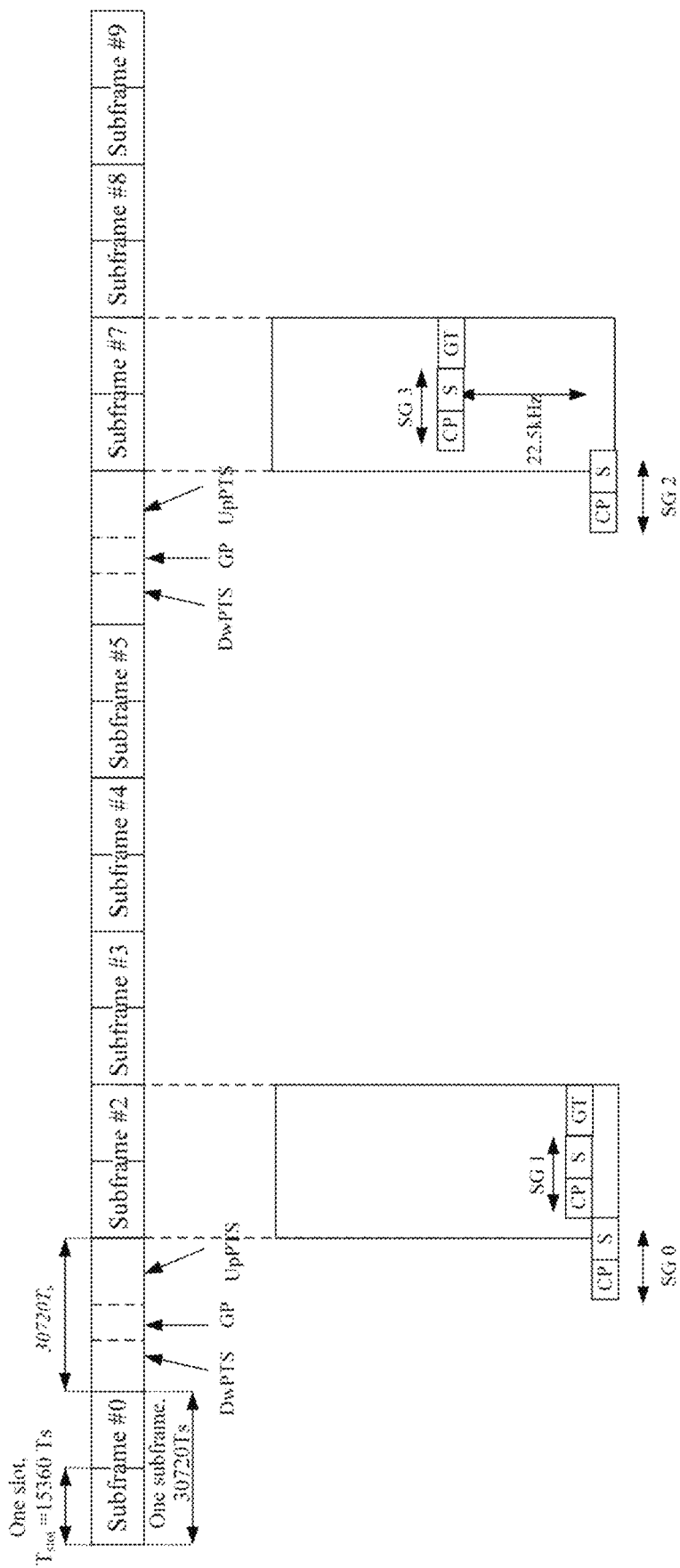
FIG. 28 is a diagram illustrating a structure and a resource configuration of a random access signal in example sixteen.

A terminal transmits a random access signal to a base station. A structure and a resource configuration of the random access signal are shown in FIG. 28. The random access signal occupies 5 SGs, which are SG0 to SG4. Symbols of each symbol group occupy a subcarrier with a same subcarrier index in frequency domain. Each symbol group includes a cyclic prefix (CP) and 1 symbol in time domain. In this embodiment, a subcarrier spacing is $\Delta f=3.75$ kHz, and a length of one symbol is $T=1/\Delta f=0.2667$ ms=8192×Ts. Here, Ts is the time domain sampling interval. In this embodiment, Ts=32.55 ns.

SG0 and SG1 are configured in subframes #1 and #2, and subcarrier indexes occupied by SG0 and SG1 differ by (+1) subcarrier spacing (equivalent to (+3750) Hz).

A starting position of SG0 transmitted by the terminal is X time domain sampling points before an end of an UpPTS in subframe #1, for example, it is defined as moment A.

SG2 and SG3 are configured in subframes #6 and #7, and subcarrier indexes occupied by SG2 and SG3 differ by (+6) subcarrier spacings (equivalent to (+22500) Hz).

A starting position of SG2 transmitted by the terminal is X time domain sampling points before an end of an UpPTS in subframe #6.

When the CP length is 266.7 us, i.e., 8192 Ts, a value of X is 10080 Ts or 10240 Ts or 9984 Ts.

When the CP length is 66.7 us, i.e., 2048 Ts, the value of X is 8032 Ts or 8192 Ts or 7936 Ts.

SG2 occupies a same subcarrier index as that occupied by SG0, or SG2 occupies a subcarrier index with a difference of Delta than that occupied by SG0. A value of Delta may be determined by at least one of: a cell ID or a time domain starting position of SG2, such as a frame index or a subframe index.

In some embodiments, a starting moment at which the terminal transmits SG0 is $N_{TAoffset}=624$ time domain sampling points ahead of moment A.

Example Seventeen

In this embodiment, transmit power control for a first signal is described in detail.

A wireless communication system supports three coverage enhancement (CE) levels, which are CE level 0, CE level 1 and CE level 2.

A terminal measures reference signal received power (RSRP), estimates a path loss (PL) through the RSRP, or estimates a coupling loss (CL) through the RSRP, and selects an appropriate coverage enhancement level according to a range where the RSRP or the PL or the CL is located.

The terminal measures the RSRP and estimates the coupling loss (CL), where the CL is used as a metric value X, TH0, TH1 and TH2 correspond to MCL_0, MCL_1 and MCL_2 respectively, and MCL_i refers to a CL threshold corresponding to coverage enhancement level i, where i=0, 1, 2.

The metric value X corresponding to CE level 0 satisfies that X≤TH0.

The metric value X corresponding to CE level 1 satisfies that TH0<X≤TH1.

The metric value X corresponding to CE level 2 satisfies that TH1<X≤TH2.

The terminal measures the RSRP, where the RSRP is used as the metric value X, TH0, TH1 and TH2 correspond to RSRP_0, RSRP_1 and RSRP_2 respectively, and RSRP_i refers to an RSRP threshold corresponding to coverage enhancement level i, where i=0, 1, 2.

The metric value X corresponding to CE level 0 satisfies that X≥TH0.

The metric value X corresponding to CE level 1 satisfies that TH1≤X<TH0.

The metric value X corresponding to CE level 2 satisfies that TH2≤X<TH1.

The terminal measures the RSRP and estimates the path loss (PL), where the PL is used as the metric value X, TH0, TH1 and TH2 correspond to MPL_0, MPL_1 and MPL_2 respectively, and MPL_i refers to a PL threshold corresponding to coverage enhancement level i, where i=0, 1, 2.

The metric value X corresponding to CE level 0 satisfies that X≤TH0.

The metric value X corresponding to CE level 1 satisfies that TH0<X≤TH1.

The metric value X corresponding to CE level 2 satisfies that TH1<X≤TH2.

A terminal is defined as a first type of terminal when it belongs to CE level 0 and satisfies at least one of conditions described below.

The coupling loss (CL) satisfies that CL≤MCL_0−Delta_0_CL.

The reference signal received power (RSRP) satisfies that RSRP≥MRSRP_0+Delta_0_RSRP.

The path loss (PL) satisfies that PL≤MPL_0−Delta_0_PL.

A terminal other than the first type of terminal and belonging to CE level 0 is defined as a second type of terminal. Alternatively, a terminal is defined as the second type of terminal when it satisfies at least one of conditions described below.

The coupling loss (CL) satisfies that MCL_0−Delat_0_CL<CL≤MCL_0.

The reference signal received power (RSRP) satisfies that MRSRP_0≤RSRP<MRSRP_0+Delat_0_RSRP.

The path loss (PL) satisfies that MPL_0−Delat_0_PL<PL≤MPL_0.

MCL_0 is a CL threshold corresponding to level 0, MRSRP_0 is an RSRP threshold corresponding to level 0, MPL_0 is a PL threshold corresponding to level 0, Delta_0_CL is a measurement error of the CL corresponding to level 0, Delta_0_RSRP is a measurement error of the RSRP corresponding to level 0, and Delta_0_PL is a measurement error of the PL corresponding to level 0.

A transmission control policy of a random access signal of the first type of terminal includes at least one of policies described below.

The first type of terminal is merely allowed to transmit the random access signal on a random access channel resource corresponding to CE level 0 and is not allowed to transmit the random access signal on a random access channel resource corresponding to CE level 1 or CE level 2.

Transmit power of the random access signal is determined using the following formula 1-1:

$$P_{RACH}=\min\{P_{CMAX}, P_{PREAMBLE\_RECEIVED\_TARGET\_POWER}+PL\} \quad (1\text{-}1)$$

where $P_{CMAX}$ is maximum transmit power, $P_{PREAMBLE\_RECEIVED\_TARGET\_POWER}$ is target received power of the random access signal, and PL is an estimated path loss value. $P_{CMAX}$ may be a uniformly configured maximum transmit power of a UE or maximum transmit power of the UE corresponding to the coverage enhancement level.

$P_{PREAMBLE\_RECEIVED\_TARGET\_POWER}$ may be determined using the following formula 1-2:

$$P_{PREAMBLE\_RECEIVED\_TARGET\_POWER} = \\ P_{PREAMBLE\_RECEIVED\_TARGET\_POWER\_INITIAL} + \\ P_{DELTA\_PREAMBLE} + \\ (C_{PREAMBLE\_TRANSMISSION\_COUNTER} - 1) \times \\ S_{POWER\_RAMPING\_STEP} \quad (1\text{-}2)$$

where $P_{DELTA\_PREAMBLE}$ is a configuration parameter, $P_{PREAMBLE\_RECEIVED\_TARGET\_POWER\_INITIAL}$ is initial target received power of the random access signal, $C_{PREAMBLE\_TRANSMISSION\_COUNTER}$ is a counter of transmission attempts of the random access signal, and $S_{POWER\_RAMPING\_STEP}$ is a power ramping step.

Before the random access signal is transmitted, an original $P_{PREAMBLE\_RECEIVED\_TARGET\_POWER}$ is calculated using formula (1-2) and adjusted using the following formula (1-3) to obtain $P_{PREAMBLE\_RECEIVED\_TARGET\_POWER}$ and then a value of $P_{PREAMBLE\_RECEIVED\_TARGET\_POWER}$ is used as a new value of $P_{PREAMBLE\_RECEIVED\_TARGET\_POWER}$ to be substituted into formula (1-1).

$$P_{PREAMBLE\_RECEIVED\_TARGET\_POWER} = \\ P_{PREAMBLE\_RECEIVED\_TARGET\_POWER} - 10 \times \\ \log_{10} N_{REPETITION\_PER\_PREAMBLE\_ATTEMPT} \quad (1\text{-}3)$$

where $N_{REPETITION\_PER\_PREAMBLE\_ATTEMPT}$ is a number of repetitions corresponding to each transmission attempt of the random access signal.

A value of $C_{PREAMBLE\_TRANSMISSION\_COUNTER}$ is calculated by methods described below.

(1) An initial value of $C_{PREAMBLE\_TRANSMISSION\_COUNTER}$ is set to 0, and an initial value of another counter $P_{Preamble\_Transmission\_Counter}$ of transmission attempts of the random access signal is set to 0.

(2) Before the random access signal is transmitted each time, a value of $C_{PREAMBLE\_TRANSMISSION\_COUNTER}$ is increased by 1, and a value of $P_{Preamble\_Transmission\_Counter}$ is increased by 1.

(3) When $P_{Preamble\_Transmission\_Counter} = a*T0$ (a is an integer greater than or equal to 1 and T0 is an integer greater than or equal to 1), $C_{PREAMBLE\_TRANSMISSION\_COUNTER}$ is reset to 0.

Alternatively, when $P_{Preamble\_Transmission\_Counter} = (a*T0)+1$ (a is an integer greater than or equal to 1 and T0 is an integer greater than or equal to 1), $C_{PREAMBLE\_TRANSMISSION\_COUNTER}$ is reset to 0.

In this embodiment, T0 is an upper limit of a number of transmission attempts of the random access signal on the random access channel resource corresponding to CE level 0. In addition to this embodiment, T0 may also be a parameter configured by a base station, where T0 is an integer greater than or equal to 1.

In this embodiment, a is an integer greater than or equal to 1 and (a*T0)<(Q+1), or a is an integer greater than or equal to 1 and (a*T0)<Q.

In this embodiment, when $P_{Preamble\_Transmission\_Counter} = Q$ or $P_{Preamble\_Transmission\_Counter} = (Q+1)$, the first type of terminal no longer attempts to transmit the random access signal. It is considered that a random access process fails.

Q is a sum of upper limits of numbers of transmission attempts of the random access signal on random access channel resources corresponding to all levels (including CE level 0, CE level 1 and CE level 2).

A transmission control policy of the random access signal of the second type of terminal includes at least one of policies described below.

The second type of terminal is allowed to transmit the random access signal on the random access channel resources corresponding to CE level 0, CE level 1 and CE level 2.

The second type of terminal preferably attempts to transmit the random access signal on the random access channel resource corresponding to CE level 0 and attempts to transmit the random access signal on the random access channel resource corresponding to CE level 1 when a first type of condition is satisfied. The second type of terminal attempts to transmit the random access signal on the random access channel resource corresponding to CE level 2 instead of CE level 1 when a second type of condition is satisfied.

The transmit power of the random access signal is determined using the following formula 1-1:

$$P_{PRACH} = \min\{P_{CMAX}, \\ P_{PREAMBLE\_RECEIVED\_TARGET\_POWER} + PL\} \quad (1\text{-}1)$$

where $P_{CMAX}$ is the maximum transmit power, $P_{PREAMBLE\_RECEIVED\_TARGET\_POWER}$ is the target received power of the random access signal, and PL is the estimated path loss value. $P_{CMAX}$ may be the uniformly configured maximum transmit power of the UE or the maximum transmit power of the UE corresponding to the coverage enhancement level.

$P_{PREAMBLE\_RECEIVED\_TARGET\_POWER}$ may be determined using the following formula 1-2:

$$P_{PREAMBLE\_RECEIVED\_TARGET\_POWER} = \\ P_{PREAMBLE\_RECEIVED\_TARGET\_POWER\_INITIAL} + \\ P_{DELTA\_PREAMBLE} + \\ (C_{PREAMBLE\_TRANSMISSION\_COUNTER} - 1) \times \\ S_{POWER\_RAMPING\_STEP} \quad (1\text{-}2)$$

where $P_{DELTA\_PREAMBLE}$ is the configuration parameter, $P_{PREAMBLE\_RECEIVED\_TARGET\_POWER\_INITIAL}$ is the initial target received power of the random access signal, $C_{PREAMBLE\_TRANSMISSION\_COUNTER}$ is the counter of transmission attempts of the random access signal, and $S_{POWER\_RAMPING\_STEP}$ is the power ramping step.

Before the random access signal is transmitted, the original $P_{PREAMBLE\_RECEIVED\_TARGET\_POWER}$ is calculated using formula (1-2) and adjusted using the following formula (1-3) to obtain $P_{PREAMBLE\_RECEIVED\_TARGET\_POWER}$ and then the value of $P_{PREAMBLE\_RECEIVED\_TARGET\_POWER}$ is used as the new value of $P_{PREAMBLE\_RECEIVED\_TARGET\_POWER}$ to be substituted into formula (1-1).

$$P_{PREAMBLE\_RECEIVED\_TARGET\_POWER} = \\ P_{PREAMBLE\_RECEIVED\_TARGET\_POWER} - 10 \times \\ \log_{10} N_{REPETITION\_PER\_PREAMBLE\_ATTEMPT} \quad (1\text{-}3)$$

where $N_{REPETITION\_PER\_PREAMBLE\_ATTEMPT}$ is the number of repetitions corresponding to each transmission attempt of the random access signal.

Configuration methods for $C_{PREAMBLE\_TRANSMISSION\_COUNTER}$, $P_{PREAMBLE\_RECEIVED\_TARGET\_POWER\_INITIAL}$ and $S_{POWER\_RAMPING\_STEP}$ are described below.

(1) The initial value of $C_{PREAMBLE\_TRANSMISSION\_COUNTER}$ is set to 0, and the initial value of another counter $P_{Preamble\_Transmission\_Counter}$ of transmission attempts of the random access signal is set to 0.

(2) Before the random access signal is transmitted each time, the value of $C_{PREAMBLE\_TRANSMISSION\_COUNTER}$ is increased by 1, and the value of $P_{Preamble\_Transmission\_Counter}$ is increased by 1.

(3) When $C_{PREAMBLE\_TRANSMISSION\_COUNTER}$=T0 or T0+1, and the random access process fails (that is, the first type of condition), the second type of terminal attempts to transmit the random access signal on the random access channel resource corresponding to CE level 1.

(4) When the second type of terminal attempts to transmit the random access signal on the random access channel resource corresponding to CE level 1, a value of $P_{PREAMBLE\_RECEIVED\_TARGET\_POWER\_INITIAL}$ is reconfigured. For example, values of $P_{PREAMBLE\_RECEIVED\_TARGET\_POWER\_INITIAL}$ for CE level 0, CE level 1 and CE level 2 are independent configured. $C_{PREAMBLE\_TRANSMISSION\_COUNTER}$ is reset to 0. A value of $S_{POWER\_RAMPING\_STEP}$ is reconfigured. For example, values of $S_{POWER\_RAMPING\_STEP}$ for CE level 0, CE level 1 and CE level 2 are independent configured.

(5) When the second type of terminal attempts to transmit the random access signal on the random access channel resource corresponding to CE level 1, the value of $C_{PREAMBLE\_TRANSMISSION\_COUNTER}$ is increased by 1, and the value of $P_{Preamble\_Transmission\_Counter}$ is increased by 1 before the second type of terminal transmits the random access signal on the random access channel resource corresponding to CE level 1 each time.

(6) When $C_{PREAMBLE\_TRANSMISSION\_COUNTER}$=T1 or T1+1, and the random access process fails (that is, the second type of condition), the second type of terminal attempts to transmit the random access signal on the random access channel resource corresponding to CE level 2.

(7) When the second type of terminal attempts to transmit the random access signal on the random access channel resource corresponding to CE level 2, the value of $P_{PREAMBLE\_RECEIVED\_TARGET\_POWER\_INITIAL}$ is reconfigured. For example, the values of $P_{PREAMBLE\_RECEIVED\_TARGET\_POWER\_INITIAL}$ for CE level 0, CE level 1 and CE level 2 are independent configured. $C_{PREAMBLE\_TRANSMISSION\_COUNTER}$ is reset to 0. The value of $S_{POWER\_RAMPING\_STEP}$ is reconfigured. For example, the values of $S_{POWER\_RAMPING\_STEP}$ for CE level 0, CE level 1 and CE level 2 are independent configured.

(8) When the second type of terminal attempts to transmit the random access signal on the random access channel resource corresponding to CE level 2, the value of $C_{PREAMBLE\_TRANSMISSION\_COUNTER}$ is increased by 1, and the value of $P_{Preamble\_Transmission\_Counter}$ is increased by 1 before the second type of terminal transmits the random access signal on the random access channel resource corresponding to CE level 2 each time.

T0 is the upper limit of the number of transmission attempts of the random access signal on the random access channel resource corresponding to CE level 0, and T1 is an upper limit of a number of transmission attempts of the random access signal on the random access channel resource corresponding to CE level 1.

Q is the sum of the upper limits of the numbers of transmission attempts of the random access signal on the random access channel resources corresponding to all levels (including CE level 0, CE level 1 and CE level 2).

In addition to this embodiment, T0 and T1 may also be parameters configured by the base station, where T0 is an integer greater than or equal to 1, and T1 is an integer greater than or equal to 1.

When $P_{Preamble\_Transmission\_Counter}$=Q or Q+1, the first type of terminal no longer attempts to transmit the random access signal. It is considered that the random access process fails.

Example Eighteen

A wireless communication system supports three coverage enhancement CE levels, which are CE level 0, CE level 1 and CE level 2.

A terminal measures reference signal received power (RSRP), estimates a path loss (PL) through the RSRP, or estimates a coupling loss (CL) through the RSRP, and selects an appropriate coverage enhancement level according to a range where the RSRP or the PL or the CL is located.

The terminal measures the RSRP and estimates the coupling loss (CL), where the CL is used as a metric value X, TH0, TH1 and TH2 correspond to MCL_0, MCL_1 and MCL_2 respectively, and MCL_i refers to a CL threshold corresponding to coverage enhancement level i, where i=0, 1, 2.

The metric value X corresponding to CE level 0 satisfies that X≤TH0.

The metric value X corresponding to CE level 1 satisfies that TH0<X≤TH1.

The metric value X corresponding to CE level 2 satisfies that TH1<X≤TH2.

The terminal measures the RSRP, where the RSRP is used as the metric value X, TH0, TH1 and TH2 correspond to RSRP_0, RSRP_1 and RSRP_2 respectively, and RSRP_i refers to an RSRP threshold corresponding to coverage enhancement level i, where i=0, 1, 2.

The metric value X corresponding to CE level 0 satisfies that X≥TH0.

The metric value X corresponding to CE level 1 satisfies that TH1≤X<TH0.

The metric value X corresponding to CE level 2 satisfies that TH2≤X<TH1.

The terminal measures the RSRP and estimates the path loss (PL), where the PL is used as the metric value X, TH0, TH1 and TH2 correspond to MPL_0, MPL_1 and MPL_2 respectively, and MPL_i refers to a PL threshold corresponding to coverage enhancement level i, where i=0, 1, 2.

The metric value X corresponding to CE level 0 satisfies that X≤TH0.

The metric value X corresponding to CE level 1 satisfies that TH0<X≤TH1.

The metric value X corresponding to CE level 2 satisfies that TH1<X≤TH2.

A terminal is defined as a first type of terminal when it belongs to CE level 0 and satisfies at least one of conditions described below.

The coupling loss (CL) satisfies that CL≤MCL_0−Delta_0_CL.

The reference signal received power (RSRP) satisfies that RSRP≥MRSRP_0+Delta_0_RSRP.

The path loss (PL) satisfies that PL≤MPL_0−Delta_0_PL.

A terminal other than the first type of terminal and belonging to CE level 0 is defined as a second type of terminal. Alternatively, a terminal is defined as the second type of terminal when it satisfies at least one of conditions described below.

The coupling loss (CL) satisfies that MCL_0−Delat_0_CL<CL≤MCL_0.

The reference signal received power (RSRP) satisfies that MRSRP_0≤RSRP<MRSRP_0+Delat_0_RSRP.

The path loss (PL) satisfies that MPL_0−Delat_0_PL<PL≤MPL_0.

MCL_0 is a CL threshold corresponding to level 0, MRSRP_0 is an RSRP threshold corresponding to level 0, MPL_0 is a PL threshold corresponding to level 0, Delta_0_CL is a measurement error of the CL corresponding to level 0, Delta_0_RSRP is a measurement error of the RSRP corresponding to level 0, and Delta_0_PL is a measurement error of the PL corresponding to level 0.

A transmission control policy of a random access signal of the first type of terminal includes at least one of policies described below.

The first type of terminal is merely allowed to transmit the random access signal on a random access channel resource corresponding to CE level 0 and is not allowed to transmit the random access signal on a random access channel resource corresponding to CE level 1 or CE level 2.

Transmit power of the random access signal is determined using the following formula 2-1:

$$P_{PRACH} = \min\{P_{CMAX}, P_{PREAMBLE\_RECEIVED\_TARGET\_POWER} + PL\} \quad (2-1)$$

where $P_{CMAX}$ is maximum transmit power, $P_{PREAMBLE\_RECEIVED\_TARGET\_POWER}$ is target received power of the random access signal, and PL is an estimated path loss value. $P_{CMAX}$ may be a uniformly configured maximum transmit power of a UE or maximum transmit power of the UE corresponding to the coverage enhancement level.

$P_{PREAMBLE\_RECEIVED\_TARGET\_POWER}$ may be determined using the following formula 2-2:

$$P_{PREAMBLE\_RECEIVED\_TARGET\_POWER} = P_{PREAMBLE\_RECEIVED\_TARGET\_POWER\_INITIAL} + P_{DELTA\_PREAMBLE} + (C_{PREAMBLE\_TRANSMISSION\_COUNTER} - 1) \times S_{POWER\_RAMPING\_STEP} \quad (2-2)$$

where DELTA_PREAMBLE is a configuration parameter, $P_{PREAMBLE\_RECEIVED\_TARGET\_POWER\_INITIAL}$ is initial target received power of the random access signal, $C_{PREAMBLE\_TRANSMISSION\_COUNTER}$ is a counter of transmission attempts of the random access signal, and $S_{POWER\_RAMPING\_STEP}$ is a power ramping step.

Before the random access signal is transmitted, the original $P_{PREAMBLE\_RECEIVED\_TARGET\_POWER}$ is calculated using formula (2-2) and adjusted using the following formula (2-3) to obtain $P_{PREAMBLE\_RECEIVED\_TARGET\_POWER}$ and then the value of $P_{PREAMBLE\_RECEIVED\_TARGET\_POWER}$ is used as the new value of $P_{PREAMBLE\_RECEIVED\_TARGET\_POWER}$ to be substituted into formula (2-1).

$$P_{PREAMBLE\_RECEIVED\_TARGET\_POWER} = P_{PREAMBLE\_RECEIVED\_TARGET\_POWER} - 10 \times \log_{10} N_{REPETITION\_PER\_PREAMBLE\_ATTEMPT} \quad (2-3)$$

where $N_{REPETITION\_PER\_PREAMBLE\_ATTEMPT}$ is a number of repetitions corresponding to each transmission attempt of the random access signal.

A value of $C_{PREAMBLE\_TRANSMISSION\_COUNTER}$ is calculated by methods described below. (1) An initial value of $C_{PREAMBLE\_TRANSMISSION\_COUNTER}$ is set to 0, and an initial value of another counter $P_{Preamble\_Transmission\_Counter}$ of transmission attempts of the random access signal is set to 0.

(2) Before the random access signal is transmitted each time, a value of $C_{PREAMBLE\_TRANSMISSION\_COUNTER}$ is increased by 1, and a value of $P_{Preamble\_Transmission\_Counter}$ is increased by 1.

(3) When the value of $P_{PREAMBLE\_RECEIVED\_TARGET\_POWER}$ calculated according to formula (2-2) or (2-3) is greater than or equal to threshold B, $C_{PREAMBLE\_TRANSMISSION\_COUNTER}$ is reset to 0.

Alternatively, when a value of $P_{PREAMBLE\_RECEIVED\_TARGET\_POWER\_INITIAL} + (C_{PREAMBLE\_TRANSMISSION\_COUNTER} - 1) \times S_{POWER\_RAMPING\_STEP}$ in formula (2-3) is greater than or equal to threshold C, $C_{PREAMBLE\_TRANSMISSION\_COUNTER}$ is reset to 0. Values of B and C are configured by a base station.

In this embodiment, when $P_{Preamble\_Transmission\_Counter} = Q$ or Q+1, the first type of terminal no longer attempts to transmit the random access signal. It is considered that a random access process fails.

Q is a sum of upper limits of numbers of transmission attempts of the random access signal on random access channel resources corresponding to all levels (including CE level 0, CE level 1 and CE level 2).

Although the embodiments disclosed by the present disclosure are as described above, the content thereof is merely embodiments for facilitating the understanding of the solutions of the present disclosure and is not intended to limit the present disclosure. Any person skilled in the art to which the present disclosure pertains can make any modifications and changes in the forms and details of the implementation without departing from the solutions disclosed by the present disclosure, but the scope of protection defined by the present disclosure is still subject to the scope defined by the appended claims.

What is claimed is:

1. A signal transmitting method, comprising:
transmitting, by a first node, a first signal, wherein the first signal comprises at least one first structure,
wherein each of the at least one first structure comprises at least one symbol group (SG), each of the at least one SG in the each of the at least one first structure comprises a cyclic prefix and at least one symbol, or comprises a cyclic prefix, at least one symbol and guard time; and symbols of the each of the at least one SG in the each of the at least one first structure occupy a same subcarrier or a same frequency resource in frequency domain;
wherein in a case where the first signal comprises two first structures, and each of the two first structures comprises three SGs, a first one of the two first structures comprises SG0, SG1 and SG2, and a second one of the two first structures comprises SG3, SG4 and SG5;
wherein
for the three SGs in the first one of the two first structures, in a case where a subcarrier index of the SG0 is 0, a subcarrier index of the SG1 is 1, and a subcarrier index of the SG2 is 0; in a case where the subcarrier index of the SG0 is 1, the subcarrier index of the SG1 is 0, and the subcarrier index of the SG2 is 1; in a case where the subcarrier index of the SG0 is 2, the subcarrier index of the SG2 is 3, and the subcarrier index of the SG3 is 2; in a case where the subcarrier index of the SG0 is 3, the subcarrier index of the SG1 is 2, and the subcarrier index of the SG2 is 3; in a case where the subcarrier index of the SG0 is 4, the subcarrier index of the SG1 is 5, and the subcarrier index of the SG2 is 4; in a case where the subcarrier index of the SG0 is 5, the subcarrier index of the SG1 is 4, and the subcarrier index of the SG2 is 5; in a case where the subcarrier index of the SG0 is 6, the subcarrier index of the SG1 is 7, and the subcarrier index of the SG2 is 6; in a case where the subcarrier index of the SG0 is 7, the subcarrier index of the SG1 is 6, and the subcarrier index of the SG2 is 7; in a case where the subcarrier index of the SG0 is 8, the subcarrier index of the SG1 is 9, and the subcarrier index of the SG2 is 8; in a case where the subcarrier index of the SG0 is 9, the subcarrier index of the SG1 is 8, and the subcarrier index of the SG2 is 9; in a case where the subcarrier index of the SG0 is 10, the subcarrier index of the SG1 is 11, and the subcarrier index of the SG2 is 10; in a case where the subcarrier index of the SG0 is 11, the subcarrier index of the SG1 is 10, and the subcarrier index of the SG2 is 11; and for the three SGs in the second one of the two first structures, in a case where a subcarrier index of the SG3 is 0, a subcarrier index of the SG4 is 6, and a subcarrier index of the SG5 is 0; in a case where the subcarrier index of the SG3 is 1, the subcarrier index of the SG4 is 7, and the subcarrier index of the SG5 is 1; in a case where the subcarrier index of the SG3 is 2, the subcarrier index of the SG4 is 8, and the subcarrier index of the SG5 is 2; in a case where the subcarrier index of the SG3 is 3, the subcarrier index of the SG4 is 9, and the subcarrier index of the SG5 is 3; in a case where the subcarrier index of the SG3 is 4, the subcarrier index of the SG4 is 10, and the subcarrier index of the SG5 is 4; in a case where the subcarrier index of the SG3 is 5, the subcarrier index of the SG4 is 11, and the subcarrier index of the SG5 is 5; in a case where the subcarrier index of the SG3 is 6, the subcarrier index of the SG4 is 0, and the subcarrier index of the SG5 is 6; in a case where the subcarrier index of the SG3 is 7, the subcarrier index of the SG4 is 1, and the subcarrier index of the SG5 is 7; in a case where the subcarrier index of the SG3 is 8, the subcarrier index of the SG4 is 2, and the subcarrier index of the SG5 is 8; in a case where the subcarrier index of the SG3 is 9, the subcarrier index of the SG4 is 3, and the subcarrier index of the SG5 is 9; in a case where the subcarrier index of the SG3 is 10, the subcarrier index of the SG4 is 4, and the subcarrier index of the SG5 is 10; and in a case where the subcarrier index of the SG3 is 11, the subcarrier index of the SG4 is 5, and the subcarrier index of the SG5 is 11.

2. The method of claim 1, wherein a plurality of first structures are provided and the method further comprises at least one of:

subcarrier indexes or frequency resource positions occupied by first symbol groups in the plurality of first structures being same;

independently configuring subcarrier indexes or frequency resource positions occupied by first symbol groups in the plurality of first structures;

determining, at least according to a subcarrier index or a frequency resource position occupied by a first symbol group in a first one of the plurality of first structures, a subcarrier index or a frequency resource position occupied by a first symbol group in a subsequent one of the plurality of first structures; or determining, at least according to a subcarrier index or a frequency resource position occupied by a first symbol group in a first one of two adjacent first structures, a subcarrier index or a frequency resource position occupied by a first symbol group in a second one of the two adjacent first structures.

3. The method of claim 2, wherein determining, at least according to the subcarrier index or the frequency resource position occupied by the first symbol group in the first one of the plurality of first structures, the subcarrier index or the frequency resource position occupied by the first symbol group in the subsequent one of the plurality of first structures comprises:

selecting the subcarrier index occupied by the first symbol group in the first one of the plurality of first structures from a first subcarrier index set; and selecting the subcarrier index occupied by the first symbol group in the subsequent one of the plurality of first structures from a second subcarrier index set.

4. The method of claim 3, wherein the first subcarrier index set comprises a same subcarrier index as that of the second subcarrier index set.

5. The method of claim 2, wherein determining, at least according to the subcarrier index or the frequency resource position occupied by the first symbol group in the first one of the two adjacent first structures, the subcarrier index or the frequency resource position occupied by the first symbol group in the second one of the two adjacent first structures comprises:

selecting the subcarrier index occupied by the first symbol group in the first one of the two adjacent first structures from a first subcarrier index set; and selecting the subcarrier index occupied by the first symbol group in the second one of the two adjacent first structures from a second subcarrier index set;

wherein the first subcarrier index set comprises a same subcarrier index as that of the second subcarrier index set.

6. The method of claim 3, wherein in response to determining that the subcarrier index occupied by the first symbol group in the first one of the plurality of first structures belongs to a subset 1 of the first subcarrier index set, the subcarrier index occupied by the first symbol group in the subsequent one of the plurality of first structures is selected from a subset 1 of the second subcarrier index set; or in response to determining that the subcarrier index occupied by the first symbol group in the first one of the plurality of first structures belongs to a subset 2 of the first subcarrier index set, the subcarrier index occupied by the first symbol group in the subsequent one of the plurality of first structures is selected from a subset 2 of the second subcarrier index set;

wherein the first subcarrier index set comprises the subset 1 of the first subcarrier index set and the subset 2 of the first subcarrier index set, and the second subcarrier index set comprises the subset 1 of the second subcarrier index set and the subset 2 of the second subcarrier index set.

7. The method of claim 6, comprising at least one of the following:

the subset 1 of the first subcarrier index set comprises a subcarrier index different from that of the subset 2 of the first subcarrier index set;

the subset 1 of the first subcarrier index set has a same number of subcarrier indexes as that of the subset 2 of the first subcarrier index set;

the subset 1 of the second subcarrier index set comprises a subcarrier index different from that of the subset 2 of the second subcarrier index set; or the subset 1 of the second subcarrier index set has a same number of subcarrier indexes as that of the subset 2 of the second subcarrier index set.

8. The method of claim 1, wherein the subcarrier index of the first symbol group in the first one of the two adjacent first structures and the subcarrier index of the first symbol group in the second one of the two adjacent first structures are respectively selected from 12 subcarriers;

wherein a rule of the selection process is to randomly select one from the 12 subcarriers or to select one from the 12 subcarriers according to a preset rule.

9. A non-transitory storage medium, comprising stored programs, wherein the programs, when executed, perform:

transmitting a first signal, wherein the first signal comprises at least one first structure,
wherein each of the at least one first structure comprises at least one symbol group (SG), each of the at least one SG in the each of the at least one first structure comprises a cyclic prefix and at least one symbol, or comprises a cyclic prefix, at least one symbol and guard time; and symbols of the each of the at least one SG in the each of the at least one first structure occupy a same subcarrier or a same frequency resource in frequency domain;
wherein in a case where the first signal comprises two first structures, and each of the two first structures comprises three SGs, a first one of the two first structures comprises SG0, SG1 and SG2, and a second one of the two first structures comprises SG3, SG4 and SGS;
wherein for the three SGs in the first one of the two first structures, in a case where a subcarrier index of the SG0 is 0, a subcarrier index of the SG1 is 1, and a subcarrier index of the SG2 is 0; in a case where the subcarrier index of the SG0 is 1, the subcarrier index of the SG1 is 0, and the subcarrier index of the SG2 is 1; in a case where the subcarrier index of the SG0 is 2, the subcarrier index of the SG2 is 3, and the subcarrier index of the SG3 is 2; in a case where the subcarrier index of the SG0 is 3, the subcarrier index of the SG1 is 2, and the subcarrier index of the SG2 is 3; in a case where the subcarrier index of the SG0 is 4, the subcarrier index of the SG1 is 5, and the subcarrier index of the SG2 is 4; in a case where the subcarrier index of the SG0 is 5, the subcarrier index of the SG1 is 4, and the subcarrier index of the SG2 is 5; in a case where the subcarrier index of the SG0 is 6, the subcarrier index of the SG1 is 7, and the subcarrier index of the SG2 is 6; in a case where the subcarrier index of the SG0 is 7, the subcarrier index of the SG1 is 6, and the subcarrier index of the SG2 is 7; in a case where the subcarrier index of the SG0 is 8, the subcarrier index of the SG1 is 9, and the subcarrier index of the SG2 is 8; in a case where the subcarrier index of the SG0 is 9, the subcarrier index of the SG1 is 8, and the subcarrier index of the SG2 is 9; in a case where the subcarrier index of the SG0 is 10, the subcarrier index of the SG1 is 11, and the subcarrier index of the SG2 is 10; in a case where the subcarrier index of the SG0 is 11, the subcarrier index of the SG1 is 10, and the subcarrier index of the SG2 is 11; and
for the three SGs in the second one of the two first structures, in a case where a subcarrier index of the SG3 is 0, a subcarrier index of the SG4 is 6, and a subcarrier index of the SG5 is 0; in a case where the subcarrier index of the SG3 is 1, the subcarrier index of the SG4 is 7, and the subcarrier index of the SG5 is 1; in a case where the subcarrier index of the SG3 is 2, the subcarrier index of the SG4 is 8, and the subcarrier index of the SG5 is 2; in a case where the subcarrier index of the SG3 is 3, the subcarrier index of the SG4 is 9, and the subcarrier index of the SG5 is 3; in a case where the subcarrier index of the SG3 is 4, the subcarrier index of the SG4 is 10, and the subcarrier index of the SG5 is 4; in a case where the subcarrier index of the SG3 is 5, the subcarrier index of the SG4 is 11, and the subcarrier index of the SG5 is 5; in a case where the subcarrier index of the SG3 is 6, the subcarrier index of the SG4 is 0, and the subcarrier index of the SG5 is 6; in a case where the subcarrier index of the SG3 is 7, the subcarrier index of the SG4 is 1, and the subcarrier index of the SG5 is 7; in a case where the subcarrier index of the SG3 is 8, the subcarrier index of the SG4 is 2, and the subcarrier index of the SG5 is 8; in a case where the subcarrier index of the SG3 is 9, the subcarrier index of the SG4 is 3, and the subcarrier index of the SG5 is 9; in a case where the subcarrier index of the SG3 is 10, the subcarrier index of the SG4 is 4, and the subcarrier index of the SG5 is 10; and in a case where the subcarrier index of the SG3 is 11, the subcarrier index of the SG4 is 5, and the subcarrier index of the SG5 is 11.

10. The non-transitory storage medium of claim 9, wherein a plurality of first structures are provided and the computer program is further configured to perform at least one of:
   subcarrier indexes or frequency resource positions occupied by first symbol groups in the plurality of first structures being same;
   independently configure subcarrier indexes or frequency resource positions occupied by first symbol groups in the plurality of first structures;
   determine, at least according to a subcarrier index or a frequency resource position occupied by a first symbol group in a first one of the plurality of first structures, a subcarrier index or a frequency resource position occupied by a first symbol group in a subsequent one of the plurality of first structures; or
   determine, at least according to a subcarrier index or a frequency resource position occupied by a first symbol group in a first one of two adjacent first structures, a subcarrier index or a frequency resource position occupied by a first symbol group in a second one of the two adjacent first structures.

11. The non-transitory storage medium of claim 10, wherein the computer program determines, at least according to the subcarrier index or the frequency resource position occupied by the first symbol group in the first one of the plurality of first structures, the subcarrier index or the frequency resource position occupied by the first symbol group in the subsequent one of the plurality of first structures by:
   selecting the subcarrier index occupied by the first symbol group in the first one of the plurality of first structures from a first subcarrier index set; and
   selecting the subcarrier index occupied by the first symbol group in the subsequent one of the plurality of first structures from a second subcarrier index set.

12. The non-transitory storage medium of claim 11, wherein the first subcarrier index set comprises a same subcarrier index as that of the second subcarrier index set.

13. The non-transitory storage medium of claim 10, wherein the computer program determines, at least according to the subcarrier index or the frequency resource position occupied by the first symbol group in the first one of the two adjacent first structures, the subcarrier index or the frequency resource position occupied by the first symbol group in the second one of the two adjacent first structures by:
   selecting the subcarrier index occupied by the first symbol group in the first one of the two adjacent first structures from a first subcarrier index set; and
   selecting the subcarrier index occupied by the first symbol group in the second one of the two adjacent first structures from a second subcarrier index set;
   wherein the first subcarrier index set comprises a same subcarrier index as that of the second subcarrier index set.

14. The non-transitory storage medium of claim 11, wherein
  in response to determining that the subcarrier index occupied by the first symbol group in the first one of the plurality of first structures belongs to a subset 1 of the first subcarrier index set, the subcarrier index occupied by the first symbol group in the subsequent one of the plurality of first structures is selected from a subset 1 of the second subcarrier index set; or
  in response to determining that the subcarrier index occupied by the first symbol group in the first one of the plurality of first structures belongs to a subset 2 of the first subcarrier index set, the subcarrier index occupied by the first symbol group in the subsequent one of the plurality of first structures is selected from a subset 2 of the second subcarrier index set;
  wherein the first subcarrier index set comprises the subset 1 of the first subcarrier index set and the subset 2 of the first subcarrier index set, and the second subcarrier index set comprises the subset 1 of the second subcarrier index set and the subset 2 of the second subcarrier index set.

15. The non-transitory storage medium of claim 14, wherein,
  the subset 1 of the first subcarrier index set comprises a subcarrier index different from that of the subset 2 of the first subcarrier index set;
  the subset 1 of the first subcarrier index set has a same number of subcarrier indexes as that of the subset 2 of the first subcarrier index set;
  the subset 1 of the second subcarrier index set comprises a subcarrier index different from that of the subset 2 of the second subcarrier index set; or
  the subset 1 of the second subcarrier index set has a same number of subcarrier indexes as that of the subset 2 of the second subcarrier index set.

16. The non-transitory storage medium of claim 9, wherein
  the subcarrier index of the first symbol group in the first one of the two adjacent first structures and the subcarrier index of the first symbol group in the second one of the two adjacent first structures are respectively selected from 12 subcarriers;
  wherein a rule of the selection process is to randomly select one from the 12 subcarriers or to select one from the 12 subcarriers according to a preset rule.

17. A signal transmitting device, applied to a node, comprising:
  a memory, which is configured to store programs for signal transmitting; and
  a processor, which is configured to execute the programs, wherein when executed, the programs is configured to transmit a first signal, wherein the first signal comprises at least one first structure, wherein each of the at least one first structure comprises at least one symbol group (SG), each of the at least one SG in the each of the at least one first structure comprises a cyclic prefix and at least one symbol, or comprises a cyclic prefix, at least one symbol and guard time; and symbols of the each of the at least one SG in the each of the at least one first structure occupy a same subcarrier or a same frequency resource in frequency domain;
  wherein in a case where the first signal comprises two first structures, and each of the two first structures comprises three SGs, a first one of the two first structures comprises SG0, SG1 and SG2, and a second one of the two first structures comprises SG3, SG4 and SG5;
  wherein for the three SGs in the first one of the two first structures, in a case where a subcarrier index of the SG0 is 0, a subcarrier index of the SG1 is 1, and a subcarrier index of the SG2 is 0; in a case where the subcarrier index of the SG0 is 1, the subcarrier index of the SG1 is 0, and the subcarrier index of the SG2 is 1; in a case where the subcarrier index of the SG0 is 2, the subcarrier index of the SG2 is 3, and the subcarrier index of the SG3 is 2; in a case where the subcarrier index of the SG0 is 3, the subcarrier index of the SG1 is 2, and the subcarrier index of the SG2 is 3; in a case where the subcarrier index of the SG0 is 4, the subcarrier index of the SG1 is 5, and the subcarrier index of the SG2 is 4; in a case where the subcarrier index of the SG0 is 5, the subcarrier index of the SG1 is 4, and the subcarrier index of the SG2 is 5; in a case where the subcarrier index of the SG0 is 6, the subcarrier index of the SG1 is 7, and the subcarrier index of the SG2 is 6; in a case where the subcarrier index of the SG0 is 7, the subcarrier index of the SG1 is 6, and the subcarrier index of the SG2 is 7; in a case where the subcarrier index of the SG0 is 8, the subcarrier index of the SG1 is 9, and the subcarrier index of the SG2 is 8; in a case where the subcarrier index of the SG0 is 9, the subcarrier index of the SG1 is 8, and the subcarrier index of the SG2 is 9; in a case where the subcarrier index of the SG0 is 10, the subcarrier index of the SG1 is 11, and the subcarrier index of the SG2 is 10; in a case where the subcarrier index of the SG0 is 11, the subcarrier index of the SG1 is 10, and the subcarrier index of the SG2 is 11; and
  for the three SGs in the second one of the two first structures, in a case where a subcarrier index of the SG3 is 0, a subcarrier index of the SG4 is 6, and a subcarrier index of the SG5 is 0; in a case where the subcarrier index of the SG3 is 1, the subcarrier index of the SG4 is 7, and the subcarrier index of the SG5 is 1; in a case where the subcarrier index of the SG3 is 2, the subcarrier index of the SG4 is 8, and the subcarrier index of the SG5 is 2; in a case where the subcarrier index of the SG3 is 3, the subcarrier index of the SG4 is 9, and the subcarrier index of the SG5 is 3; in a case where the subcarrier index of the SG3 is 4, the subcarrier index of the SG4 is 10, and the subcarrier index of the SG5 is 4; in a case where the subcarrier index of the SG3 is 5, the subcarrier index of the SG4 is 11, and the subcarrier index of the SG5 is 5; in a case where the subcarrier index of the SG3 is 6, the subcarrier index of the SG4 is 0, and the subcarrier index of the SG5 is 6; in a case where the subcarrier index of the SG3 is 7, the subcarrier index of the SG4 is 1, and the subcarrier index of the SG5 is 7; in a case where the subcarrier index of the SG3 is 8, the subcarrier index of the SG4 is 2, and the subcarrier index of the SG5 is 8; in a case where the subcarrier index of the SG3 is 9, the subcarrier index of the SG4 is 3, and the subcarrier index of the SG5 is 9; in a case where the subcarrier index of the SG3 is 10, the subcarrier index of the SG4 is 4, and the subcarrier index of the SG5 is 10; and in a case where the subcarrier index of the SG3 is 11, the subcarrier index of the SG4 is 5, and the subcarrier index of the SG5 is 11.

18. The device of claim 17, wherein a plurality of first structures are provided and the programs are further configured to perform at least one of:

subcarrier indexes or frequency resource positions occupied by first symbol groups in the plurality of first structures being same;
independently configuring subcarrier indexes or frequency resource positions occupied by first symbol groups in the plurality of first structures;
determining, at least according to a subcarrier index or a frequency resource position occupied by a first symbol group in a first one of the plurality of first structures, a subcarrier index or a frequency resource position occupied by a first symbol group in a subsequent one of the plurality of first structures; or
determining, at least according to a subcarrier index or a frequency resource position occupied by a first symbol group in a first one of two adjacent first structures, a subcarrier index or a frequency resource position occupied by a first symbol group in a second one of the two adjacent first structures.

19. The device of claim 18, wherein the programs determine, at least according to the subcarrier index or the frequency resource position occupied by the first symbol group in the first one of the plurality of first structures, the subcarrier index or the frequency resource position occupied by the first symbol group in the subsequent one of the plurality of first structures by:
selecting the subcarrier index occupied by the first symbol group in the first one of the plurality of first structures from a first subcarrier index set; and
selecting the subcarrier index occupied by the first symbol group in the subsequent one of the plurality of first structures from a second subcarrier index set.

20. The device of claim 19, wherein the first subcarrier index set comprises a same subcarrier index as that of the second subcarrier index set.

* * * * *